United States Patent [19]
Shiono et al.

[11] Patent Number: 5,920,418
[45] Date of Patent: Jul. 6, 1999

[54] DIFFRACTIVE OPTICAL MODULATOR AND METHOD FOR PRODUCING THE SAME, INFRARED SENSOR INCLUDING SUCH A DIFFRACTIVE OPTICAL MODULATOR AND METHOD FOR PRODUCING THE SAME, AND DISPLAY DEVICE INCLUDING SUCH A DIFFRACTIVE OPTICAL MODULATOR

[75] Inventors: Teruhiro Shiono, Osaka; Michihito Ueda, Kyoto; Tatsuo Ito, Osaka; Kazuo Yokoyama, Hirakata; Shinichi Mizuguchi, Katano, all of Japan

[73] Assignee: Matsushita Electric Industrial Co., Ltd., Kadoma, Japan

[21] Appl. No.: 08/492,894

[22] Filed: Jun. 20, 1995

[30] Foreign Application Priority Data

| Jun. 21, 1994 | [JP] | Japan | 6-138994 |
| Jun. 23, 1994 | [JP] | Japan | 6-141656 |
| Oct. 7, 1994 | [JP] | Japan | 6-243806 |

[51] Int. Cl.⁶ .................................................. G02F 1/13
[52] U.S. Cl. ......................... 359/246; 359/247; 359/254; 359/263; 359/290; 359/291; 359/295
[58] Field of Search ...................................... 359/246, 247, 359/254, 263, 290, 291, 295, 566, 569, 572; 250/338.1, 338.2, 338.3, 351

[56] References Cited

U.S. PATENT DOCUMENTS

| 4,602,342 | 7/1986 | Gottlieb et al. | 364/498 |
| 5,182,665 | 1/1993 | O'Callaghan et al. | 359/95 |
| 5,231,432 | 7/1993 | Glenn | 353/31 |
| 5,237,435 | 8/1993 | Kurematsu et al. | 359/41 |
| 5,311,360 | 5/1994 | Bloom et al. | 359/572 |

FOREIGN PATENT DOCUMENTS

| 61-241629 | 10/1986 | Japan |
| 9322694 | 11/1993 | WIPO |

OTHER PUBLICATIONS

Search Report for European Appl. 95109622.1, mailed Oct. 13, 1995.
Brinker et al, SPIE, vol. 1018 Electro–Optic and Magneto–Optic Materials (1988), "Deformation Behavior of Thin Viscoelastic . . .".
Solgaard et al, Optics Letters, vol. 17, No. 9, pp. 688–690, 1992, "Deformable Grating Optical Modulator".

Primary Examiner—Georgia Epps
Assistant Examiner—Dawn-Marie Bey
Attorney, Agent, or Firm—Renner, Otto, Boisselle & Sklar, P.L.L.

[57] ABSTRACT

The diffractive optical modulator of the invention includes: a plate having a portion functioning as a first electrode; a spacer layer formed on the plate; and a grating consisting of a plurality of beams having a portion functioning as a second electrode, both ends of the beams being supported on the spacer layer. In the diffractive optical modulator, by adjusting a voltage applied between the first electrode and the second electrode, a distance between the beams and the plate is varied, thereby controlling the diffraction efficiency. An insulating layer is further provided between the plate and the plurality of beams.

44 Claims, 38 Drawing Sheets

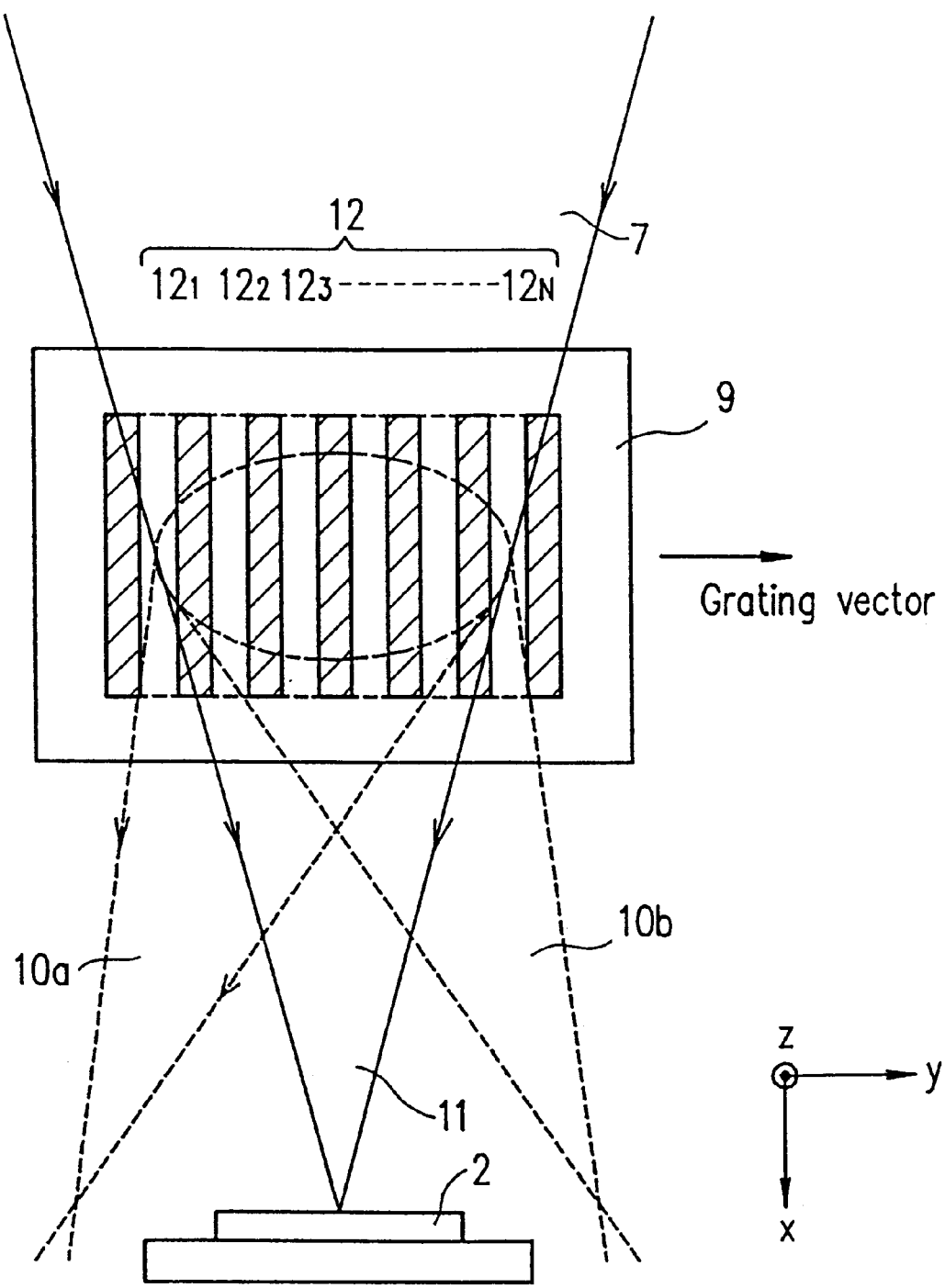

Voltage OFF

Voltage ON

FIG. 6
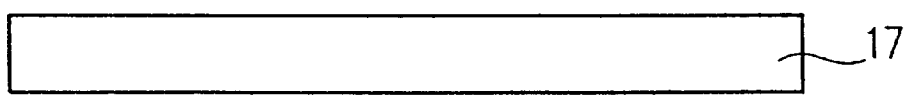
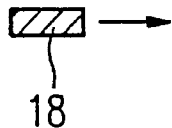
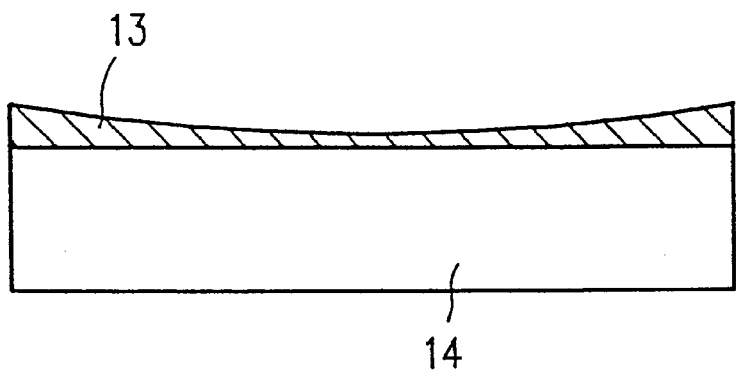
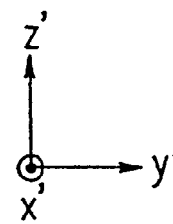

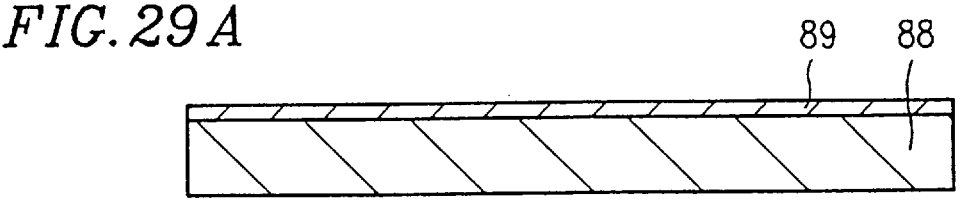
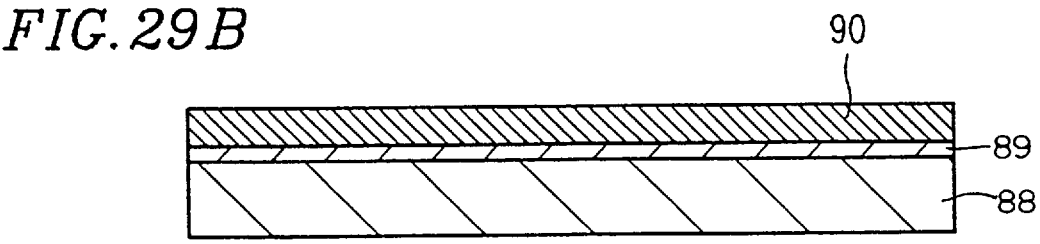
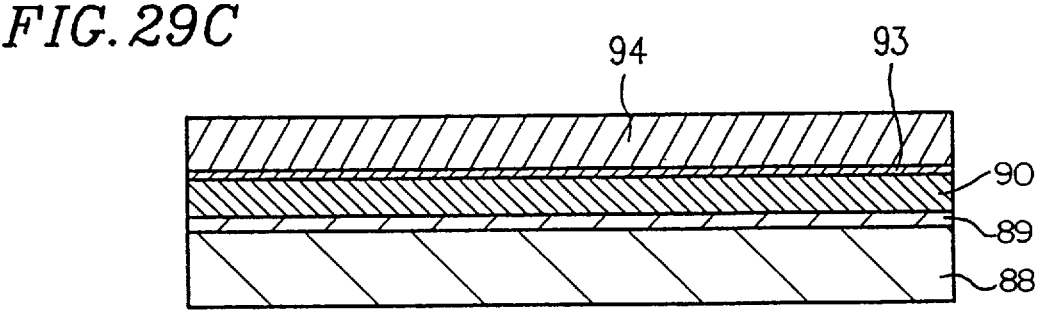
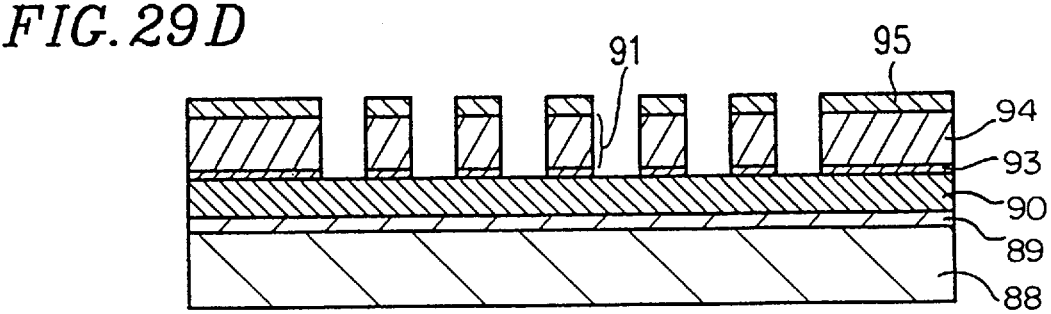
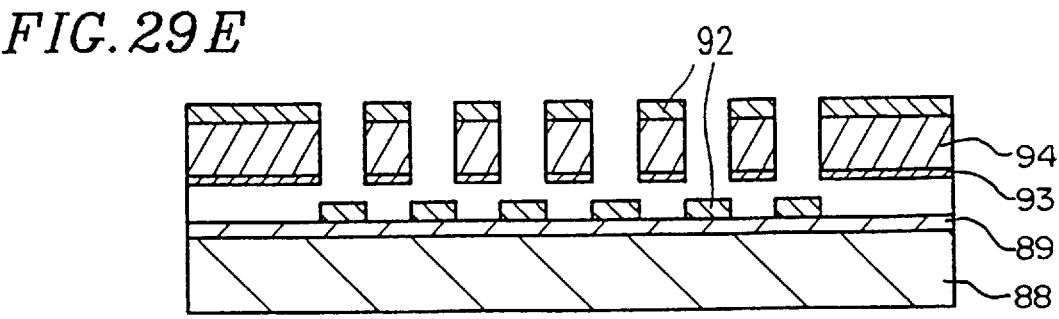

DIFFRACTIVE OPTICAL MODULATOR AND METHOD FOR PRODUCING THE SAME, INFRARED SENSOR INCLUDING SUCH A DIFFRACTIVE OPTICAL MODULATOR AND METHOD FOR PRODUCING THE SAME, AND DISPLAY DEVICE INCLUDING SUCH A DIFFRACTIVE OPTICAL MODULATOR

BACKGROUND OF THE INVENTION

1. Field of the Invention

The present invention relates to a diffractive optical modulator for modulating a light intensity and a method for producing the same; an infrared sensor including such a diffractive optical modulator and a method for producing the same; and a display device including such a diffractive optical modulator.

2. Description of the Related Art

A diffractive optical modulator modulates the intensity of incoming light by using the diffraction. A conventional diffractive optical modulator is disclosed, for example, in O. Solgaard et al., "Deformable Grating Optical Modulator," Optics Letters, Vol. 17, No. 9, May 1, 1992. The diffractive optical modulator disclosed in this article modulates the light intensity by using the diffraction effects of light. This modulator can be produced with a reduced size by an IC process, making such a modulator suitable for mass-producing.

The diffractive optical modulator disclosed in this article includes: a silicon substrate; a spacer (or silicon oxide film) formed in a peripheral region on the silicon substrate; and a grating consisting of a plurality of fine dielectric beams (or silicon-rich silicon nitride films), both ends of which are supported by the spacer. A reflection film functioning also as an electrode is provided on the upper surface of the grating. When a voltage is applied between the reflection film and the silicon substrate, an electrostatic force (or a Coulomb's force) is generated therebetween, so that the grating is deflected. As a result, the lower surface of the deflected grating comes into contact with the upper surface of the silicon substrate. Since the distance between the reflection film provided on the upper surface of the grating and the reflection film provided on the upper surface of the silicon substrate is varied in accordance with the application of a voltage, the diffraction efficiency is also varied.

In a conventional diffractive optical modulator, the beams are made of a dielectric material, and the modulator is driven by applying a voltage between the reflection film provided on the upper surface of the beams and the substrate. Accordingly, in the case of modulating light having a long wavelength such as infrared light, the distance between the upper and the lower electrodes becomes long, so that the driving voltage is required to be adversely high. In addition, the beams are formed by nitride films, and therefore a strong residual tensile stress is caused in the films. In general, the residual stress in a nitride film is almost as large as 1 GPa. In the above-mentioned conventional example, the beams are formed by silicon-rich nitride films, so that the residual stress is reduced to about 200 MPa. However, it is very difficult to reduce the tensile stress to a small one in accordance with such a method for reducing the stress, and the uniformity of the film is also degraded. Moreover, the spacer layer is formed by a silicon oxide film, and then removed by a wet etching (W/E) process. When the grating is dried after being rinsed, the surface tension of the rinsing liquid adversely causes the sticking of the beams onto the surface of the substrate. In order to solve such problems, a method in which protrusions provided on the lower surfaces of the beams prevent the sticking, or a so-called freeze drying method in which the beams are frozen, for example, in pure water after being rinsed and the frozen pure water is sublimated under vacuum has been used. However, both the methods disadvantageously complicate the production process.

SUMMARY OF THE INVENTION

The diffractive optical modulator of the invention includes: a plate having a portion functioning as a first electrode; a spacer layer formed on the plate; and a grating consisting of a plurality of beams having a portion functioning as a second electrode, both ends of the beams being supported on the spacer layer. In the diffractive optical modulator, by adjusting a voltage applied between the first electrode and the second electrode, a distance between the beams and the plate is varied, thereby controlling the diffraction efficiency, and an insulating layer is further provided between the plate and the plurality of beams.

In one embodiment, a reflection film is formed on a surface of the insulating layer and on surfaces of the beams.

In another embodiment, the plate is made of a semiconductor functioning as the first electrode.

In still another embodiment, the plate consists of a conductive layer functioning as the first electrode and an insulating substrate for supporting the conductive layer.

In still another embodiment, at least lower surfaces of the beams are made of a conductive material.

In still another embodiment, at least lower surfaces of the beams are made of a conductive material which is not likely to be oxidized.

In still another embodiment, the spacer layer is made of an organic material.

In still another embodiment, the conductive material is selected from the group consisting of Au, Pt, Ti, an NiCr alloy, a CuNi alloy, chrome steel, and a conductive organic material.

In still another embodiment, the spacer layer is made of the same material as a material of the plurality of beams.

In still another embodiment, a width of the beams supported on the spacer layer in a longitudinal direction is less than twice of a thickness of the beams.

The diffractive optical modulator according to another aspect of the invention includes: a plate having a portion functioning as a first electrode, and an upper surface and a bottom surface; a spacer layer formed on the upper surface of plate; and a grating consisting of a plurality of beams having a portion functioning as a second electrode, both ends of the beams being supported on the spacer layer. In the diffractive optical modulator, by adjusting a voltage applied between the first electrode and the second electrode, a distance between the beams and the plate is varied, thereby controlling the diffraction efficiency, and a first antireflection film made of an insulating material is further provided on the upper surface of the plate, and a second antireflection film made of an insulating material is further provided on the bottom surface of the plate, and each of the beams consists of a beam-shaped reflection film functioning as the second electrode and being made of a conductive material, and an elastic layer formed on the beam-shaped reflection film.

The diffractive optical modulator according to still another aspect of the invention includes: a plate having a portion functioning as a first electrode; a spacer layer formed on the plate; and a grating consisting of a plurality of beams having a portion functioning as a second electrode, both ends of the beams being supported on the spacer layer. In the diffractive optical modulator, by adjusting a voltage applied between the first electrode and the second electrode, a distance between the beams and the plate is varied, thereby controlling the diffraction efficiency, and the plurality of beams are arranged so that a movable distance between the plurality of beams and the plate becomes minimum on an optical axis of incoming light.

The diffractive optical modulator according to still another aspect of the invention includes: a plate having a portion functioning as a first electrode; a spacer layer formed on the plate; and a grating consisting of a plurality of beams having a portion functioning as a second electrode, both ends of the beams being supported on the spacer layer. In the diffractive optical modulator, by adjusting a voltage applied between the first electrode and the second electrode, a distance between the beams and the plate is varied, thereby controlling the diffraction efficiency, and a thickness of the plurality of beams is adjusted so as to be minimal on an optical axis of incoming light.

In one embodiment, the first electrode is grounded, and a voltage is applied to the beam-shaped reflection film.

In another embodiment, the elastic layer is made of the same material as a material of the beam-shaped reflection film.

According to still another aspect of the invention, a method for producing the diffractive optical modulator is provided. The method includes the steps of: depositing a first layer functioning as a spacer layer on a plate; and depositing a second layer functioning as beams on the spacer layer. In this method, during the step of depositing the first layer, the first layer is deposited while moving a shield disposed between a deposition source for supplying a material of the first layer towards the plate and the plate, thereby varying a thickness of the first layer at respective positions.

According to still another aspect of the invention, a method for producing the diffractive optical modulator is provided. The method includes the steps of: depositing a first layer functioning as a spacer layer on a plate; and depositing a second layer functioning as beams on the spacer layer. In this method, during the step of depositing the second layer, the second layer is deposited while moving a shield disposed between a deposition source for supplying a material of the second layer towards the plate and the plate, thereby varying a thickness of the second layer at respective positions.

According to still another aspect of the invention, a method for producing the diffractive optical modulator is provided. The method includes the steps of: forming an insulating film on a plate having a portion functioning as a first electrode; depositing an organic film on the insulating film; depositing a conductive thin film on the organic film; patterning the conductive thin film, thereby forming a plurality of beams functioning as a second electrode; and removing a predetermined portion of the organic film by a dry etching process, thereby forming a spacer for supporting both ends of the plurality of beams.

According to still another aspect of the invention, a method for driving the diffractive optical modulator is provided. In this method, voltages in a rectangular waveform having an equal absolute value and opposite polarities are applied to the first electrode and the second electrode, respectively.

According to still another aspect of the invention, an infrared sensor including: a lens for converging infrared light and a pyroelectric element is provided. In the infrared sensor, a diffractive optical modulator for receiving the infrared light converged by the lens and for outputting at least a part of the infrared light toward the pyroelectric element is further provided. The diffractive optical modulator includes: a plate having a portion functioning as a first electrode; a spacer layer formed on the plate; and a grating consisting of a plurality of beams having a portion functioning as a second electrode, both ends of the beams being supported on the spacer layer. In the infrared sensor, by adjusting a voltage applied between the first electrode and the second electrode, a distance between the beams and the plate is varied, thereby controlling the diffraction efficiency of the diffractive optical modulator.

In one embodiment, the infrared sensor further includes: a signal amplifier, connected to the pyroelectric element, for outputting an electric signal indicating an amount of infrared light received by the pyroelectric element; and a plurality of electrode pins connected to the first and the second electrodes of the diffractive optical modulator and the signal amplifier and the pyroelectric element, the electrode pins externally protruding from the bottom surface of the seal case.

In another embodiment, the infrared sensor further includes a supporting plate for supporting the pyroelectric element and the signal amplifier.

In still another embodiment, at least one of the plurality of electrode pins extends to an inside of the seal case, and the at least one electrode pin supports the supporting plate.

In still another embodiment, the infrared sensor further includes a shield which is disposed between the pyroelectric element and the diffractive optical modulator and is grounded.

In still another embodiment, the diffractive optical modulator has an inclination angle ($\theta_t$) of 45 degrees or less with respect to an upper surface of the seal case.

In still another embodiment, the angle ($\theta_t$) is 25 degrees or less.

In still another embodiment, the plate is disposed being inclined so that a normal with respect to a principal plane of the plate is not parallel to an optical axis of the lens.

In still another embodiment, the diffractive optical modulator is disposed so that only zero-order diffracted light of light diffracted by the grating is incident on the pyroelectric element and that the diffracted light other than the zero-order diffracted light is not incident on the pyroelectric element.

In still another embodiment, an amount of the zero-order diffracted light is varied in accordance with a variation of a distance between the beams and the plate of the diffractive optical modulator.

In still another embodiment, a seal case having an opening includes the diffractive optical modulator and the pyroelectric element.

In still another embodiment, the lens for converging the infrared light is provided so as to cover the opening of the seal case.

In still another embodiment, the seal case includes: an upper surface for supporting the lens; a bottom surface parallel to the upper surface; and an inclined member for supporting the diffractive optical modulator so that the diffractive optical modulator is inclined with respect to the bottom surface by an inclination angle $\theta_t$, and the diffractive optical modulator is disposed on the inclined member.

In still another embodiment, the lens for converging the infrared light is a diffractive lens.

In still another embodiment, the lens for converging the infrared light has a corrugated structure corresponding to a phase modulation of the lens and is made of a material selected from the group consisting of Si, Ge, GaAs, InP, GaP, ZnSe and ZnS.

In still another embodiment, a period of the grating is seven times or more of a wavelength of the infrared light.

In still another embodiment, the plurality of beams are arranged so that a movable distance of the grating becomes minimum on an optical axis of incoming infrared light.

In still another embodiment, a thickness of the plurality of beams is adjusted so as to be minimum on an optical axis of incoming infrared light.

In still another embodiment, the diffractive optical modulator is disposed so that a direction parallel to a principal plane of the plate and vertical to the beams is vertical to an optical axis of the lens.

In still another embodiment, a movable distance of the beams is set to be $\lambda/(4 \cos \theta)$, where $\lambda$ is a wavelength of the infrared light, and $\theta$ is an angle formed between a normal with respect to the principal plane of the plate of the diffractive optical modulator and the optical axis of the lens.

In still another embodiment, a thickness of the beams is set to be $\lambda/(4 \cos \theta)$, where $\lambda$ is a wavelength of the infrared light, and $\theta$ is an angle formed between a normal with respect to the principal plane of the plate of the diffractive optical modulator and the optical axis of the lens.

In still another embodiment, an insulating layer is provided between the plate of the diffractive optical modulator and the beams.

In still another embodiment, the beams of the diffractive optical modulator are made of a conductive material.

The infrared sensor according to still another aspect of the invention includes: a diffractive optical modulator for outputting at least a part of incoming infrared light; a lens; and a pyroelectric element. In the infrared sensor, the lens converges the infrared light output from the diffractive optical modulator on the pyroelectric element, and the diffractive optical modulator includes: a plate having a portion functioning as a first electrode; a spacer layer formed on the plate; and a grating consisting of a plurality of beams having a portion functioning as a second electrode, both ends of the beams being supported on the spacer layer. In the infrared sensor, by adjusting a voltage applied between the first electrode and the second electrode, a distance between the beams and the plate is varied, thereby controlling the diffraction efficiency of the diffractive optical modulator.

In one embodiment, the infrared sensor further includes: a signal amplifier, connected to the pyroelectric element, for outputting an electric signal indicating an amount of infrared light received by the pyroelectric element; and a plurality of electrode pins connected to the first and the second electrodes of the diffractive optical modulator and the signal amplifier and the pyroelectric element, the electrode pins externally protruding from the bottom surface of the seal case.

In another embodiment, a seal case having an opening includes the diffractive optical modulator, the pyroelectric element and the lens.

In still another embodiment, an infrared wavelength filter is provided so as to cover the opening of the seal case.

In still another embodiment, the infrared sensor further includes an opening control means provided for the opening.

According to still another aspect of the invention, a method for producing an infrared sensor is provided. The infrared sensor includes a lens for converging infrared light, a pyroelectric element and a diffractive optical modulator for receiving the infrared light converged by the lens and for outputting at least a part of the infrared light to the pyroelectric element. A method for producing the diffractive optical modulator includes the steps of: depositing a first layer functioning as a spacer layer on a plate; and depositing a second layer functioning as beams on the spacer layer. In this method, during the step of depositing the first layer, the first layer is deposited while moving a shield disposed between a deposition source for supplying a material of the first layer towards the plate and the plate, thereby varying a thickness of the first layer at respective positions.

According to still another aspect of the invention, a method for producing an infrared sensor is provided. The infrared sensor includes a lens for converging infrared light, a pyroelectric element and a diffractive optical modulator for receiving the infrared light converged by the lens and for outputting at least a part of the infrared light to the pyroelectric element. A method for producing the diffractive optical modulator includes the steps of: depositing a first layer functioning as a spacer layer on a plate; and depositing a second layer functioning as beams on the spacer layer. In this method, during the step of depositing the second layer, the second layer is deposited while moving a shield disposed between a deposition source for supplying a material of the second layer towards the plate and the plate, thereby varying a thickness of the second layer at respective positions.

According to still another aspect of the invention, a method for producing an infrared sensor is provided. The infrared sensor includes a lens for converging infrared light, a pyroelectric element and a diffractive optical modulator for receiving the infrared light converged by the lens and for outputting at least a part of the infrared light to the pyroelectric element. A method for producing the diffractive optical modulator includes the steps of: forming an insulating film on a plate having a portion functioning as a first electrode; depositing an organic film on the insulating film; depositing a conductive thin film on the organic film; patterning the conductive thin film, thereby forming a plurality of beams functioning as a second electrode; and removing a predetermined portion of the organic film by a dry etching process, thereby forming a spacer for supporting both ends of the plurality of beams.

According to still another aspect of the invention, a display device is provided. The display device includes: a light source; a diffractive optical modulation unit provided on an optical path of light emitted from the light source; and an optical element for imaging light output from the diffractive optical modulation unit. The diffractive optical modulation unit is provided with a diffractive grating means, thereby controlling a diffraction efficiency of the diffractive grating means.

In one embodiment, the diffractive grating means is a reflective type means.

In another embodiment, a lattice pitch of the diffractive grating means is seven times or more of a central value of a waveband of the light.

In still another embodiment, the diffractive optical modulation unit includes a plurality of diffractive optical modulators two-dimensionally arranged as the diffractive grating means, and the plurality of diffractive optical modulators respectively correspond to a plurality of pixels. Each of the plurality of diffractive optical modulators includes: a plate having a portion functioning as a first electrode; a spacer layer formed on the plate; and a grating consisting of a plurality of beams having a portion functioning as a second electrode, both ends of the beams being supported on the spacer layer. The diffractive optical modulator controls the diffraction efficiency by varying a gap between the beams and the plate by adjusting a voltage applied between the first electrode and the second electrode.

In still another embodiment, the plurality of diffractive optical modulators further include an insulating layer formed between the plate and the plurality of beams.

In still another embodiment, a region for forming a phase difference which is one half of a wavelength of the light is provided between adjacent modulators of the plurality of diffractive optical modulators.

In still another embodiment, the display device further includes a separation means for separating the light emitted from the light source into a plurality of light beams having different wavebands. The diffractive optical modulation unit is disposed on an optical path of each of the plurality of light beams.

In still another embodiment, the diffractive optical modulation unit includes a plurality of diffractive optical modulators two-dimensionally arranged as the diffractive grating means, and the plurality of diffractive optical modulators respectively correspond to a plurality of pixels. Each of the plurality of diffractive optical modulators includes: a plate having a portion functioning as a first electrode; a supporting beam formed on the plate; and a grating consisting of a plurality of beams having a portion functioning as a second electrode, both ends of the beams being supported on the supporting beam. A width of the supporting beam is smaller than a width of a movable portion of each of the plurality of beams. The diffractive optical modulator controls a diffraction efficiency by varying a gap between the beams and the plate by adjusting a voltage applied between the first electrode and the second electrode.

Thus, the invention described herein makes possible the advantages of (1) providing a diffractive optical modulator which can be produced easily in a small size, which can be driven at a low voltage, and which exhibits excellent durability and response characteristics, and a method for producing the same; (2) providing an infrared sensor including such a diffractive optical modulator and a method for producing the same; and (3) providing a display device including such a diffractive optical modulator.

These and other advantages of the present invention will become apparent to those skilled in the art upon reading and understanding the following detailed description with reference to the accompanying figures.

BRIEF DESCRIPTION OF THE DRAWINGS

FIG. 2 is a plan view seen from above the seal case showing a positional relationship between a diffractive optical modulator and a pyroelectric element according to the first example of the invention.

FIG. 3A is a cross-sectional view of the diffractive optical modulator of the first example in a state where no voltage is applied, while

FIG. 6 is a cross-sectional view schematically showing a thin film deposition process in a production method of the second example.

FIG. 7A is a plan view of an infrared sensor according to a third example of the invention, while

FIG. 9A is a cross-sectional view of the diffractive optical modulator of the third example in a state where no voltage is applied, while

FIG. 12A is a cross-sectional view of the diffractive optical modulator of the fourth example in a state where no voltage is applied, while

FIG. 19A is a plan view of the diffractive optical modulator according to the sixth example of the invention, while

FIG. 21A is a cross-sectional view illustrating the operation of the diffractive optical modulator of the sixth example when the voltage is off, while FIG. 21B is a cross-sectional view illustrating the operation of the diffractive optical modulator of the sixth example when the voltage is on.

FIG. 22A is a graph showing the relationship between the inclination angle and the optimal thickness of a beam in the diffractive optical modulator of the sixth example, while

FIG. 25A is a cross-sectional view illustrating the behavior of the charges in the diffractive optical modulator of the sixth example when the voltage is on, while

FIG. 27A is a plan view of the diffractive optical modulator according to an eighth example of the invention, while

FIGS. 29A to 29E are cross-sectional views taken along the line B–B' in FIG. 27A showing the process steps for producing the diffractive optical modulator of the eighth example of the invention.

FIG. 33A is a cross-sectional view illustrating the operation of the diffractive optical modulator of the tenth example when no voltage is applied, while

FIG. 39A is a perspective view of a display device according to another example of the invention, while

FIG. 40A is a plan view of a display device according to still another example of the invention, while

DESCRIPTION OF THE PREFERRED EMBODIMENTS

Hereinafter, the present invention will be described by way of illustrative examples with reference to the accompanying drawings.

EXAMPLE 1

Referring to FIGS. 1 to 4, an infrared sensor according to a first example of the invention will be described.

The infrared sensor of this example includes a lens provided in an opening of a seal case, and a diffractive optical modulator confined in the seal case as well as a pyroelectric element. Such an arrangement makes it possible to produce a micro-infrared sensor. The diffractive optical modulator itself can be driven at a low power consumption, and is excellent in the durability and the response speed.

Figure 1:
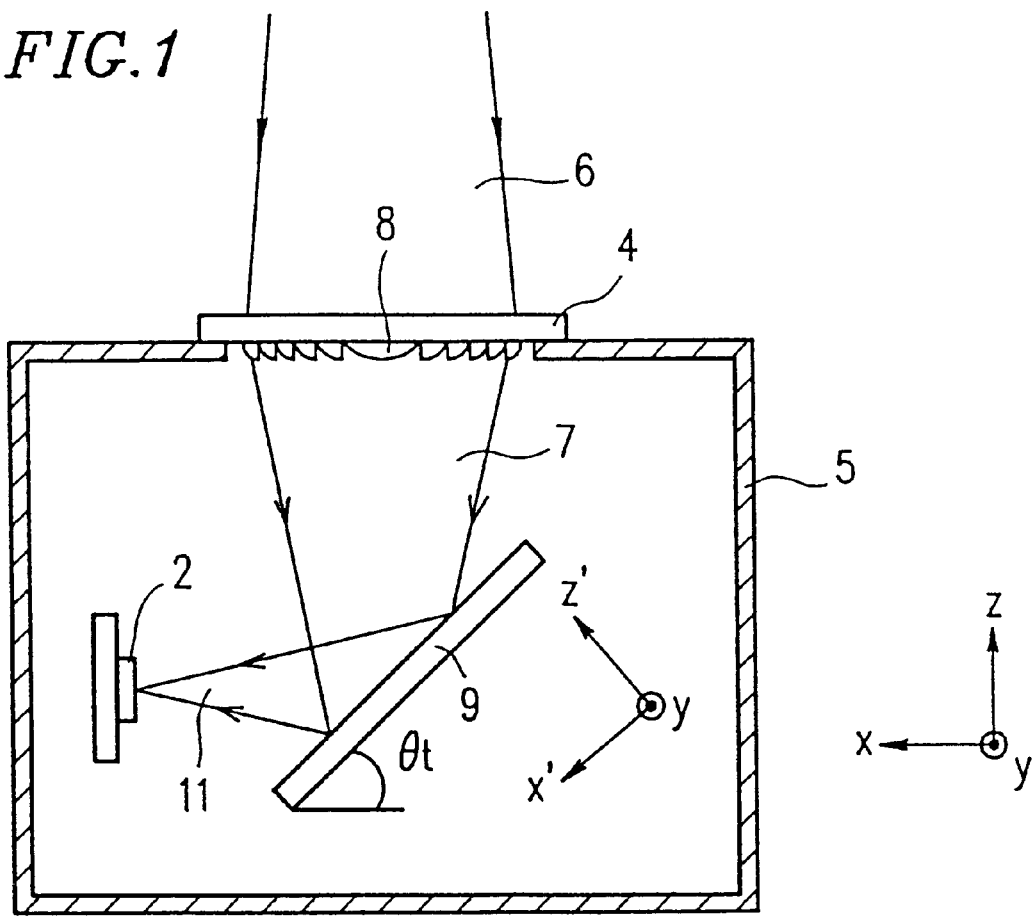
FIG. 1 is a cross-sectional view showing a fundamental configuration of an infrared sensor according to a first example of the invention.

As shown in FIG. 1, the lens for converging infrared light has a corrugated grating structure which corresponds to the phase modulation of the lens. For example, the lens is a diffractive lens 8 having an aperture of 3 mm and a focal length of 6 mm. This lens 8 is composed of a plurality of concentric grating zones, and the grating period in the zones gradually decreases towards the outer circumference thereof. The cross section of the grating zones, having a maximum groove depth of 3 $\mu$m, for example, is in a so-called multi-level shape having approximately a sawtooth shape in four steps, for example. The lens 8 converges the incoming light by utilizing the diffraction phenomena. This diffractive lens 8 is formed directly on the reverse side of a Si substrate on which a film functioning as infrared wavelength filter is deposited, and is provided on the opening of the seal case 5. In this construction, a spherical lens made of Si which is required in the conventional example is no longer necessary. Therefore, a smaller infrared sensor can be constructed more easily and at a lower cost.

This diffractive lens 8 is produced by performing the step of a photolithography process followed by a reactive ion etching (RIE) process, twice with respect to an entire Si wafer. This method allows for producing as many as several hundreds to several thousands of lenses simultaneously per single wafer. In place of the Si, the substrate (or the wafer) may also be made of Ge, GaAs, InP, GaP, ZnSe or ZnS which is transparent in an infrared region.

The diffractive optical modulator 9 has, for example, an area of 2.5 mm×2.5 mm, and a thickness of 0.4 mm and is included in the seal case 5 as well as the pyroelectric element 2. The diffractive optical modulator 9 is a reflection diffractive optical element which can vary the reflectance (or the zero-order diffraction efficiency) by controlling the voltage to be applied to the modulator 9. In the coordinate systems shown in FIGS. 1 and 2, the diffractive optical modulator 9 has a disposition plane (x'y plane) inclined with respect to the disposition plane (xy plane) of the lens 8 by an angle $\theta_t$ of 45 degrees, for example. As a result, as shown in FIG. 1, the optical axis of the converged infrared light 7 having a wavelength $\lambda$ of 10 $\mu$m is folded by the diffractive optical modulator 9 by 90 degrees, for example, so that the zero-order diffracted light 11 is incident onto the pyroelectric element 2 disposed on the left of the modulator 9. The zero-order diffracted light 11 is directed in the same direction as the direction of the light reflected by an ordinary mirror disposed at the position of the modulator 9. This optical system with a folded optical path has an advantage of reducing the height of the seal case 5.

When a voltage is applied to this diffractive optical modulator 9, the zero-order diffracted light 11 disappears and first-order diffracted light 10a and minus first-order diffracted light 10b are generated as indicated by the broken lines in FIG. 2 so that the ratio of each of the two lights 10a and 10b to the entire light is 0.41. These two diffracted lights 10a and 10b are then converged outside of the pyroelectric element 2. Consequently, the infrared light is not incident on the pyroelectric element 2. Therefore, by turning on/off the voltage applied to the diffractive optical modulator 9, the amount of the infrared light incident on the pyroelectric element 2 can be varied, and therefore the diffractive optical modulator 9 can operate in the same way as a conventional chopper.

Figure 3A:
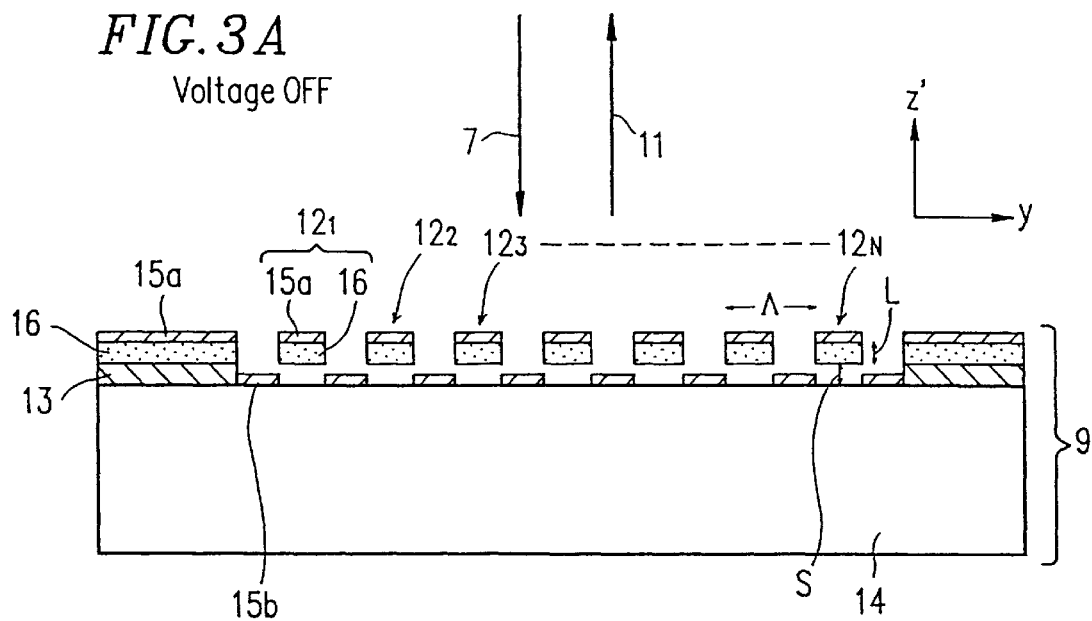
Figure 3B:
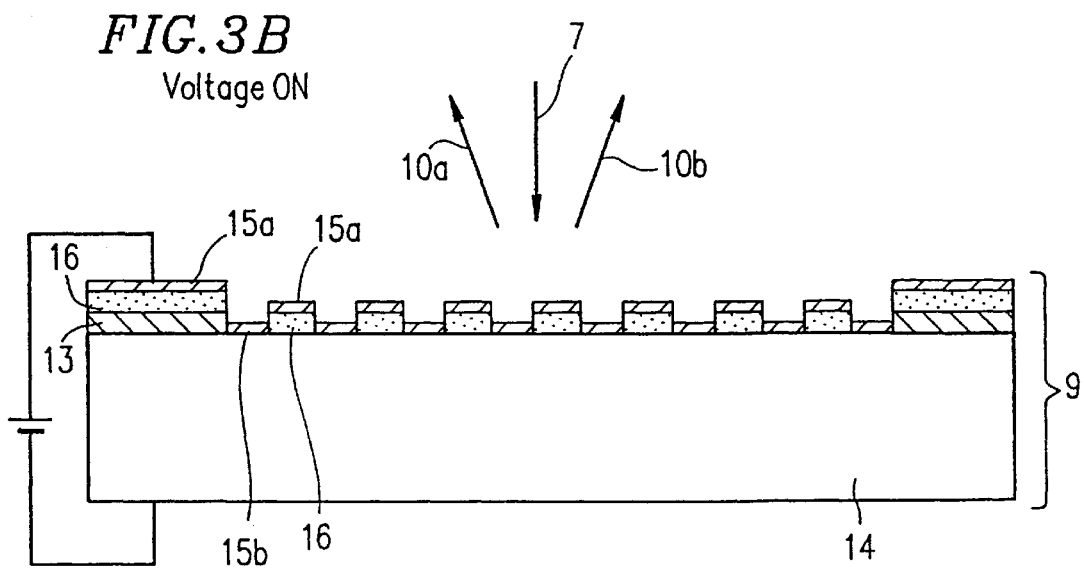
FIG. 3B is a cross-sectional view of the diffractive optical modulator of the first example in a state where a voltage is applied.
Figure 4:
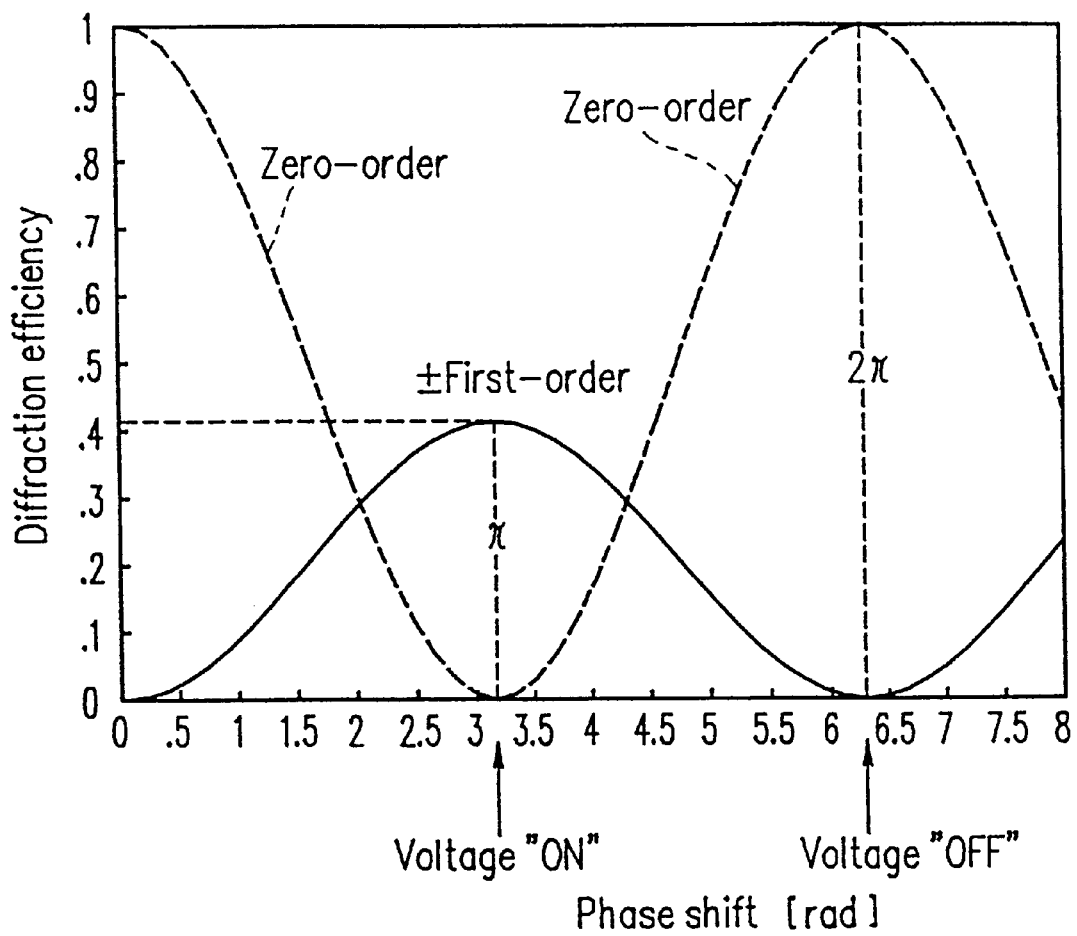
FIG. 4 is a graph showing a relationship between the diffraction efficiency and the amount of the phase shift in the diffractive optical modulator for the infrared sensor of the first example of the invention.

As shown in FIG. 2 and FIGS. 3A and 3B, this diffractive optical modulator 9 includes a Si substrate 14 and a grating 12 consisting of a plurality of beams $12_1, 12_2 \ldots 12_N$ which can move vertically. The grating 12 is formed by an SiN layer 16 or the like, and has a length of 2 mm, a thickness L of 3.5 $\mu$m, and a period $\Lambda$ of 100 $\mu$m.

An $SiO_2$ layer 13 is provided as a spacer layer between the grating 12 and the substrate 14. Both ends of each beam of the grating 12 are supported by this spacer layer. The distance S between the grating 12 and the substrate 14 is 3.5 $\mu$m, for example. This distance can be adjusted by varying the thickness of the spacer layer.

Reflection films 15a and 15b made of Au are provided on the surface of the grating 12 and on the surface of the substrate 14. The reflection film 15a is insulated with the substrate 14 by the spacer layer ($SiO_2$ layer) 13. The spacer layer may be made of the same material as the material of the plurality of beams 12.

In this example, an entire plate-type Si substrate 14 functions as a first electrode. The reflection film 15a functions as a second electrode. By applying a voltage between the substrate 14 and the reflection film 15a, an electrostatic force is generated therebetween, and the supported portions of the grating 12 in the vicinity of both ends thereof are deflected, so that the grating 12 comes into contact with the substrate 14 as shown in FIG. 3B. The length of the grating 12 is set to be larger than the aperture of the beam (indicated by the broken lines in FIG. 2), e.g., 1.8 mm, when the converged infrared light 7 is reflected by the diffractive optical modulator 9, so that the light is well modulated. However, if the length is set to be too large, then unnecessary infrared light incident on the regions other than the detection region is possibly diffracted in the peripheral region of the grating 12 which is not to be used, and then incident onto the pyroelectric element 2. Thus, in this example, the length of the grating 12 is set to be larger than the aperture of the reflected beam by about 5 to 20%.

The present inventors have found that the optimal thickness of the grating 12 and the optimal height of the space (movable distance) depends upon the inclination angle $\theta_t$ of the diffractive optical modulator 9; that the thickness L of the SiN layer 16 is $\lambda/(4 \cos \theta_t)$, e.g., 3.5 $\mu$m, where $\lambda$ is a wavelength of the incoming light; and that the height S of the space between the grating 12 and the substrate 14 is also $\lambda/(4 \cos \theta_t)$, e.g., 3.5 $\mu$m. When no voltage is applied, the phase shift between the light reflected in the Z' direction by the reflection layer 15a on the surface of the grating 12 and the light reflected by the reflection layer 15b on the surface of the substrate 14, becomes $2\pi$. Since the phases are exactly matched, the diffractive optical modulator 9 functions merely as a mirror, and the diffraction efficiency of the zero-order diffracted light becomes approximately 100% except for the reflection loss, so that only the zero-order diffracted (or reflected) light 11 is generated. On the other hand, when a voltage is applied, the phase shift between the light reflected by the reflection layer 15a on the surface of the grating 12 and the light reflected by the reflection layer 15b on the surface of the substrate 14, respectively, becomes $\pi$. In this case, since the phases are entirely opposite to each other, the zero-order diffraction efficiency becomes 0%, and the $\pm$ first-order diffracted lights 10a and 10b are generated at the diffraction efficiency of 41%, respectively. However, even if the height S and the thickness L are varied more or less, the diffractive optical modulator 9 can still function as a chopper. In the prior art as disclosed by O. Solgaard, F. S. A. Sandejas and D. M. Bloom in "Deformable Grating Optical Modulator," Optics Letters, Vol. 17, No. 9, May 1, 1992, collimated visible light (having a wavelength $\lambda$ of 0.6328 $\mu$m, for example) is incident vertically onto the device (or the diffractive optical modulator), so that it is difficult to separate the incoming light from the reflected zero-order diffracted light. In addition, the grating period $\Lambda$ may be 2, 3 or 4 $\mu$m, but the grating width becomes a half of the grating period, i.e., 1, 1.5 or 2 $\mu$m. Since the grating width is too small, it is difficult to fabricate the grating. Furthermore, since the grating thickness or the height of the space is very small, e.g., about 0.2 $\mu$m, the error is likely to occur in the thickness of the deposited film during the production process. Accordingly, it is difficult to produce a diffractive optical modulator with excellent properties in a high production yield.

On the other hand, the infrared sensor according to the present invention uses an infrared ray having a central wavelength of 10 $\mu$m as the incoming light, so that the width of the grating to be produced becomes very large, e.g., about 50 $\mu$m. Accordingly, the patterning process can be easily performed for the grating. In addition, both the optimal grating thickness and the optimal height of the space become very large, e.g., about 3.5 $\mu$m, the thickness of the thin film to be deposited can be controlled very satisfactorily. Moreover, the grains or the fine unevenness generally caused in a thin film give adverse effects when visible light is incident, e.g., the scattering of the light. However, the infrared sensor of the invention is not affected in any of the above ways.

In this example, the direction of the grating vector (or y direction), which is vertical to the longitudinal direction (or x' direction) of the diffractive optical modulator 9 and is on the surface where the grating is provided, is vertical to the optical axis (or $-z$ direction) of the infrared light 7 converged by the lens 8, and the disposition plane (x'y plane) of the diffractive optical modulator 9 is inclined with respect to the disposition plane (xy plane) of the lens 8. The present inventors have found that by using such a configuration, the incoming converged infrared light 7 can be satisfactorily separated from the output zero-order diffracted light 11, and that the zero-order diffraction efficiency when no voltage is applied is approximately 100%.

In the infrared sensor of the invention, not the collimated light but the converged light is incident onto the diffractive optical modulator 9. The present inventors have found that the zero-order diffraction efficiency becomes approximately 100% in the central beams of the grating 12 in the y direction, e.g., when the numbers of the beams are ten, beams $12_4$, $12_5$ and $12_6$, when no voltage is applied, but that the zero-order diffraction efficiency gradually decreases in the peripheral beams of the grating 12 in the y' direction, e.g., beams $12_1$, $12_2$, $12_9$ and $12_{10}$, because the incident angle of the light is inclined. Because of the same reasons, when a voltage is applied, the zero-order diffraction efficiency increases from 0% in the peripheral beams, and therefore the width of the varying light amount reduces as a whole. However, as discovered by the present inventors, if the period $\Lambda$ of the grating 12 is 7 times or more of the wavelength of the infrared light, i.e., $\Lambda/\lambda \geq 7$, then the variation of the diffraction efficiency is small even in the light obliquely incoming, and the incoming converged light causes no problem in the infrared sensor of the invention. In addition, in the case where $\Lambda/\lambda \geq 7$, the line width of the grating to be produced is as large as 35 μm or more, the grating can be produced easily.

In this example, the diffractive optical modulator is produced by using a Si substrate. Alternatively, a substrate obtained by forming a conductive layer on an insulating substrate such as a glass substrate may also be used. Any substrate can be used so long as the substrate is a plate shaped element for supporting the grating and has a portion for functioning as a first electrode for generating an electrostatic force between the grating and the substrate. More preferably, a semiconductor substrate is used, because fine patterning processes such as a photolithography technique and an etching technique which have been developed in the field of producing a semiconductor device are used during the process for producing the grating. This is true of all the following examples.

EXAMPLE 2

Figure 5:
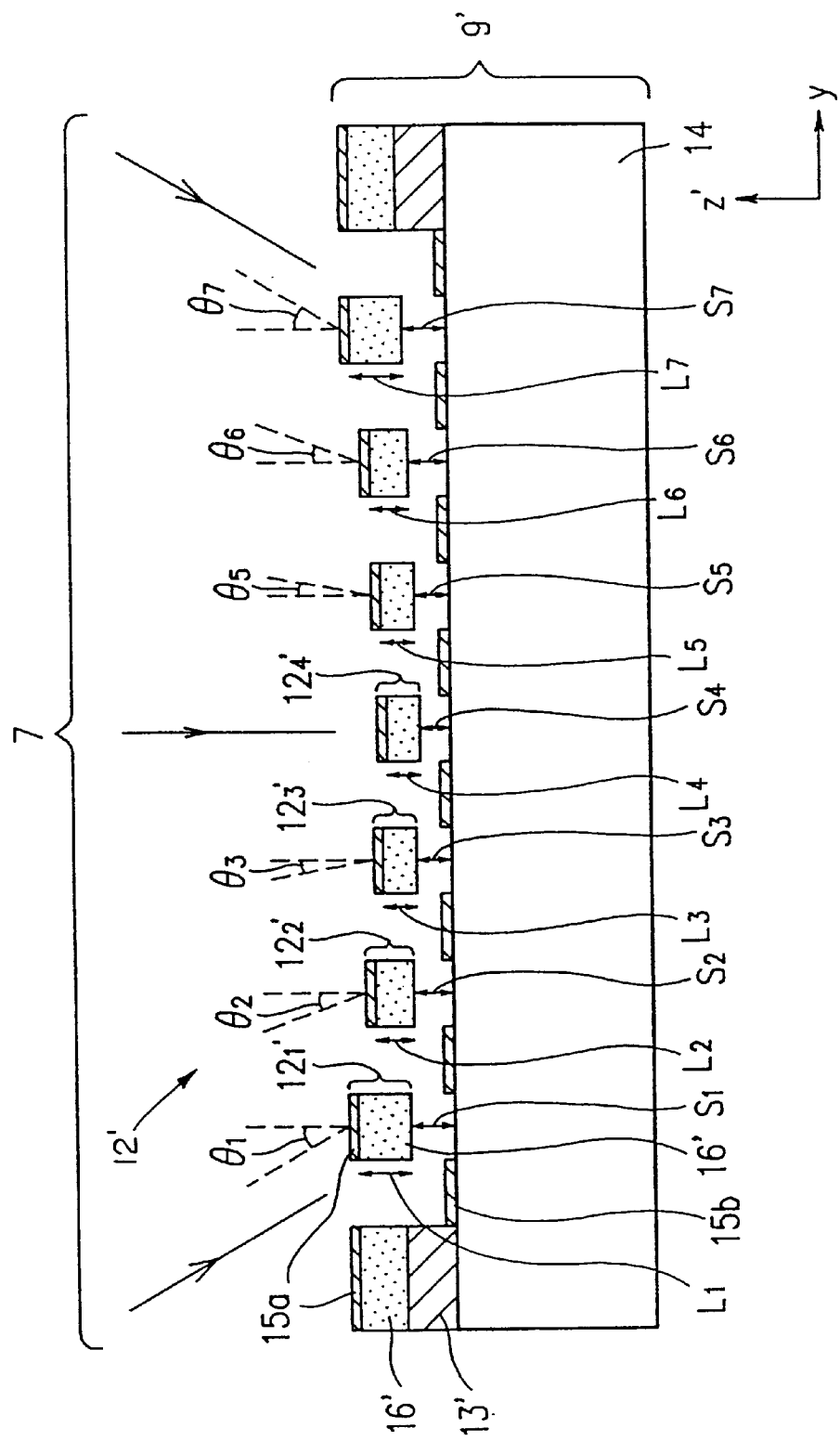
FIG. 5 is a cross-sectional view showing a fundamental configuration of a diffractive optical modulator for an infrared sensor according to a second example of the invention.

Referring to FIG. 5 and FIG. 6, an infrared sensor according to a second example of the invention will be described.

The infrared sensor of this second example is different from the infrared sensor of the first example only in the configuration of the diffractive optical modulator. Therefore, the configuration of the diffractive optical modulator will be described below.

In the diffractive optical modulator 9' to be used in this example, as shown in FIG. 5, the thickness L of the grating 12' is varied in the respective positions. That is to say, the thickness L becomes smallest on the optical axis of the incoming infrared light 7 (the thickness $L_4$ is $\lambda/(4 \cos \theta_t)$, for example), and the thickness gradually increases towards the periphery of the grating 12' ($L_1 > L_2 > L_3 > L_4 < L_5 < L_6 < L_7$). The same relationship is applied to the height S of the space between the grating 12' and the substrate 14. More specifically, the vertically movable distance of the grating 12' is also smallest on the optical axis of the incoming infrared light 7 (the height $S_4$ is $\lambda/(4 \cos \theta_t)$, for example), and the thickness gradually increases towards the periphery of the grating 12' ($S_1 > S_2 > S_3 > S_4 < S_5 < S_6 < S_7$). In FIG. 5, a diffractive optical modulator has seven beams in the grating 12'. However, the number of the beams included in the grating 12' is not limited thereto.

The present inventors have found when the expression $L = \lambda/(4 \cos \theta \cdot \cos \theta_t)$ is satisfied, where L is the thickness of the grating 12' and θ is the incident angle of the infrared light 7 being incident on the portion of the grating 12', and when the expression $S = \lambda/(4 \cos \theta \cdot \cos \theta_t)$ is satisfied, where S is the height of the space, the decrease in the zero-order diffraction efficiency when no voltage is applied and the increase in the zero-order diffraction efficiency when a voltage is applied can be prevented and the modulation efficiency can be large in the peripheral portions onto which the oblique light is incoming. Accordingly, even if $\Lambda/\lambda < 7$ and the period of the grating is small, the modulation efficiency of the zero-order diffracted light 11 can be large. If either the thickness L or the height S has an optimum distribution, the modulation efficiency is improved.

The diffractive optical modulator shown in FIG. 5 is produced in the following manner.

First, an $SiO_2$ thin film 13 is deposited on a Si substrate 14 as a first thin film for defining the distance between the grating 12 and the Si substrate 14. Next, an SiN thin film 16 is deposited as a second thin film to be a grating 12. When the first thin film is being deposited, an elongated shield 18 extending in the x' direction is moved in the y direction between the source 17 for depositing the thin film and the substrate 14 as shown in FIG. 6. By controlling the speed of the shield 18 in the y direction, the deposition amount of the thin film is also controlled. As a result, the thickness of the $SiO_2$ thin film 13 can be controlled. If the speed of the moving shield 18 is set to be low around the center while high in the periphery, the $SiO_2$ thin film 13 whose thickness is distributed as shown in FIG. 6 can be obtained. If a similar process is performed during the deposition of the second thin film, the thickness of the SiN thin film 16 can be distributed in the same way as the thickness of the $SiO_2$ thin film 13 as shown in FIG. 6.

Thereafter, by performing the photolithography process and the etching process, the grating as shown in FIG. 5 can be formed.

On the other hand, by using a shield 18 having a plurality of elongated portions extending in the x' direction, an array of diffractive optical modulators 9' can be produced easily.

EXAMPLE 3

Figure 7A:
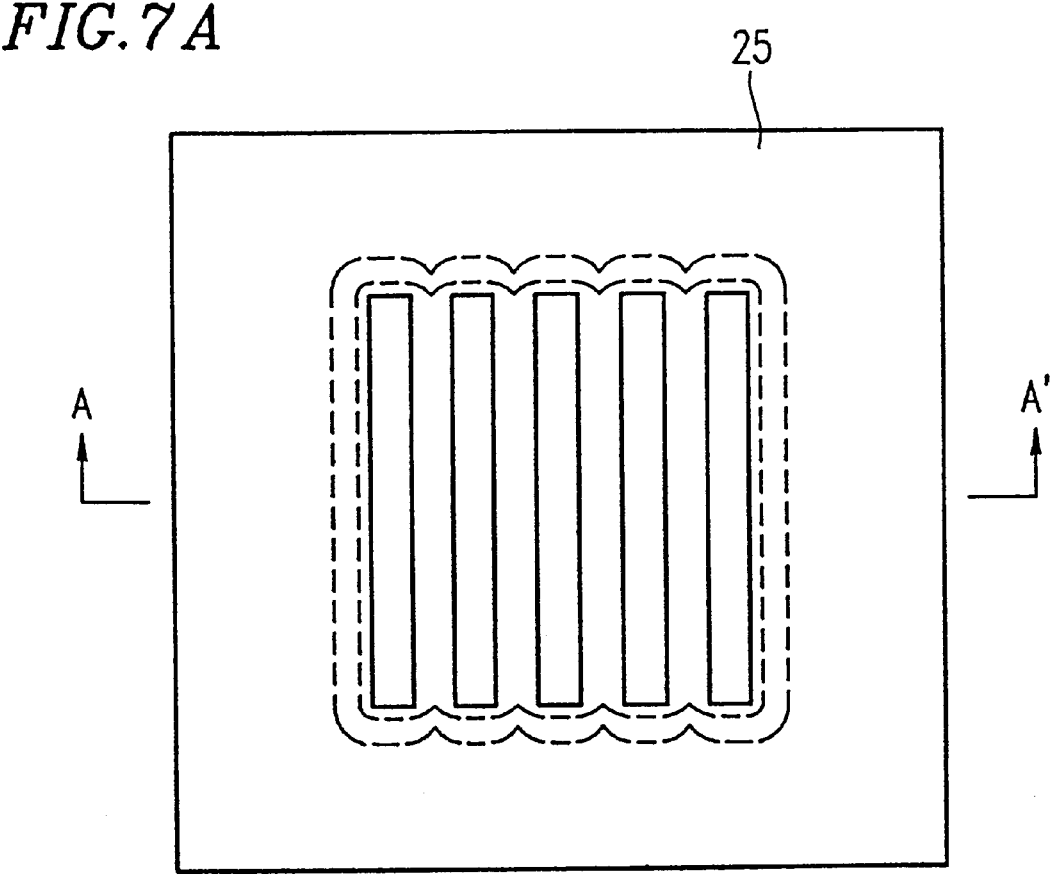
Figure 7B:
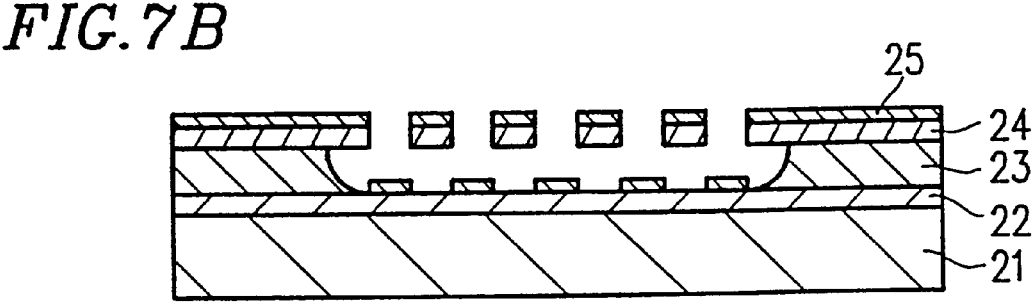
FIG. 7B is a cross-sectional view taken along the line A–A' in FIG. 7A.

Referring to FIGS. 7A and 7B, an infrared sensor according to a third example of the invention will be described. The infrared sensor of this third example is different from the infrared sensor of the first example only in the configuration of the diffractive optical modulator. Therefore, the configuration of the diffractive optical modulator will be described below.

The diffractive optical modulator of this example is designed so as to modulate the infrared light having an incident angle $\theta_t$ of 45 degrees and a wavelength λ of 10.6 μm. Needless to say, a diffractive optical modulator having a different configuration can also be used.

In FIGS. 7A and 7B, the diffractive optical modulator includes: a substrate 21, e.g., a silicon substrate in this example; an insulating layer 22; a spacer layer 23 made of a positive type photoresist having a thickness $\lambda/(4 \cos \theta_t)$ of 3.75 μm, in this example; a conductive thin film 24 obtained by depositing aluminum or the like so as to be 3.75 μm thick; and a reflection film 25 obtained by depositing Au.

Hereinafter, referring to FIGS. 8A to 8G, a method for producing a diffractive optical modulator of this example will be described.

In these figures, the reference numeral 26 denotes a mask for patterning the conductive thin film 24; 27a to 27d denote beams; 28a to 28e denote openings; 29a to 29d denote upper reflection films; and 30a to 30e denote lower reflection films. The grating consists of the upper reflection films 29a to 29d and the beams 27a to 27d.

Figure 8A:
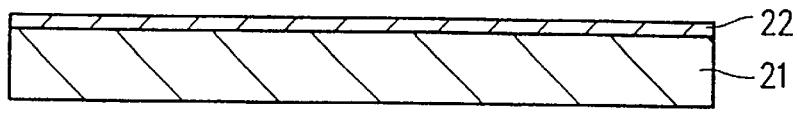
FIGS. 8A to 8G are cross-sectional views showing the process steps for producing the diffractive optical modulator of the third example of the invention.

First, as shown in FIG. 8A, a silicon substrate 21 is thermally oxidized at 1050° C. for an hour, thereby forming an insulating layer 22 formed by the thermally oxidized film having a thickness of 0.1 μm on the silicon substrate 21.

Figure 8B:
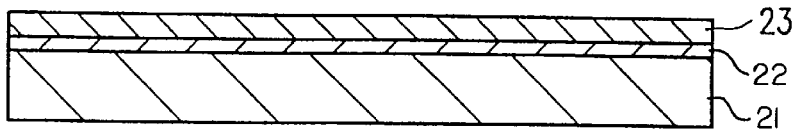

Next, as shown in FIG. 8B, a photoresist is applied onto the insulating layer 22 by a spin-coating method, thereby forming a spacer layer 23. The photoresist is baked at 160° C. for 20 minutes after the photoresist has been applied. In this example, by adjusting the rotation number of the spinner and the viscosity and the temperature of the photoresist, the thickness of the spacer layer 23 after the baking is set to be 3.75 μm.

Figure 8C:
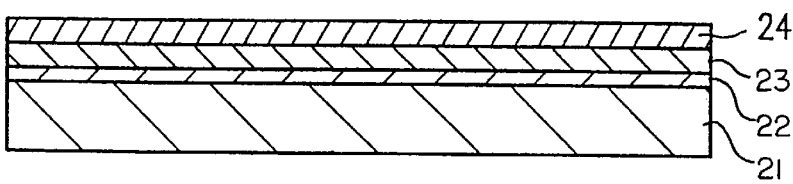

Then, as shown in FIG. 8C, an aluminum film having a thickness of 3.75 μm is deposited on the spacer layer 23 by a vapor deposition method or a sputtering method so as to form a conductive thin film 24.

Figure 8D:
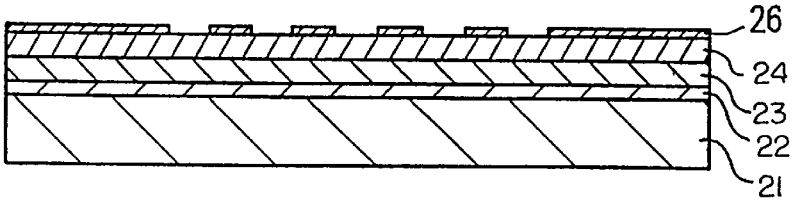

Next, as shown in FIG. 8D, a photoresist is applied onto the conductive thin film 24, and then exposed and developed so as to form a mask 26.

Figure 8E:
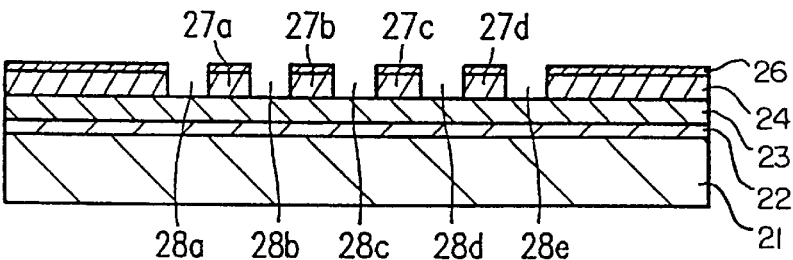

Subsequently, as shown in FIG. 8E, aluminum forming the conductive thin film 24 is removed by a wet etching (hereinafter referred to as a W/E) using an etching solution composed of phosphoric acid, acetic acid and nitric acid, thereby forming the openings 28a to 28e in the conductive thin film 24 and a plurality of beams 27a to 27d made of a conductive material. In this example, in order to control the incoming light having a diameter of 1.8 mm, the length (measured along the direction vertical to the paper sheet) of the beams 27a to 27d is set to be 2 mm.

Figure 8F:
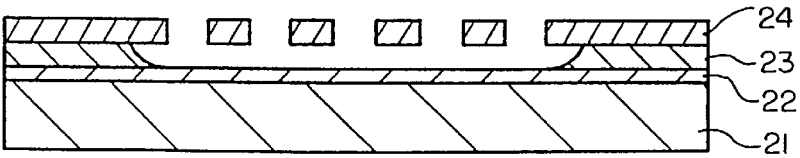

Then, as shown in FIG. 8F, the mask 26 and the spacer layer 23 are removed by an isotropic dry etching (hereinafter, referred to as a D/E). The portions of the spacer layer 23 which are located under the beams 27a to 27d are also isotropically etched, so that the spacer layer 23 remains only in the peripheral portions of the substrate 21 as shown in FIG. 8F, and supports both ends of the beams 27a to 27d.

Figure 8G:
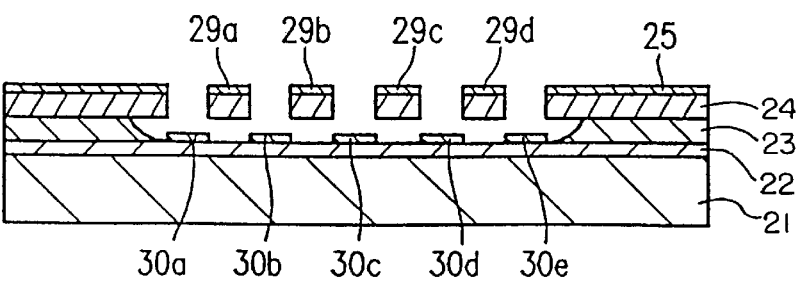

Finally, as shown in FIG. 8G, Au is deposited on the upper surface of the substrate 21, thereby forming a reflection film 25 having a thickness of 0.15 $\mu$m. The reflection film 25 includes the upper reflection films 29a to 29d formed on the beams 27a to 27d and the lower reflection films 30a to 30e which are formed on the upper surface of the insulating film 22 so as to be exposed through the openings 28a to 28e.

In the case of forming a grating in which the length of a beam is considerably longer than the width of the beam, if the spacer layer 23 is removed by the W/E, then the surface tension of the liquid caused during the rinsing and the drying processes unexpectedly sticks the beams onto the substrate side. However, according to the production method of this example, since the spacer layer 23 is selectively removed by the D/E, the problem of the sticking can be totally eliminated, and the production yield can be considerably improved.

The length of a beam is varied how far the spacer layer 23 is etched in the lateral direction from the openings 28a to 28e (or in the vertical direction in FIG. 7A). In the diffractive optical modulator of the invention, unless the length of each of the beams 27a to 27d is set to be constant, the restoration rate of the respective beams are varied when the modulator is driven and the diffraction of the light becomes ununiform for some time. If the spacer layer 23 is removed by the W/E, then the amounts of the etchant flowing under the respective beams 27a to 27d and the time required for removing the etchant at the time of rinsing are slightly different among the respective beams 27a to 27d, so that the resulting lengths of the beams 27a to 27d are varied in the diffractive optical modulator. However, in the case of removing the spacer layer 23 by the D/E, the lengths of the beams 27a to 27d become almost the same.

Next, referring to FIGS. 9A and 9B, the operation of the diffractive optical modulator of this example will be described.

Figure 9A:
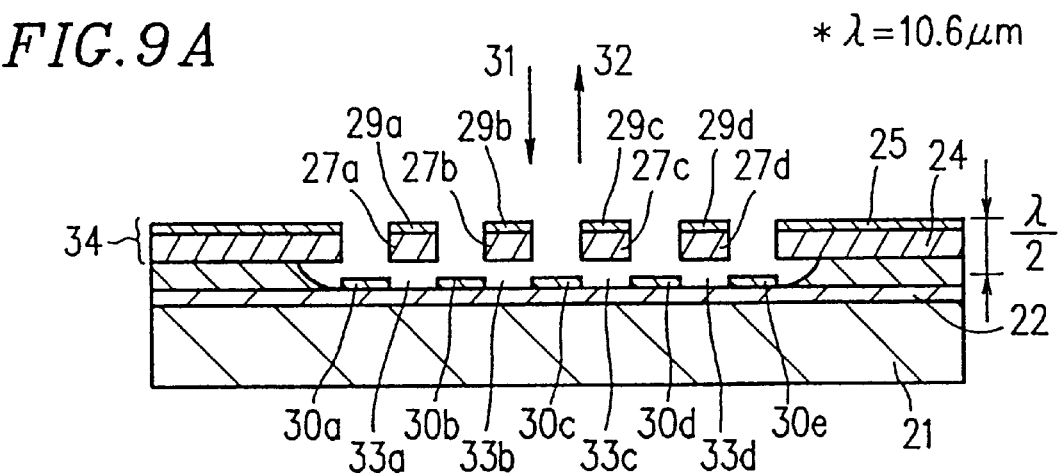
Figure 9B:
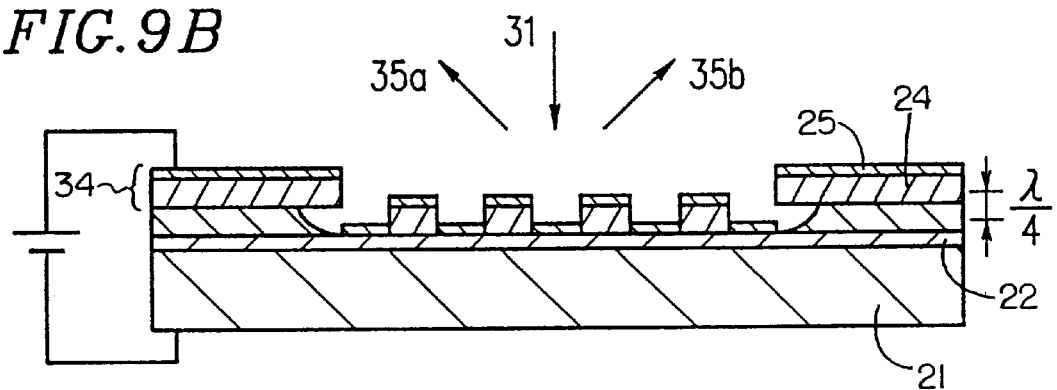
FIG. 9B is a cross-sectional view of the diffractive optical modulator of the third example in a state where a voltage is applied.

In FIGS. 9A and 9B, the reference numeral 31 denotes incoming light; 32 denotes the zero-order diffracted light; 33a to 33d denote the air layers formed by the beams 27a to 27d suspended in the air by the isotropic etching of the spacer layer 23; 34 denotes an upper electrode consisting of the conductive thin film 24 and the reflection film 25; and 35a and 35b denote ± first-order diffracted lights. FIG. 9A shows the state where no voltage is applied between the upper electrode 34 and the substrate 21. The difference in the height between the upper reflection films 29a to 29d and the lower reflection films 30a to 30e is 7.5 $\mu$m, for example.

In the state where a positive voltage is applied between the conductive thin film 24 and the substrate 21, the beams 27a to 27d and the lower electrode, i.e., the substrate 21, form a capacitor which consists of the air layers 33a to 33d and the insulating layer 22. As a result, the beams 27a to 27d serving as the upper electrode are charged with positive charges, while the substrate 21 is charged with negative charges. Since an electrostatic attracting force is caused between these charges, the beams 27a to 27d are pulled toward the insulating layer 22 until the beams 27a to 27d come into contact with the insulating layer 22, as shown in FIG. 9B. In this stage, the difference in the height between the surfaces of the upper reflection films 29a to 29d and those of the lower reflection films 30a to 30e is 3.75 $\mu$m, for example.

As is apparent from the foregoing description, since the diffractive optical modulator of this third example operates in a similar manner to the diffractive optical modulator of the first example, the diffractive optical modulator of the third example also allows for modulating incoming light having a wavelength of 10.6 $\mu$m, for example, by turning on/off the voltage to be applied between the conductive thin film 24 and the substrate 21.

In the diffractive optical modulator of the third example, the distance between the conductive thin film 24 functioning as the upper electrode and the substrate 21 functioning as the lower electrode is smaller than that in the diffractive optical modulator of the first example, so that a stronger electrostatic force is caused between them. Therefore, the modulator of this example can be advantageously driven at a lower voltage.

As described above, according to the method of this example, the spacer layer is formed by an organic film and is removed by the D/E, so that the beams are not sticked onto the substrate during the rinsing and drying processes, and the spacer layer can be removed uniformly with satisfactory reproducibility. Consequently, a plurality of beams having the same length are formed, and the variation of the operation can be eliminated. In addition, as compared with the diffractive optical modulator of the first example, the gap between the upper and the lower electrodes becomes smaller in the diffractive optical modulator of the third example, so that the modulator of the third example can be driven at a lower voltage.

EXAMPLE 4

Figure 10:
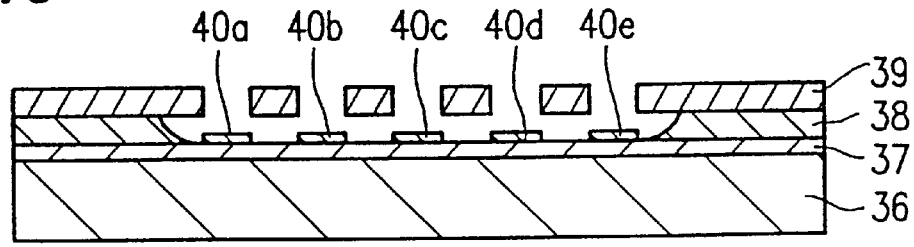
FIG. 10 is a cross-sectional view of a diffractive optical modulator for an infrared sensor according to a fourth example of the invention.

Referring to FIG. 10, an infrared sensor according to a fourth example of the invention will be described. The infrared sensor of this fourth example is different from the infrared sensor of the first example only in the configuration of the diffractive optical modulator. Therefore, the configuration of the diffractive optical modulator will be described below.

In FIG. 10, the diffractive optical modulator includes: a substrate 36, e.g., a silicon substrate in this example; an insulating layer 37; a spacer layer 38 made of a photoresist having a thickness of 3.75 $\mu$m, in this example; a conductive thin film 39, functioning as both the upper electrode and the upper reflection film, obtained by depositing aluminum or the like so as to be 3.75 $\mu$m thick, in this example; and lower reflection films 40a to 40e made of the same material as that of the conductive thin film 39 or the material having substantially the same reflectance as that of the conductive thin film 39, e.g., aluminum in this example.

Hereinafter, referring to FIGS. 11A to 11I, a method for producing a diffractive optical modulator of this example will be described. In FIGS. 11A to 11I, the reference numeral 41 denotes a reflection film and 42a to 42e denote masks.

Figure 11A:
FIGS. 11A to 11I are cross-sectional views showing the process steps for producing the diffractive optical modulator of the fourth example of the invention.

First, as shown in FIG. 11A, a silicon substrate 36 is thermally oxidized at 1050° C. for an hour, thereby forming an insulating layer 37 constituted by the thermally oxidized film having a thickness of 0.1 μm on the silicon substrate 36.

Figure 11B:
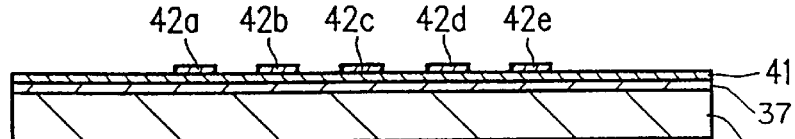

Next, as shown in FIG. 11B, aluminum is deposited on the insulating layer 37 by a vapor deposition method so as to be 0.15 μm thick, thereby forming a reflection film 41. A photoresist is applied onto the reflection film 41 by a spin-coating method, and then exposed and developed, thereby forming the masks 42a to 42e.

Figure 11C:

Subsequently, as shown in FIG. 11C, aluminum forming the reflection film 41 is removed by a W/E using an etching solution composed of phosphoric acid, acetic acid and nitric acid, for example.

Figure 11D:
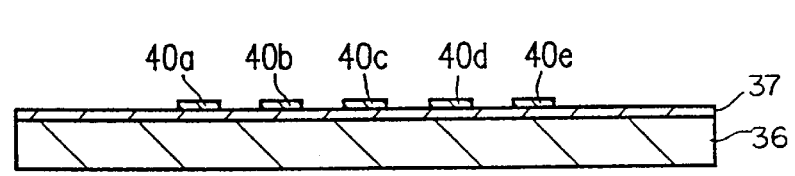

Then, as shown in FIG. 11D, the masks 42a to 42e are removed, thereby forming the lower reflection films 40a to 40e.

Figure 11E:
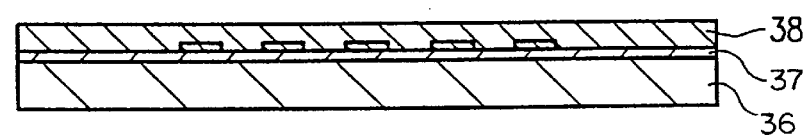

Next, as shown in FIG. 11E, a photoresist is applied by a spin-coating method, and then baked, thereby forming a spacer layer 38. In this example, by adjusting the rotation number of the spinner and the viscosity and the temperature of the photoresist, the thickness of the spacer layer 38 after the baking is set to be 3.75 μm, for example, and the surface of the spacer layer 38 is made flat.

Figure 11F:
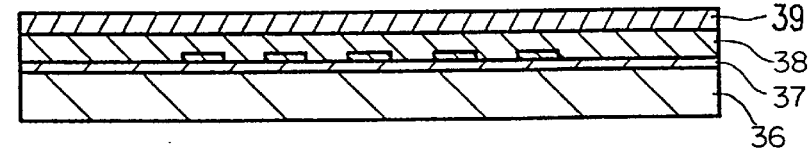

Then, as shown in FIG. 11F, an aluminum film having a thickness of 3.9 μm, for example, is deposited on the spacer layer 38 by a vapor deposition method, thereby forming the conductive thin film 39. Since the thickness of the lower reflection films 40a to 40e is 0.15 μm, for example, the thickness of the conductive thin film 39 is also set to be larger than 3.75 μm, for example, by 0.15 μm, i.e., 3.9 μm.

Figure 11G:
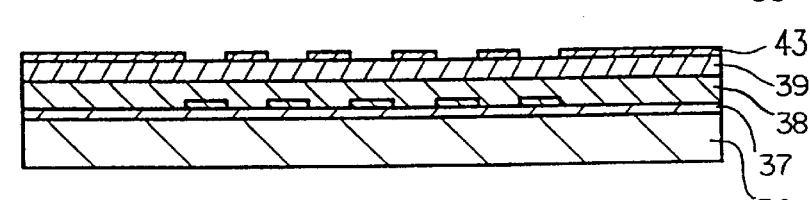

Thereafter, as shown in FIG. 11G, a photoresist is applied onto the conductive thin film 39, and then exposed and developed, thereby forming the mask 43.

Figure 11H:
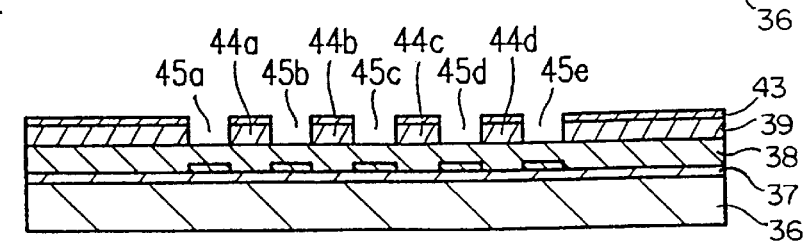

Subsequently, as shown in FIG. 11H, aluminum forming the conductive thin film 39 is removed by a W/E using an etching solution composed of phosphoric acid, acetic acid and nitric acid, for example, thereby forming the beams 44a to 44d and the openings 45a to 45e.

Figure 11I:
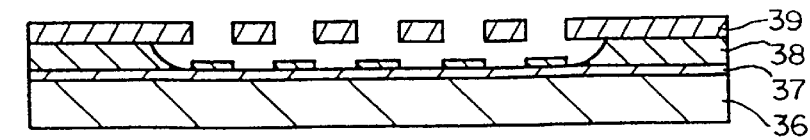

Finally, as shown in FIG. 11I, the mask 43 is removed by the D/E, and at the same time, the portions of the spacer layer 38 under the beams 44a to 44d are also isotropically etched.

By performing the above process steps, the diffractive optical modulator having a configuration shown in FIG. 10 is completed.

Figure 12A:
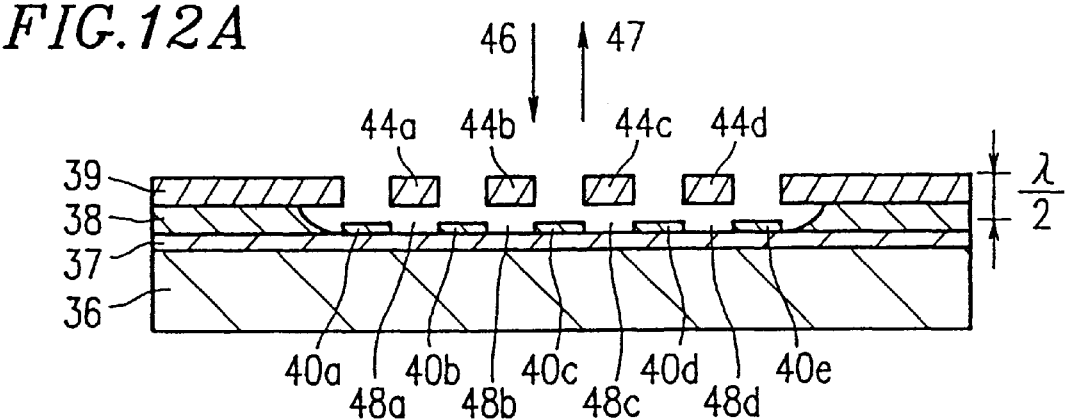
Figure 12B:
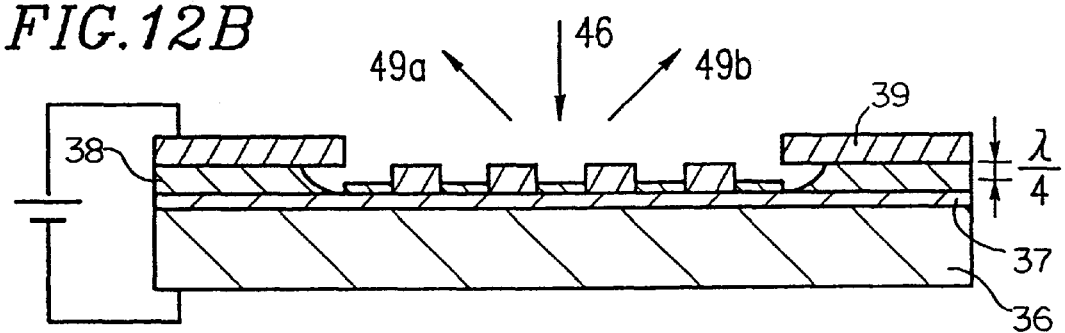
FIG. 12B is a cross-sectional view of the diffractive optical modulator of the fourth example in a state where a voltage is applied.

Hereinafter, the operation of the diffractive optical modulator having the above-described configuration will be described with reference to FIGS. 12A and 12B. In FIGS. 12A and 12B, the same components as those shown in FIG. 10 are denoted by the same reference numerals and the description thereof will be omitted herein. In FIGS. 12A and 12B, the reference numeral 46 denotes incoming light; 47 denotes the zero-order diffracted light; 48a to 48d denote the air layers formed by the beams 44a to 44d suspended in the air by the isotropic etching of the spacer layer 38; and 49a and 49b denote ± first-order diffracted lights. FIG. 12A shows the state where no voltage is applied between the conductive thin film 39 and the substrate 36. The difference in the height between the surfaces of the beams 44a to 44d and those of the lower reflection films 40a to 40e is 7.5 μm, for example.

In the state where a positive voltage is applied between the conductive thin film 39 and the substrate 36, the beams 44a to 44d and the lower electrode, i.e., the substrate 36, form a capacitor so as to interpose the air layers 48a to 48d and the insulating layer 37. As a result, the beams 44a to 44d serving as the upper electrode are charged with positive charges while the substrate 36 is charged with negative charges. Since an electrostatic attracting force is caused between these charges, the beams 44a to 44d are pulled toward the insulating layer 37 until the beams 44a to 44d come into contact with the insulating layer 37, as shown in FIG. 12B. In this stage, the difference in the height between the surfaces of the beams 44a to 44d and those of the lower reflection films 40a to 40e is 3.75 μm, for example.

As is apparent from the foregoing description, since the diffractive optical modulator of this fourth example operates in a similar manner to the diffractive optical modulator of the first example, the diffractive optical modulator of the fourth example also allows for modulating incoming light having a wavelength of 10.6 μm, for example, by turning on/off the voltage to be applied between the conductive thin film 39 and the substrate 36.

In this example, since the lower reflection films are formed beforehand, the beams can function as the upper reflection film and an ultimate reflection film need not be deposited. Accordingly, especially in the case where a thick reflection film is required, an inadequate operation caused by the contact between the lower reflection films and the reflection film attached to the sides of the beams can be completely eliminated.

The conductive thin film is made of aluminum in this example. Needless to say, the conductive thin film may be made of other materials. In this example, the aluminum film is deposited by a vapor deposition method. However, the aluminum film may be deposited by a sputtering method or a plating method. The spacer layer is made of a photoresist. Alternatively, the spacer layer may be made of an organic material such as polyimide.

EXAMPLE 5

Figure 13:
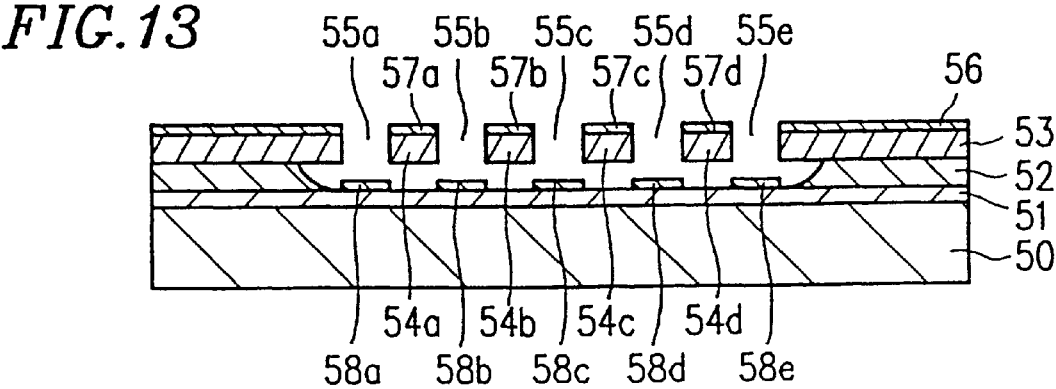
FIG. 13 is a cross-sectional view of a diffractive optical modulator for an infrared sensor according to a fifth example of the invention.

Referring to FIG. 13, an infrared sensor according to a fifth example of the invention will be described.

In FIG. 13, the diffractive optical modulator of the fifth example includes: a substrate 50, e.g., a silicon substrate in this example; an insulating layer 51 which consists of a thermally oxidized film having a thickness of 0.1 μm, for example, obtained by thermally oxidizing the substrate 50, and a nitride film having a thickness of 0.5 μm, for example, obtained by a low-pressure chemical vapor deposition (LPCVD) method; a spacer layer 52 having a thickness of 3.75 μm, for example, obtained by depositing a silicon oxide film by the LPCVD method; a dielectric layer 53 having a thickness of 3.75 μm, for example, to be obtained by depositing a nitride film by the LPCVD method, the dielectric layer 53 being patterned so as to form the beams 54a to 54d supported at both ends thereof and having a reduced residual tensile stress, e.g., about 200 MPa, by using a silicon-rich composition for the nitride film; the beams 54a to 54d, both ends of which are supported by the spacer layer 52, suspended in the air; openings 55a to 55e; and a reflection film 56 obtained by depositing an Au thin film having a thickness of 0.15 μm, for example, by a vapor deposition method. As shown in FIG. 13, the reflection film 56 forms not only the upper reflection films 57a to 57d on the surfaces of the beams 54a to 54d, but also the lower reflection films 58a to 58e on the surfaces of the insulating layer 51 through the openings 55a to 55e. A grating is formed by these upper reflection films 57a to 57d and the beams 54a to 54d.

Hereinafter, referring to FIGS. 14A to 14G, a method for producing a diffractive optical modulator of this example will be described.

Figure 14A:
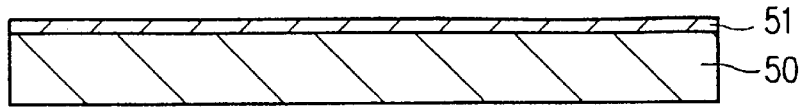
FIGS. 14A to 14G are cross-sectional views showing the process steps for producing the diffractive optical modulator of the fifth example of the invention.

First, as shown in FIG. 14A, a silicon substrate 50 is thermally oxidized at 1050° C. for an hour, for example, thereby forming a thermally oxidized film having a thickness of 0.1 μm. Thereafter, a silicon nitride film having a thickness of 0.5 μm, for example, is deposited thereon by the LPCVD, thereby forming an insulating layer 51.

Figure 14B:
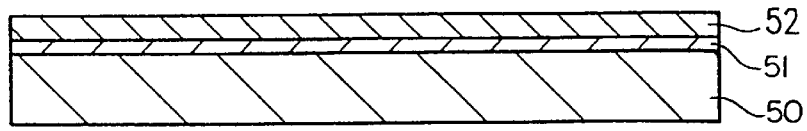

Next, as shown in FIG. 14B, a spacer layer 52 formed by a silicon oxide film is deposited on the insulating layer 51 by the LPCVD.

Figure 14C:
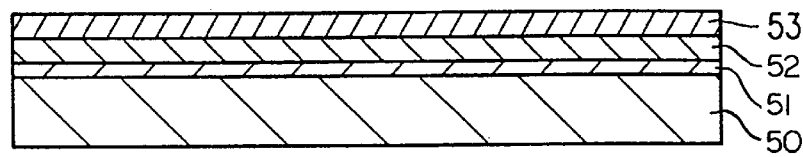

Then, as shown in FIG. 14C, a silicon-rich silicon nitride film is deposited on the spacer layer 52 by the LPCVD, thereby forming the dielectric layer 53.

Figure 14D:
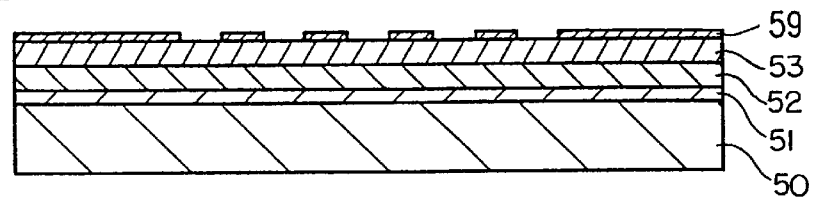

Subsequently, as shown in FIG. 14D, a photoresist 59 is applied onto the dielectric layer 53 by a spin-coating method, and then exposed and developed, thereby forming a mask in a predetermined shape.

Figure 14E:
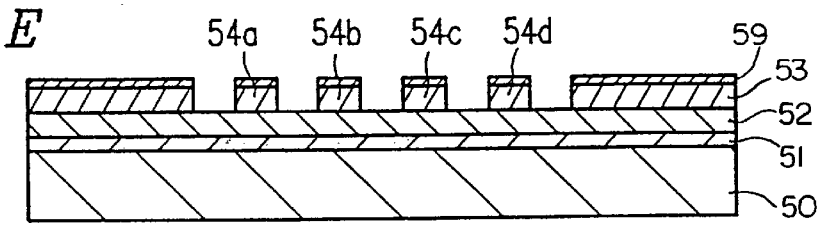

Next, as shown in FIG. 14E, the dielectric layer 53 is patterned by the D/E, thereby forming the beams 54a to 54d.

Figure 14F:
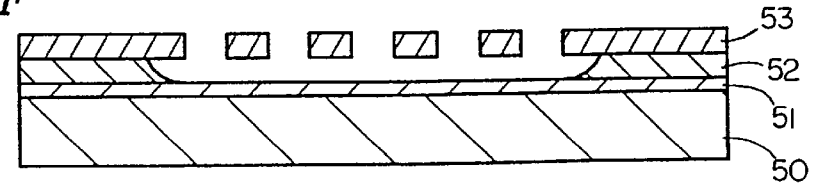

Then, as shown in FIG. 14F, the photoresist 59 is removed, and the spacer layer 52 is removed by the W/E using buffered hydrofluoric acid so as to remove the spacer layer 52 under the beams 54a to 54d and form the beams whose both ends are supported.

Figure 14G:
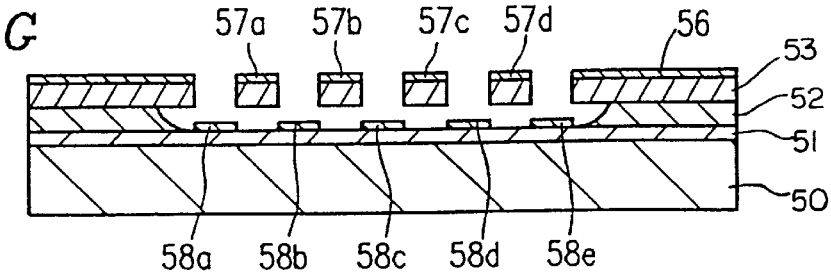

Finally, as shown in FIG. 14G, a reflection film 56 made of Au having a thickness of 0.15 μm, for example, is deposited by a sputtering method, thereby forming the upper reflection films 57a to 57d and the lower reflection films 58a to 58e. By performing the above process steps, the diffractive optical modulator having the configuration shown in FIG. 13 is completed.

Since the diffractive optical modulator having the above configuration operates in a similar manner to the diffractive optical modulators of the third or the fourth example, the diffractive optical modulator of the fifth example also allows for modulating incoming light having a wavelength of 10.6 μm, for example, by turning on/off the voltage to be applied between the reflection film 56 functioning as the upper electrode and the substrate 50 functioning as the lower electrode, as shown in FIG. 13.

In the diffractive optical modulator of this example, since a nitride film is used as the material for the beams, a residual tensile stress (of, for example, 200 MPa) is caused. As a result, the driving voltage becomes considerably higher as compared with that of the diffractive optical modulator of the third or the fourth example. However, a beam having a length much larger than the thickness thereof can be advantageously formed. Therefore, incoming light having a large diameter can be modulated. In the diffractive optical modulator of the first example having no insulating layer 51, when a reflection film is being deposited, the reflection film unexpectedly reaches the sides of the beams, so that the upper reflection films become electrically conductive with the substrate when the modulator is driven. As a result, an electric current is generated therebetween, thereby preventing the modulator from operating adequately, and the production yield is disadvantageously reduced. However, in the diffractive optical modulator of this fifth example, an insulating layer 51 is provided between the lower reflection films 58a to 58e and the substrate 50. Accordingly, when the reflection film 56 is being deposited, even if the reflection film 56 reaches the sides of the beams 54a to 54d, and the upper reflection films 57a to 57d become electrically conductive with the lower reflection films 58a to 58e, an electrical conduction between the upper reflection films 57a to 57d and the substrate 50 can be totally eliminated, because the lower reflection films 58a to 58e are electrically insulated with the substrate 50. Consequently, it is possible to provide a diffractive optical modulator operating appropriately, and improve the production yield.

As described above, in the diffractive optical modulator of the first example, when the reflection film is being deposited, the reflection film reaches the sides of the substrate, and when the modulator is driven, the upper reflection films come into contact with the lower reflection films, so that a short-circuit is generated, and the modulator tends to operate inadequately. However, in the diffractive optical modulator of this fifth example, since the insulating layer is provided between the lower reflection films and the substrate, the modulator can operate stably.

Next, referring to FIGS. 9A and 9B and FIGS. 15A to 15C, a method for applying a voltage to the diffractive optical modulator of the invention will be described.

Figure 15A:
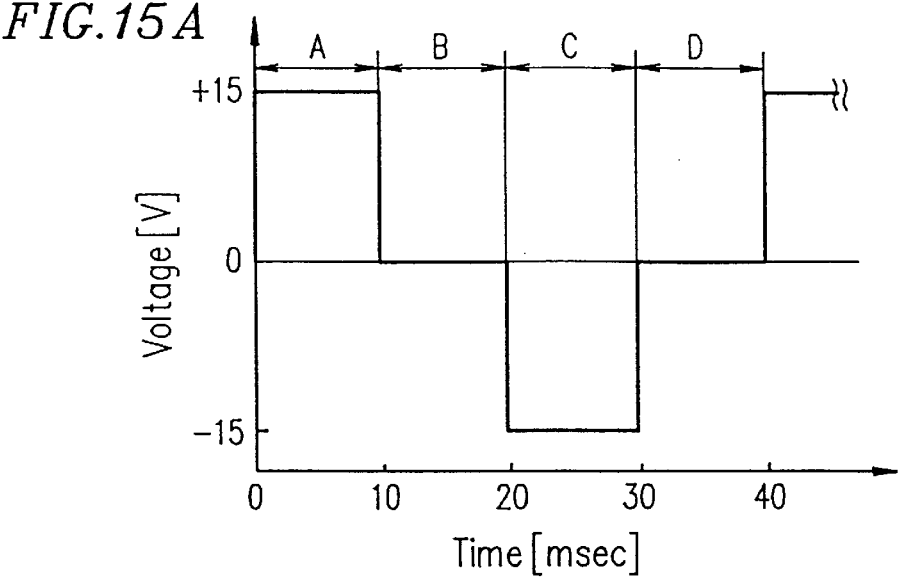
FIGS. 15A to 15C show exemplary waveforms of the driving voltage to be applied to the diffractive optical modulator of the invention.

FIG. 15A shows the waveform of the voltage to be applied to the diffractive optical modulator by a voltage application device. The driving voltage having such a waveform corresponds to the case where the modulation of the light is generated at a period of 20 msec (corresponding to a frequency of 50 Hz), for example, as described in the third or the fourth example.

The driving voltage shown in FIG. 15A has a waveform in which the polarity in the region AB is opposite to the polarity in the region CD, but the levels in these two regions AB and CD are the same. The region A shown in FIG. 15A corresponds to the state shown in FIG. 9B where a voltage of +15 V, for example, is applied between the upper electrode 34 and the substrate 21. In this case, as described in the third, fourth or fifth example, the upper electrode 34 is charged with positive charges, while the substrate 21 is charged with negative charges. As a result, the beams 27a to 27d are deflected, and sticked onto the insulating layer 22, as shown in FIG. 9B. The next region B shown in FIG. 15A corresponds to the state where no voltage is applied and almost all the charges are removed. However, the present inventors have found that some of the charges remain as the residual charges. Since the restoration force of the beams 27a to 27d is stronger than the sticking force of the residual charges, the beams 27a to 27d are restored to the initial positions thereof, and suspended in the air as shown in FIG. 9A. In order to operate the beams 27a to 27d by the application of a voltage having the same polarity next time, a voltage higher than the previous voltage is required to be applied because of the effects of the residual charges. Otherwise, the beams 27a to 27d are not sticked onto the insulating layer 22. Therefore, in the next region C, by applying a voltage having an opposite polarity to that of the voltage applied in the region A, e.g., a voltage of -15 V, the residual charges remaining in the respective electrodes are forcibly removed, and at the same time, the charges having an opposite polarity are charged. As a result, the beams 27a to 27d are sticked onto the insulating layer 22 again. The region D as well as the region B corresponds to the state where no voltage is applied, and some of the charges also remain as the residual charges in the region D.

As described above, in the diffractive optical modulator of this example, the residual charges caused when the driving voltage is applied can be removed by alternately applying voltages having opposite polarities. In a conventional diffractive optical modulator, since the residual charges increase as a modulator is driven more times, the necessary driving voltage is required to be higher to remove the increasing residual charges. However, in this example, such a problem can be solved.

The same operation can be obtained if the application of a voltage is begun by a voltage having an opposite polarity to that of the voltage shown in FIG. 15A.

Figure 15B:
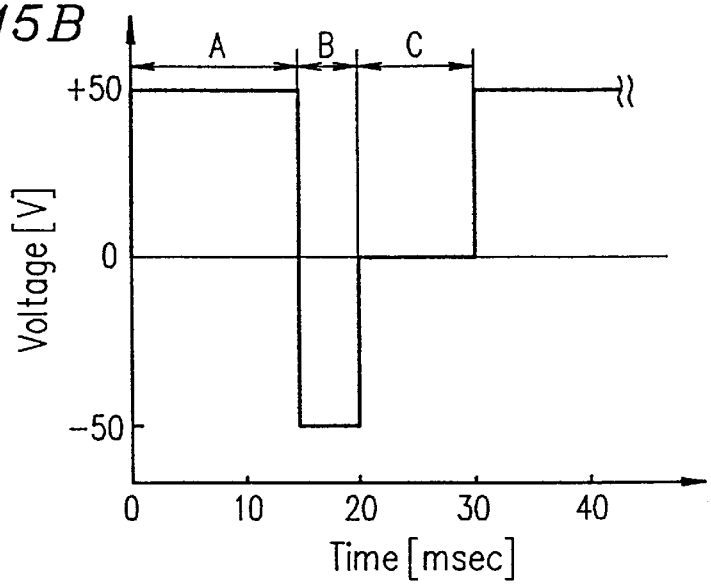

FIG. 15B shows a waveform of another driving voltage.

The region A shown in FIG. 15B corresponds to the state shown in FIG. 9B where a voltage of +50 V, for example, is applied between the upper electrode 34 and the substrate 21. In this case, the upper electrode 34 is charged with positive charges, while the substrate 21 is charged with negative charges. As a result, the beams 27a to 27d are deflected, and sticked onto the insulating layer 22, as shown in FIG. 9B. The next regions B and C shown in FIG. 15B correspond to the state shown in FIG. 9A. In the region B, in order to promote the removal of the residual charges, a voltage having an opposite polarity, e.g., a voltage of −50 V, is applied during an initial short period.

Figure 15C:
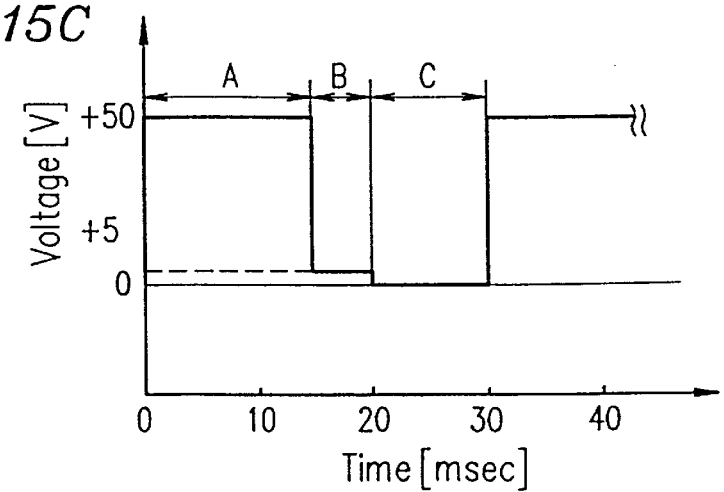

FIG. 15C shows a waveform of still another driving voltage. The voltage waveform shown in FIG. 15C is different from the voltage waveform shown in FIG. 15B in that a voltage not having an opposite polarity but lower than the voltage in the region A is applied during an initial short period in the region B. By applying a voltage having such a waveform, it is possible to promote the removal of the charges and to restore the beams at a high speed.

EXAMPLE 6

Hereinafter, referring to FIG. 16, an infrared sensor according to a sixth example of the invention will be described. The infrared sensor of this example is designed so as to detect infrared light having a wavelength of 10 μm, for example.

The infrared sensor of this example includes: a lens provided in the opening of a seal case; and a diffractive optical modulator included in the seal case as well as a pyroelectric element. The size of the infrared sensor of this example is reduced as compared with a conventional infrared sensor using a chopper. In addition, the diffractive optical modulator itself can be driven at a low power consumption, and is excellent in the durability and the response speed.

First, the configuration of the infrared sensor of this example will be described.

Figure 16:
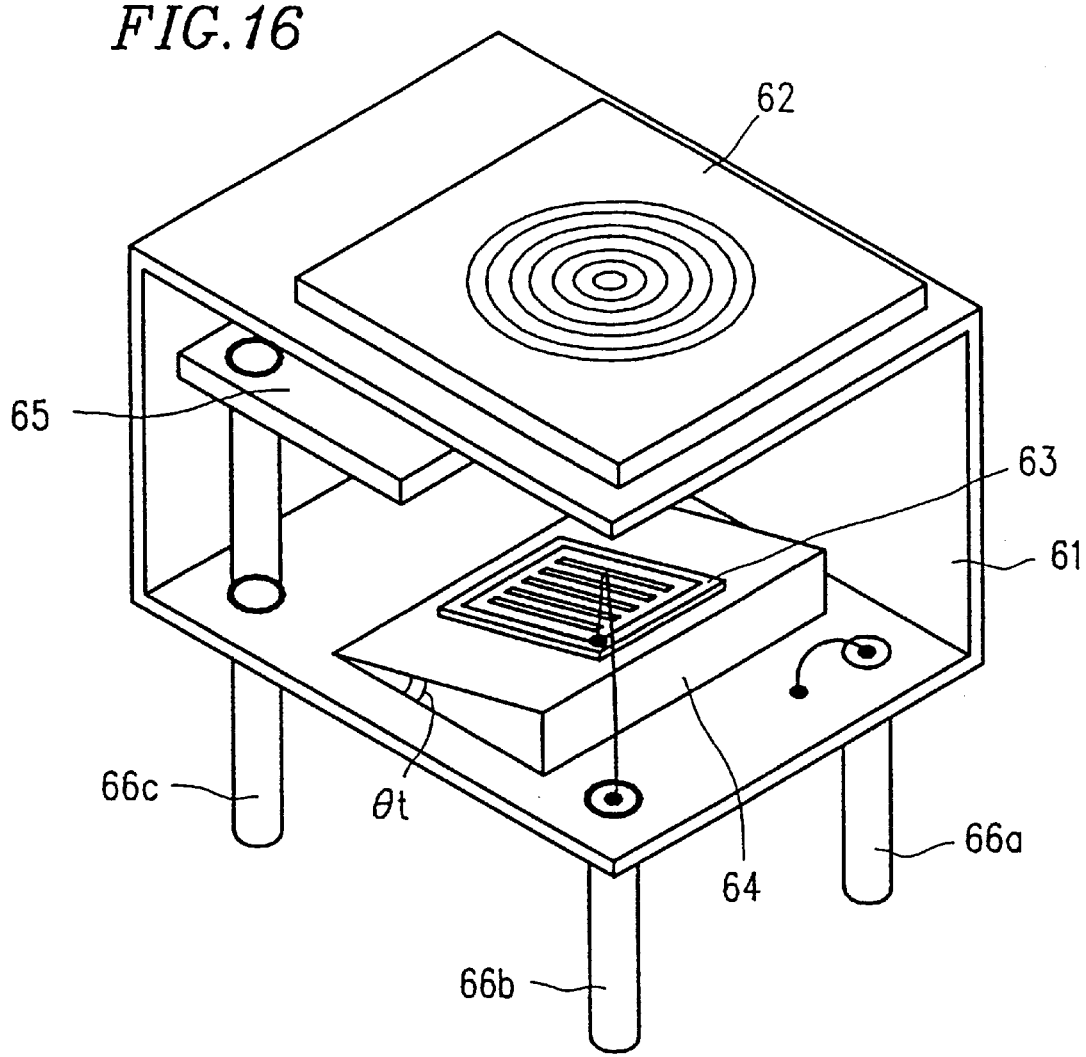
FIG. 16 is a perspective view showing a configuration and an arrangement for an infrared sensor according to a sixth example of the invention.

In FIG. 16, the reference numeral 61 denotes a seal case. A part of the seal case 61 is omitted herein for the purpose of the illustration of the inside thereof. A lens 62 is a diffractive lens having an aperture of 3 mm and a focal length of 6 mm, for example, which is formed on a substrate made of a material having transparency in the infrared region, e.g., silicon. A diffractive optical modulator 63 modulates infrared light having a wavelength of 10 μm, for example. A spacer 64 has an inclination angle of $\theta_t$. Though not shown in FIG. 16, on the reverse side of a supporting plate 65, electronic parts such as a pyroelectric element and a signal amplifier are disposed. Electrode pins are denoted by 66a to 66d, however, the electrode pin 66d is not shown in FIG. 16, because the electrode pin 66d is disposed in an invisible position in FIG. 16. The electrode pins 66a to 66d are used for grounding, an application of a voltage to the diffractive optical modulator 63, and a supply of power or an output of a signal to a pyroelectric element and other electronic parts not shown in FIG. 16.

Figure 17:
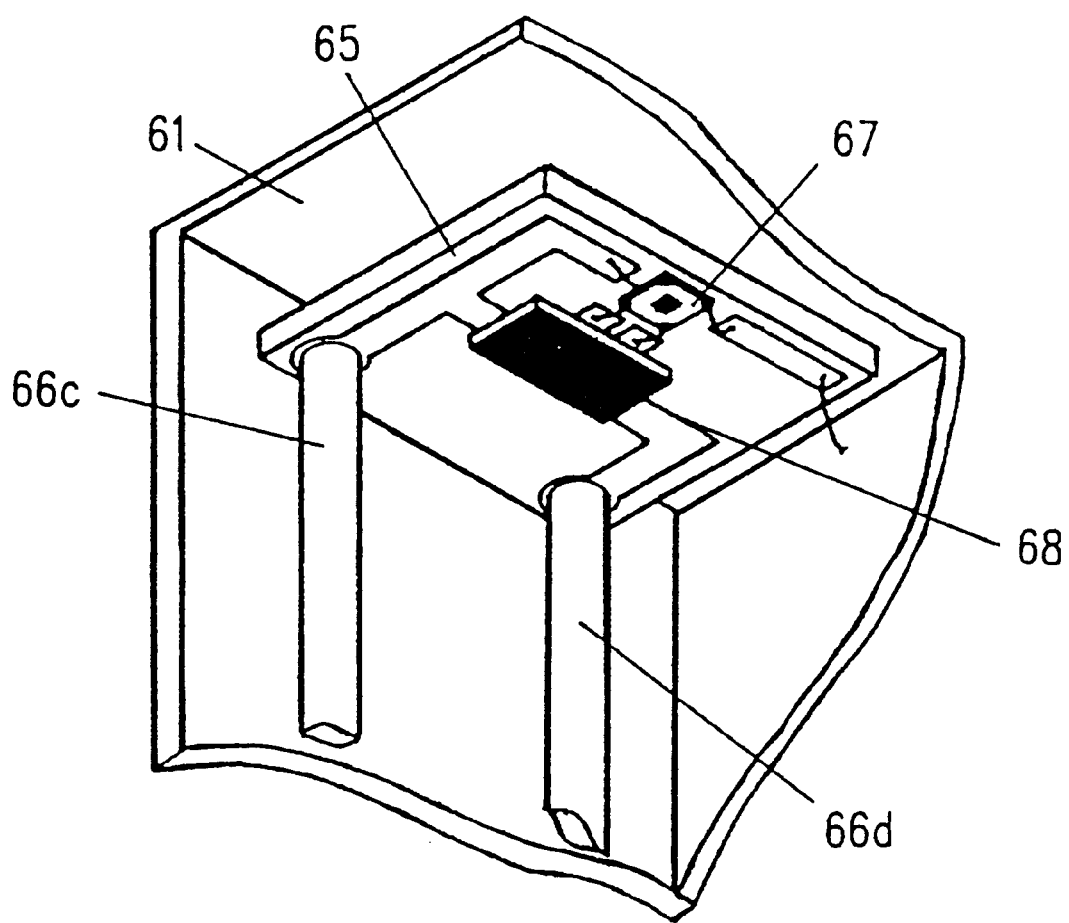
FIG. 17 is a perspective view showing a fundamental configuration of the devices disposed on the supporting plate of the infrared sensor according to the sixth example of the invention.

FIG. 17 is a perspective view showing the supporting plate 65 seen from the bottom side in FIG. 16. In FIG. 17, the same components as those in FIG. 16 are denoted by the same reference numerals, and the description thereof will be omitted herein. In FIG. 17, a pyroelectric element is denoted by 67, and a signal amplifier for amplifying the signal output from the pyroelectric element 67 is denoted by 68.

Figure 18:
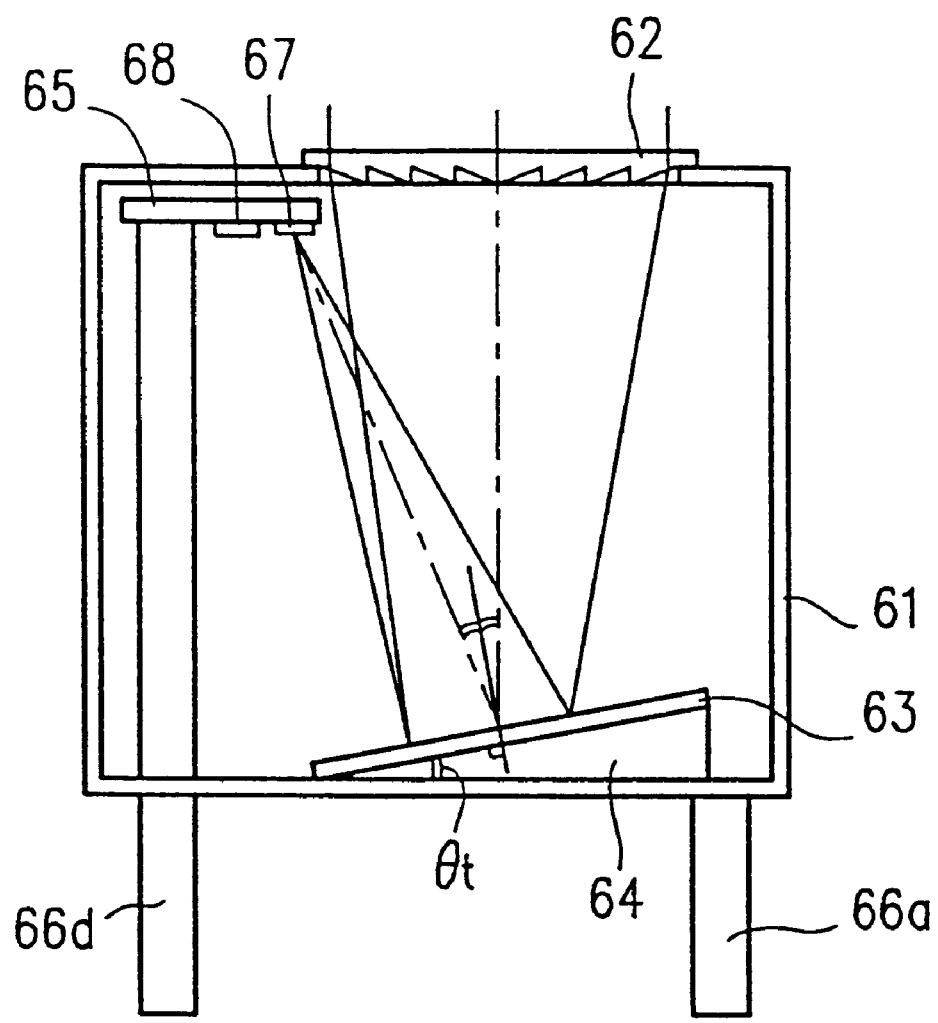
FIG. 18 is a side view showing a fundamental configuration of an infrared sensor according to the sixth example of the invention.

FIG. 18 is a side view showing a fundamental configuration of the infrared sensor of this example. The pyroelectric element 67 is disposed in the vicinity of the end of the supporting plate 65, whereby the inclination angle $\theta_t$ is set to be as small as possible. As will be described in detail later, the smaller the inclination angle $\theta_t$ is, the lower the driving voltage becomes. In this case, if the focal length of the lens 62 is 10 mm, for example, then the inclination angle $\theta_t$ becomes 17 degrees. As a result, the increase in the driving voltage is suppressed to about 10% as compared with the case where the inclination angle $\theta_t$ is zero. In addition, the infrared sensor of this example has a simple configuration. That is to say, the pyroelectric element 67 and the signal amplifier 68 are disposed on the supporting plate 65, and the supporting plate 65 is supported by at least one of the electrode pins 66a to 66d. Accordingly, it is not particularly necessary to provide complicated lines and the sealing can be performed easily.

Figure 19A:
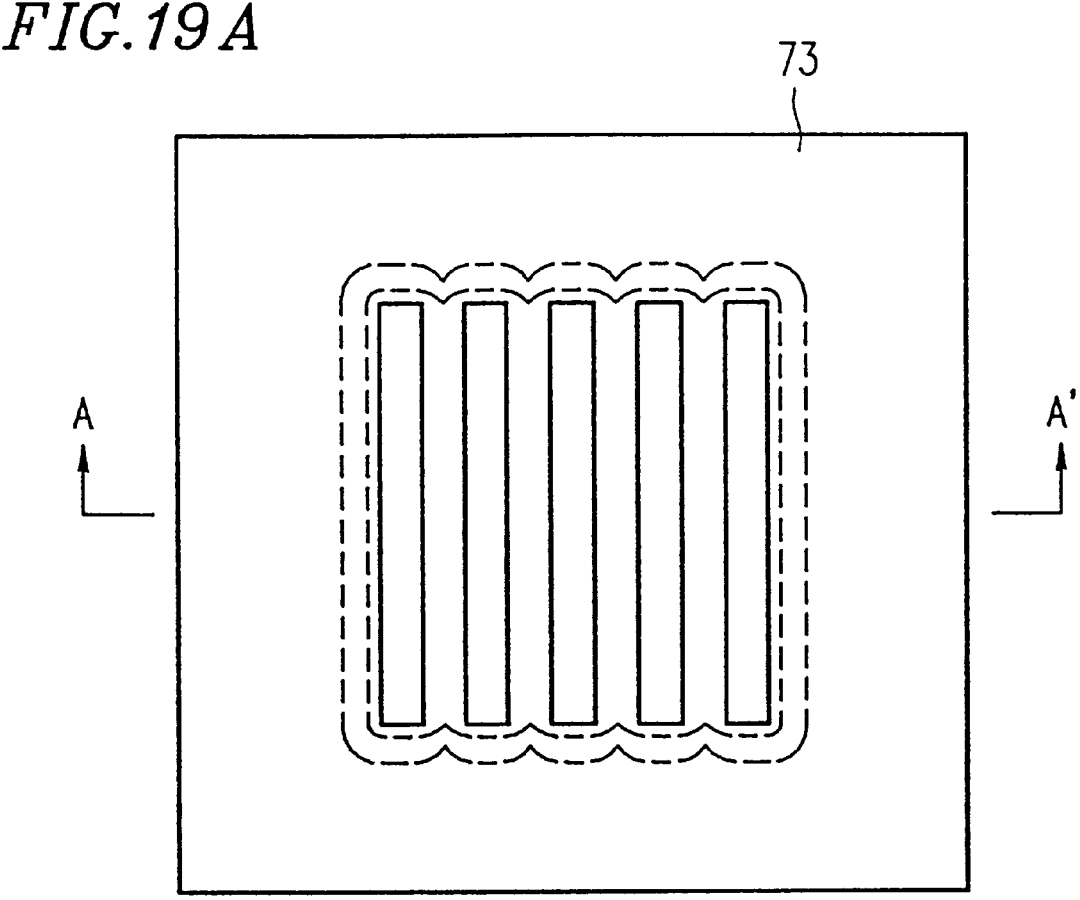
Figure 19B:
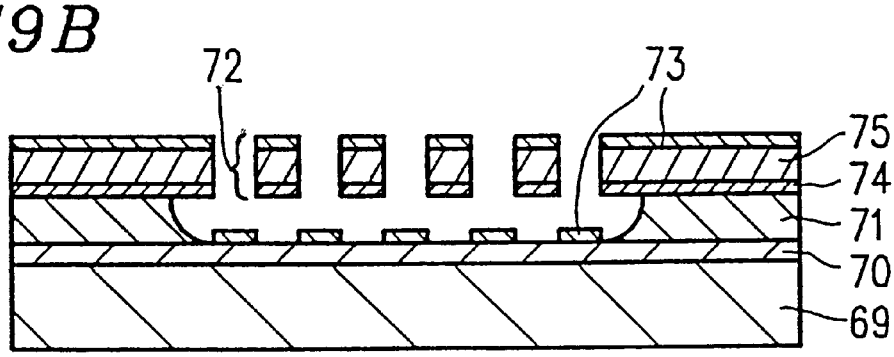
FIG. 19B is a cross-sectional view taken along the line A–A' in FIG. 19A.

FIG. 19A is a plan view showing a diffractive optical modulator of this example, while FIG. 19B is a cross-sectional view taken along the line A–A' in FIG. 19A. In FIGS. 19A and 19B, the diffractive optical modulator includes: a substrate 69, e.g., a silicon substrate; an insulating layer 70 formed by an oxide film having a thickness of 0.1 μm obtained by thermally oxidizing the silicon substrate 69; a spacer layer 71 obtained by applying polyimide by a spin-coating method and baking the applied polyimide; and beams 72. The present inventors have found that both the optimal thickness of the spacer layer and that of the beams for maximizing the degree of the modulation are $\lambda/(4 \cos \theta_t)$, where $\lambda$ is the wavelength of the light to be detected. As can be understood from this expression, the larger the inclination angle $\theta_t$ becomes, the larger the optimal thickness of the spacer layer and the beams of the diffractive optical modulator becomes. For example, if $\lambda$ is 10 μm and $\theta_t$ is 25 degrees, then the thickness of the respective layers is 2.8 μm. And if $\theta_t$ is 45 degrees, then the thickness is 3.5 μm. The diffractive optical modulator further includes: a reflection film 73 obtained by depositing Au or the like by a vapor deposition method so as to be 0.1 μm thick; a non oxidized conductive thin film 74 made of a material which is not likely to be oxidized by oxygen in the atmosphere or the oxygen plasma, to be obtained by depositing Au or Pt; and an elastic body 75 obtained by depositing Al for example. As shown in FIG. 18, the beams 72 consist of the non-oxidized conductive thin film 74 and the elastic body 75.

Hereinafter, referring to FIGS. 20A to 20F, a method for producing a diffractive optical modulator of this example will be described.

Figure 20A:
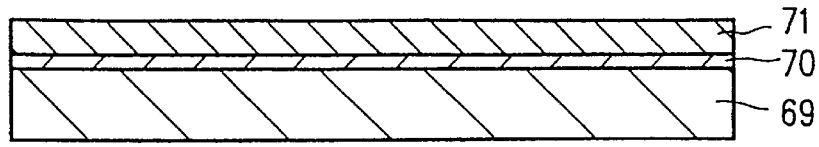
FIGS. 20A to 20F are cross-sectional views showing the process steps for producing the diffractive optical modulator of the sixth example of the invention.

First, as shown in FIG. 20A, a silicon substrate 69 is thermally oxidized at 1050° C. for an hour, for example, thereby forming an insulating layer 70 made of the thermally oxidized film having a thickness of 0.1 μm on the silicon substrate 69. Thereafter, polyimide is applied onto the insulating layer 70 by a spin-coating method, thereby forming a spacer layer 71. The applied polyimide is baked at 200° C. for 20 minutes. In this example, by adjusting the rotation number of the spinner and the viscosity and the temperature of polyimide, the thickness of the spacer layer 71 after the baking is set to be 2.8 μm, for example.

Figure 20B:
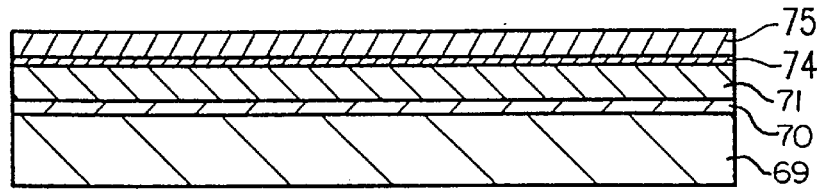

Next, as shown in FIG. 20B, Au (thickness: 0.1 μm) is deposited on the spacer layer 71 by a vapor deposition method so as to form a non-oxidized conductive thin film 74, and then an Al film having a thickness of 2.7 µm is deposited thereon by a vapor deposition method so as to form an elastic body 75.

Figure 20C:
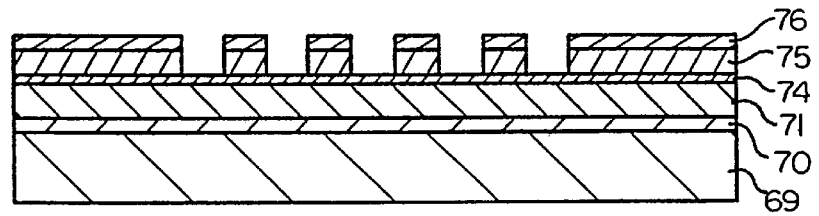

Then, as shown in FIG. 20C, a positive type photoresist is applied onto the elastic body 75, and then exposed and developed so as to form a mask 76. Thereafter, the elastic body 75 is removed by the W/E using an etching solution composed of phosphoric acid, acetic acid and nitric acid.

Figure 20D:
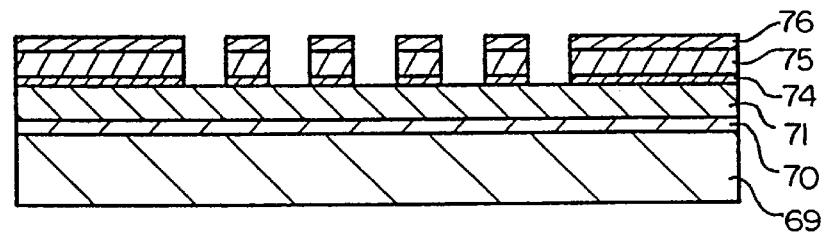
Figure 20E:
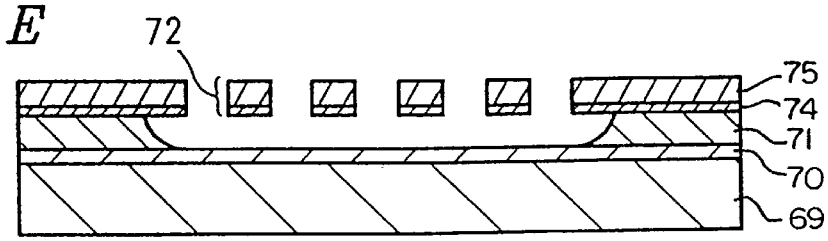

Subsequently, as shown in FIG. 20D, the non-oxidized conductive thin film 74 is etched by the D/E. Thereafter, as shown in FIG. 20E, the mask 76 is removed by the D/E, and at the same time, the spacer layer 71 is isotropicly etched so that the portions under the beams 72 are also etched.

Figure 20F:
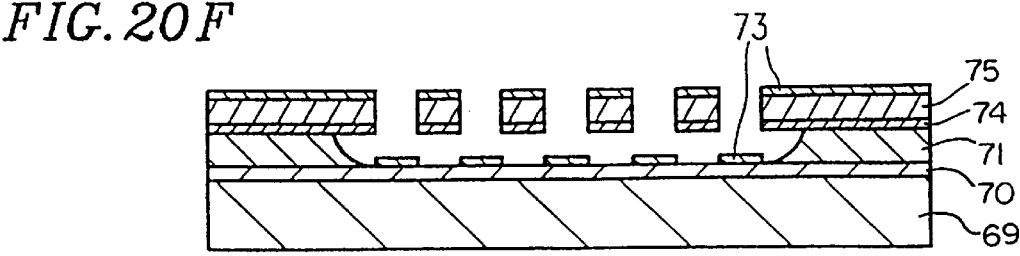

Finally, as shown in FIG. 20F, Au (thickness: 0.1 µm) is deposited so as to form the reflection film 73. As a result, the diffractive optical modulator having a configuration shown in FIG. 19 is completed.

Figure 21A:
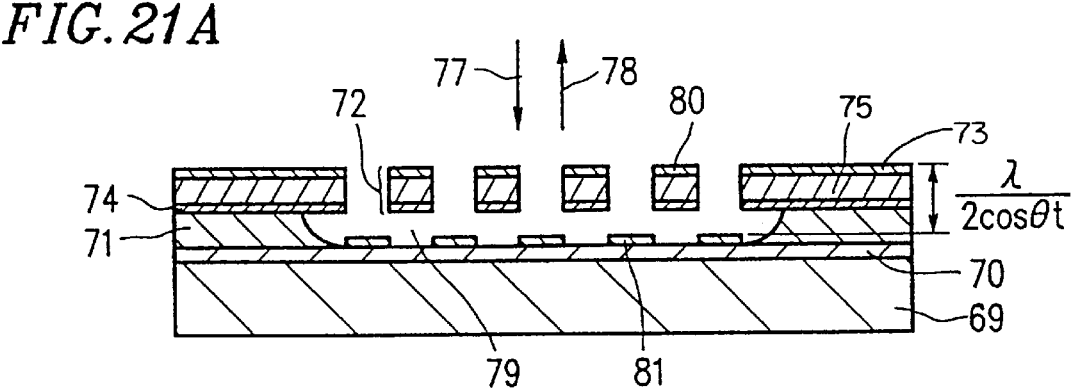
Figure 21B:
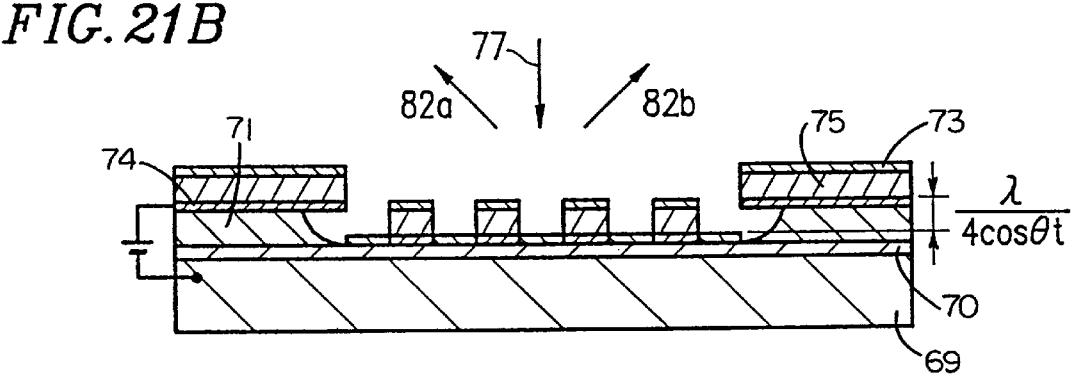

The operation of the diffractive optical modulator having the above configuration will be described with reference to FIGS. 21A and 21B. In FIGS. 21A and 21B, the reference numeral 77 denotes incoming light; 78 denotes reflected zero-order diffracted light; 79 denotes an air layer formed by the beams 72 suspended in the air by the isotropic etching of the spacer layer 71; 80 denotes an upper reflection film, i.e., the reflection film 73 formed on the beams 72; 81 denotes a lower reflection film, i.e., the reflection film 73 formed on the insulating layer 70; and 82a and 82b denote ± first-order diffracted lights.

FIG. 21A shows the state where no voltage is applied between the non-oxidized conductive thin film 74 and the substrate 69. The difference in the height between the upper reflection film 80 and the lower reflection film 81 is $\lambda/(2 \cos \theta_t)$, as shown in FIG. 21A. For example, if $\lambda$ is 10 µm and $\theta_t$ is 25 degrees, then the difference is 5.5 µm. In this case, the phase of the light reflected by the upper reflection film 80 is matched with the phase of the light reflected by the lower reflection film 81. As a result, the diffractive optical modulator functions merely as a mirror, and the incoming light 77 becomes the zero-order diffracted light 78.

On the other hand, for example, in the state where a positive voltage is applied between the non-oxidized conductive thin film 74 and the substrate 69, the non-oxidized conductive thin film 74 and the substrate 69 form a capacitor so as to interpose the air layer 79 and the insulating layer 70. As a result, the non-oxidized conductive thin film 74 functioning as the upper electrode is charged with positive charges, while the substrate 69 functioning as the lower electrode is charged with negative charges. Since an electrostatic attracting force is caused between these charges, the beams 72 are pulled toward the insulating layer 70 until the beams 72 come into contact with the insulating layer 70, as shown in FIG. 21B. In this stage, the difference in the height between the surface of the upper reflection film 80 and that of the lower reflection film 81 is 2.8 µm, for example. In this case, the phase of the light reflected by the upper reflection film 80 is different from the phase of the light reflected by the lower reflection film 81 by one half of the wavelength ($\pi$). As a result, these two lights cancel each other, so that the zero-order diffracted light disappears and a higher-order diffracted light other than the zero-order diffracted light is to be diffracted instead. For example, ± first-order diffracted lights 82a and 82b are generated at the diffraction efficiency of 41%. The light can be modulated by turning on/off the voltage applied between the non-oxidized conductive thin film 74 and the substrate 69.

As described above, in the diffractive optical modulator of this example, the spacer layer is formed by an organic film and is removed by the D/E, so that the beams are not sticked onto the substrate during the rinsing and drying processes, unlike a conventional modulator. In addition, the spacer layer can be removed uniformly, a plurality of beams having the same length are formed, and the variation of the operation can be eliminated. Moreover, the material for forming the beams is deposited by a vapor deposition or the like, the residual stress can be controlled easily at a deposition temperature. Furthermore, the residual stress can be suppressed to a small level, a diffractive optical modulator operating at a low voltage can be produced. In addition, at least the lower surfaces of the beams are made of a conductive material and a thin oxide film is provided between the lower surfaces of the beams and the substrate, so that the distance between the upper and the lower electrodes can be considerably reduced and the modulator can be driven at a low voltage.

Figure 22A:
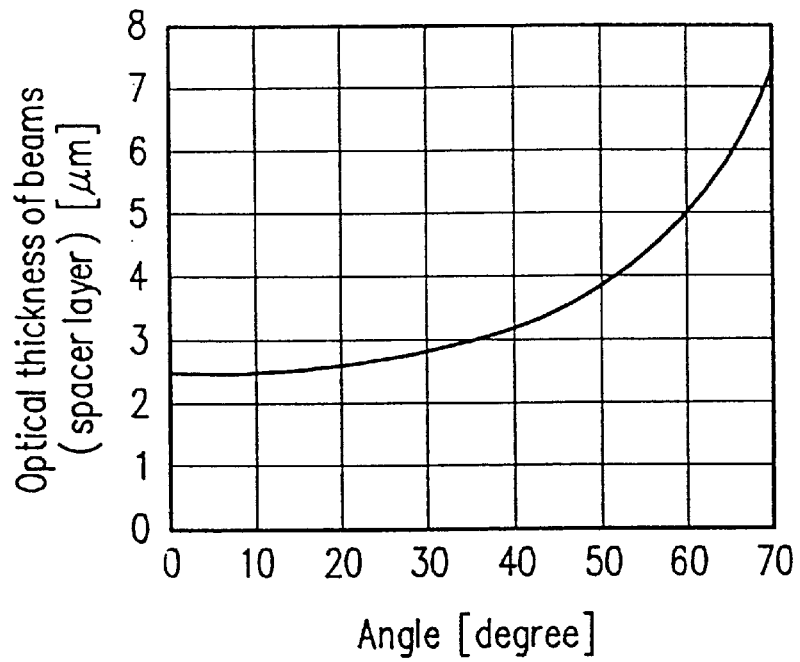
Figure 22B:
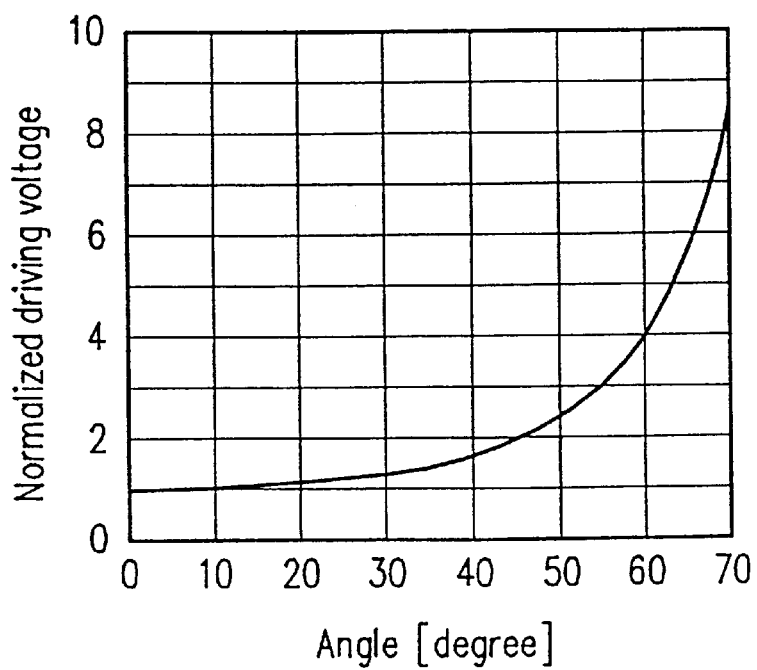
FIG. 22B is a graph showing the relationship between the inclination angle and the increase in the driving voltage.

Next, a preferable disposition of the respective components of the infrared sensor of this example for driving the diffractive optical modulator at a low voltage will be described. As described above, the optimal thickness of the beams and the spacer layer of the diffractive optical modulator is varied in accordance with the inclination angle $\theta_t$. FIG. 22A is a graph showing the relationship between the inclination angle and the optimal thickness of the beams and the spacer layer in the diffractive optical modulator of the infrared sensor of this example. FIG. 22B shows the increase in the driving voltage in accordance with the inclination angle. In FIG. 22B, the driving voltage when the inclination angle is 0 degree is standardized as one. As shown in FIG. 22B, if the inclination angle $\theta_t$ is set to be 45 degrees or less, the increase in the driving voltage can be suppressed to be twice or less. Also, the present inventors have found if the inclination angle $\theta_t$ of the diffractive optical modulator is set to be 25 degrees or less, the separation between the incoming light and the zero-order diffracted light and a low-voltage driving (the increase in the voltage is suppressed to be 20% or less) can be accomplished simultaneously. More specifically, the diffractive optical modulator, including the beams having a length of 3 mm and showing the residual stress suppressed to be a tensile stress of +10 MPa or less, can be driven at a low voltage of 5 V or less.

Next, referring to FIGS. 23A to 23C, the effects obtained by providing a non-oxidized layer on the lower surfaces of the beams in the diffractive optical modulator of this example will be described.

First, the case where the lower surfaces of the beams are not made of a conductive material which is not likely to be oxidized will be described. For example, the lower surfaces of the beams are naturally oxidized by oxygen in the atmosphere or the lower surfaces are also oxidized when the spacer layer is removed by the D/E using oxygen plasma or the like, so that an oxide film is formed. In the diffractive optical modulator shown in FIGS. 23A to 23C, the lower surfaces of the beams are not made of a material which is not likely to be oxidized, unlike the diffractive optical modulator of this example. However, the remaining components of the diffractive optical modulator shown in FIGS. 23A to 23C are the same as those of the diffractive optical modulator of this example.

Figure 23A:
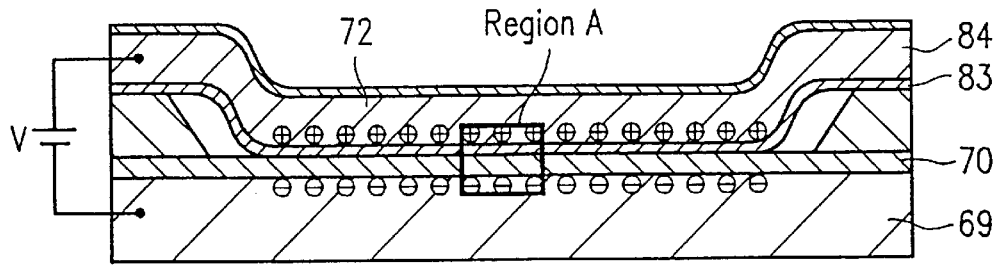
FIG. 23A is a cross-sectional view showing the state of the charges resulting from the application of a voltage in the diffractive optical modulator of the sixth example, whose beams have the oxidized lower surfaces.
Figure 23B:
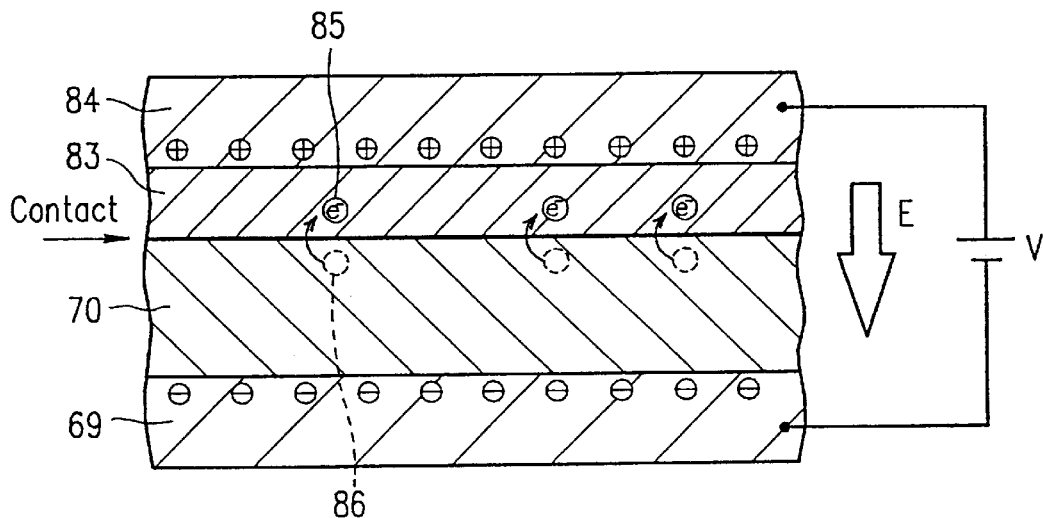
FIG. 23B illustrates the behavior of the electrons in the vicinity of the contact portion thereof.
Figure 23C:
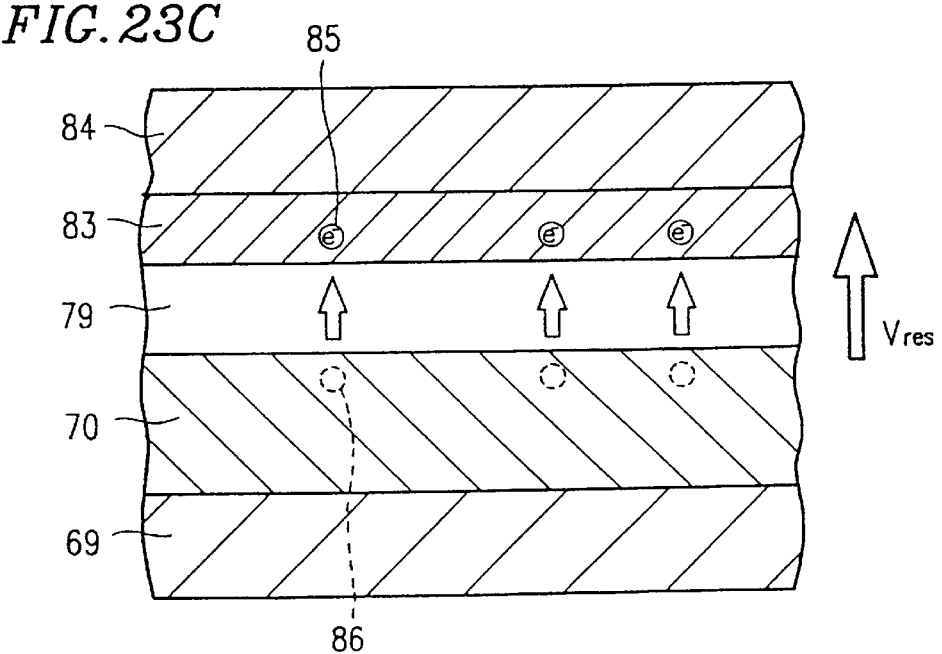
FIG. 23C illustrates the state of the charges in the vicinity of the contact portion thereof resulting from the removal of the applied voltage.

FIG. 23A is a cross-sectional view of the diffractive optical modulator in the longitudinal direction of the beams. FIG. 23B is an enlarged view of a region in the vicinity of the contact portion, i.e., the region A shown in FIG. 23A. FIG. 23C is also an enlarged view of the region A when the voltage is turned off. In these figures, the reference numeral 83 denotes an oxide film which is formed from the beams 72 oxidized by oxygen in the atmosphere or oxygen plasma when ashing is performed; 84 denotes the conductive portions of the beams 72 which are not oxidized; 85 denotes electrons existing inside or on the surface of the insulating layer 70; and 86 denotes holes (or positive charges) formed by the movement of the electrons 85.

FIG. 23A shows the state where a voltage V (>0) is applied between the upper and the lower electrodes. The conductive portion 84 is charged with positive charges and the substrate 69 is charged with negative charges. In FIG. 23B, the electric field is generated by the application of a voltage, so that a part of the electrons existing inside or on the surface of the insulating layer 70 move to the surface or the inside of the oxide film 83, thereby forming the holes 84. FIG. 23C shows the state resulting from the state shown in FIG. 23B by the removal of the applied voltage. In this state, since no voltage is externally applied, the electrons 85 which have moved to the oxide film 83 do not move to the insulating film 70, but remain in the oxide film 83, thereby generating a residual potential difference $V_{res}$. Accordingly, in order to operate the beams next time, it is necessary to apply a voltage higher than the previously applied voltage V by the residual potential difference $V_{res}$. Therefore, the more times the beams are driven, the higher the driving voltage becomes. Ultimately, the densities of the electrons 85 and the holes 86 increase, and the electrostatic force between them also increases, so that the beams 72 remain sticked onto the insulating layer 70, and can not be restored any longer.

Figure 24:
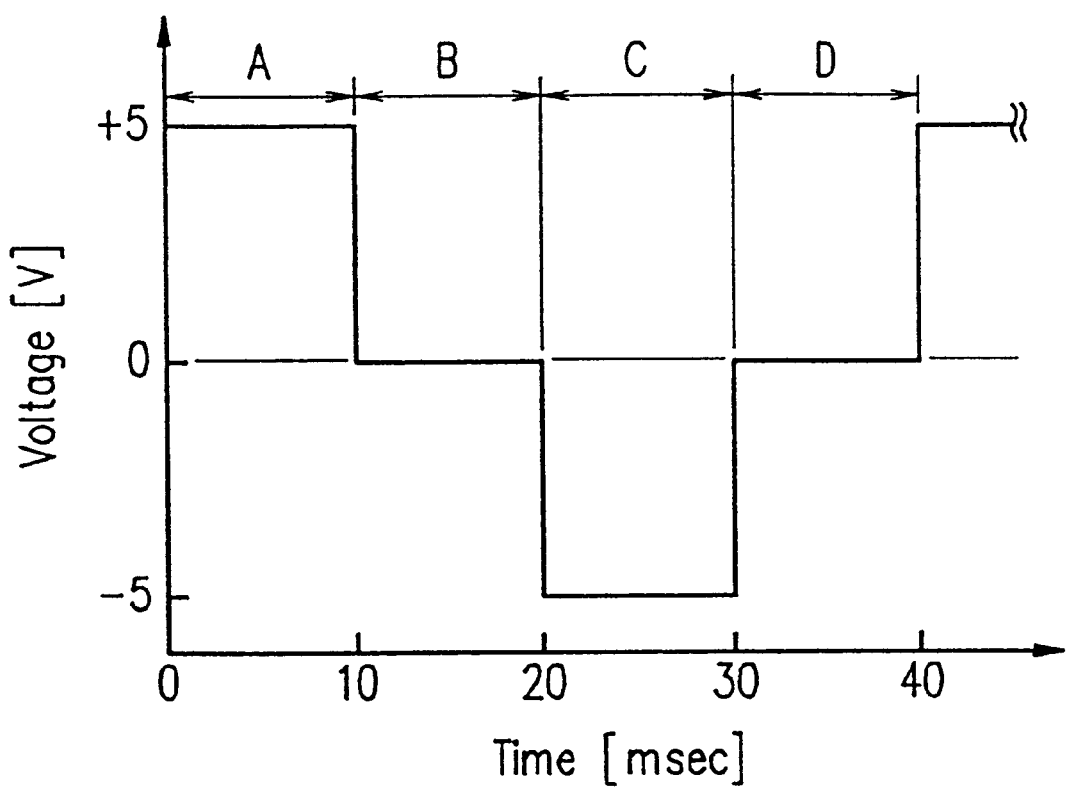
FIG. 24 is a graph showing the variation of an exemplary waveform of the voltage to be applied for driving a diffractive optical modulator while forcibly removing the residual charges thereof.

In order to prevent the increase in the driving voltage and the sticking of the beams, it is possible to drive the beams while forcibly moving the residual charges by the application of a voltage having a waveform shown in FIG. 24. In such a voltage application method, the beams are driven while removing the residual charges by alternately applying voltages having opposite polarities in the regions A and C, thereby preventing the increase of the absolute value of $V_{res}$. However, according to this voltage application method, a voltage source for supplying a voltage having a twice higher absolute value is required during an actual production. Unless the charges are removed, the number of the remaining positive or negative charges becomes large; the beams remain sticked and can no longer be restored.

Next, the effects obtained in the diffractive optical modulator of this example where the lower surfaces of the beams are made of a material which is not likely to be oxidized by oxygen in the atmosphere or the oxygen plasma will be described.

Figure 25A:
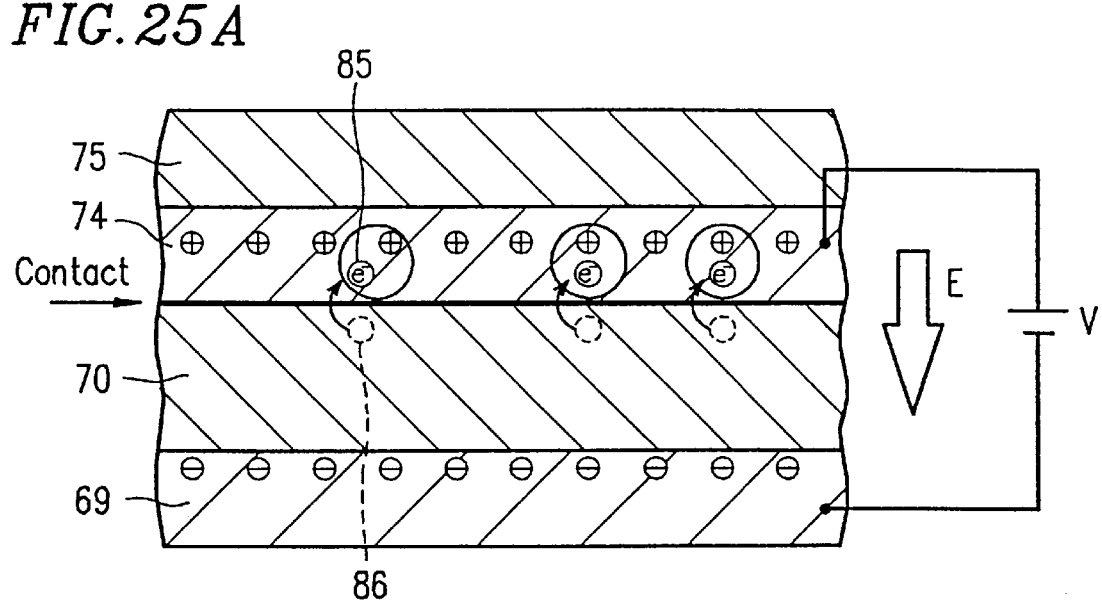
Figure 25B:
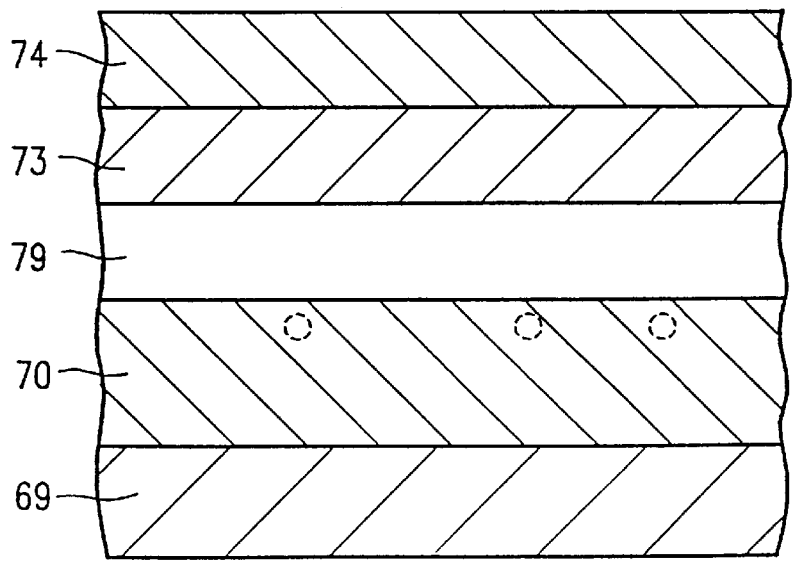
FIG. 25B is a cross-sectional view illustrating the behavior of the charges in the diffractive optical modulator of the sixth example when the voltage is off.

FIGS. 25A and 25B illustrate the movement of the charges in the contact portion in the diffractive optical modulator of this example. FIG. 25A is an enlarged view showing the state of the contact portion when a voltage V (>0) is applied between the substrate 69 and the non-oxidized conductive thin film 74. In this state, the non-oxidized conductive thin film 74 is charged with positive charges, and the substrate 69 is charged with negative charges. In this stage, the electric field is generated by the application of a voltage, so that a part of the electrons existing inside or on the surface of the insulating layer 70 move to the non-oxidized conductive thin film 74, thereby forming the holes 26. However, the electrons 85 which have moved to the non-oxidized conductive thin film 74 are bonded with the previously charged positive charges so as to disappear. FIG. 25B shows the state resulting from the state shown in FIG. 25A by the removal of the applied voltage. The positive charges still remain in the insulating layer 70. However, since the negative charges do not remain, the electric field is not generated and the residual potential difference is not generated, either. Accordingly, there is no need for increasing the driving voltage if the beams are driven many times, and there is no need for forcibly removing the residual charges by the application of voltages having opposite polarities. As a result, a low-voltage driving is substantially accomplished and the driving can be performed stably.

As is apparent from the foregoing description, in the infrared sensor of this example, by setting the inclination angle $\theta_t$ in the diffractive optical modulator to be 45 degrees or less, the increase in the driving voltage can be suppressed to twice or less as compared with the case where the light is incoming vertically, i.e., the inclination angle $\theta_t$ is 0 degrees. Furthermore, if the inclination angle $\theta_t$ is set to be 25 degrees or less, the length of a beam is set to be 3 mm, and the residual stress is controlled to be a tensile stress of +10 MPa or less, then a low-voltage driving at 5 V or less becomes possible, a circuit for increasing the voltage becomes unnecessary and the infrared sensor can be produced at a lower cost. In addition, since the pyroelectric element and the signal amplifier are provided on the supporting plate and the supporting plate is supported by the electrode pins, the infrared sensor can be constructed easily. Moreover, in the diffractive optical modulator for the infrared sensor of this example, the lower surfaces of the beams are made of a conductive material which is not likely to be oxidized, so that the modulator can be driven by applying a positive or negative pulse voltage thereto. As a result, the fine control of the waveform of the applied voltage is no longer necessary and the modulator can be driven stably.

In this example, a diffractive optical modulator in which the length of the beam is 3 mm is described. Alternatively, by setting the length of the beam to be longer, the modulator may be driven at an even lower voltage with a still larger inclination angle $\theta_t$. However, if the beam becomes too long, then the modulator can not operate at a high speed owing to the effects of the inertial force, and in addition, the beam is likely to be distorted, thereby degrading the modulation efficiency.

In the diffractive optical modulator of this example, the beam consists of an elastic body and a non-oxidized conductive thin film. Alternatively, the elastic body may be made of the same material as that of the non-oxidized conductive thin film. That is to say, the entire beam may be formed by the non-oxidized conductive thin film. Needless to say, the reflection film may also be made of the same material. In this example, Au is employed as the material which is not likely to be oxidized. Alternatively, Pt, Ti, a NiCr alloy, a CuNi alloy, chrome steel, or other conductive organic materials can also be used. The elastic body of this example is made of Al. However, the elastic body can be made of an insulating material such as an organic material.

In a process for producing the diffractive optical modulator of this example, after the elastic body is patterned, the non-oxidized conductive thin film is patterned by the D/E. Needless to say, the non-oxidized conductive thin film may be removed by the W/E. Alternatively, the beams may be shaped in the following manner. After the non-oxidized conductive thin film is deposited, the thin film is patterned once. Thereafter, the elastic body layer is deposited, and then the elastic body layer is patterned again.

In this example, the deposition is performed mainly by a vapor deposition method. Alternatively, the deposition can be performed by other methods such as a sputtering method or a plating method.

EXAMPLE 7

Hereinafter, an infrared sensor according to a seventh example will be described with reference to FIG. 26. The infrared sensor of this seventh example is different from the infrared sensor of the sixth example only in the positions of the respective components. Thus, the respective positions thereof will be described below.

Figure 26:
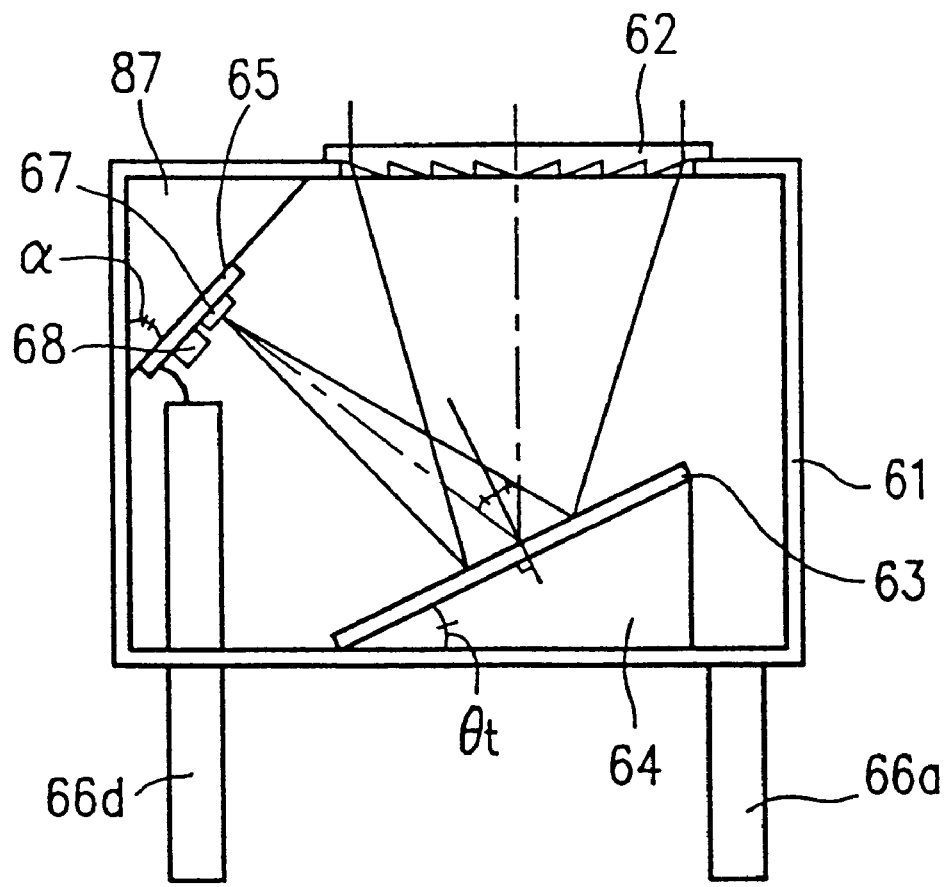
FIG. 26 is a side view showing a fundamental configuration of an infrared sensor according to a seventh example of the invention.

FIG. 26 is a cross-sectional view showing a fundamental configuration of the infrared sensor of this example. The inclination angle $\theta_t$ in the diffractive optical modulator is 25 degrees, as described in the sixth example. In FIG. 26, the same components as those shown in FIG. 18 are denoted by the same reference numerals, and the descriptions thereof will be omitted herein. In FIG. 26, the reference numeral 87 denotes a supporting spacer. The lens 26 is a diffractive lens having an aperture of 3 mm and a focal length of 6 mm, for example, and the spacer 64 has an inclination angle $\theta_t$ of 25 degrees. The inclination angle α of the supporting spacer 87 is set to be 40 degrees so that the infrared light is vertically incident onto the pyroelectric element 67. In this example, since the inclination angle $\theta_t$ of the spacer 64 is set to be 25 degrees, if the length of a beam is set to be 3 mm, driving can be performed at 0 V and +5 V, for example.

The infrared sensor of this example is provided with a supporting spacer 87, thereby vertically receiving the infrared light diffracted by the diffractive optical modulator. As a result, the detection can be conducted at a higher sensitivity. In addition, since the incoming light can be easily separated from the zero-order diffracted light diffracted by the diffractive optical modulator, an infrared sensor in a smaller size than the infrared sensor of the sixth example can be produced by using a lens having a shorter focal length.

EXAMPLE 8

Figure 27A:
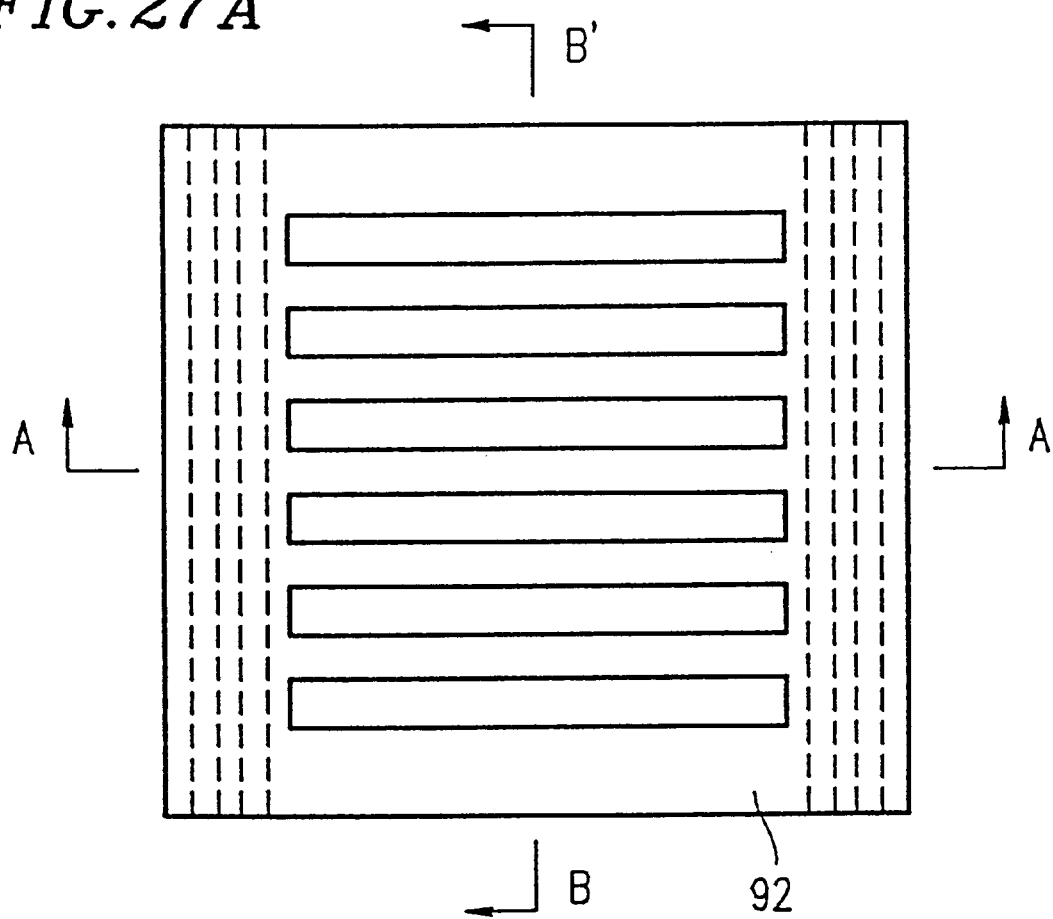
Figure 27B:
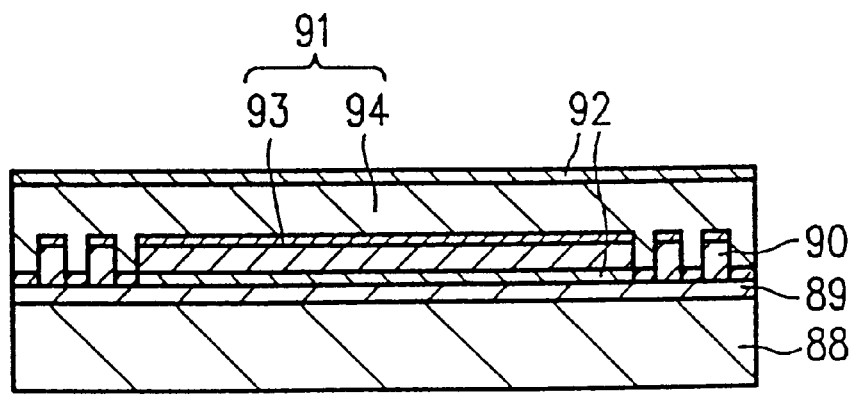
FIG. 27B is a cross-sectional view taken along the line A–A' in FIG. 27A.

Hereinafter, a diffractive optical modulator according to an eighth example of the invention will be described with reference to FIGS. 27A and 27B. FIG. 27A is a plan view showing a diffractive optical modulator of the eighth example, and FIG. 27B is a cross-sectional view taken along the line A–A' in FIG. 27A. As shown in FIGS. 27A and 27B, the diffractive optical modulator of this example includes: a substrate 88, e.g., a silicon substrate; an insulating layer 89 formed by an oxide film having a thickness of 0.1 μm to be obtained by thermally oxidizing the silicon substrate 88 or the like; a spacer layer 90 obtained by applying a photo-sensitive polyimide film by a spin-coating method, patterning the film by exposing and developing the film, and then baking the film; and the beams 91. In this example, the thickness of the spacer layer 90 and that of the beams 91 are set to be approximately $\lambda/(4 \cos \theta_t)$. For example, if λ is 10 μm and $\theta_t$ is 25 degrees, then the optimal thickness is 2.8 μm. The diffractive optical modulator of this example further includes: a reflection film 92 obtained by depositing Au (thickness: 0.1 μm) or the like by a vapor deposition method; a non-oxidized conductive thin film 93 made of a material which is not likely to be oxidized by oxygen in the atmosphere or oxygen plasma, to be obtained by depositing Au, Pt or the like by a vapor deposition method; and an elastic body 94 obtained by depositing Al or the like by a vapor deposition method. As shown in FIG. 27B, the beam 91 consists of the non-oxidized conductive thin film 93 and the elastic body 94.

Hereinafter, referring to FIGS. 28A to 28E and FIGS. 29A to 29E, a method for producing a diffractive optical modulator of this example will be described. FIGS. 28A to 28E are cross-sectional views taken along the line A–A' in FIG. 27A. FIGS. 29A to 29E are cross-sectional views taken along the line B–B' in FIG. 27A.

Figure 28A:
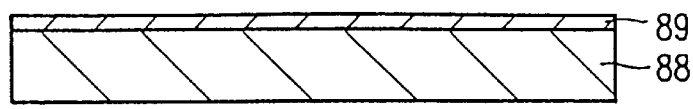
FIGS. 28A to 28E are cross-sectional views taken along the line A–A' in FIG. 27A showing the process steps for producing the diffractive optical modulator of the eighth example of the invention.

First, as shown in FIGS. 28A and 29A, a silicon substrate 88 is thermally oxidized at 1050° C. for an hour, for example, thereby forming an insulating layer 89 constituted by the thermally oxidized film having a thickness of 0.1 μm, for example, on the silicon substrate 88.

Figure 28B:
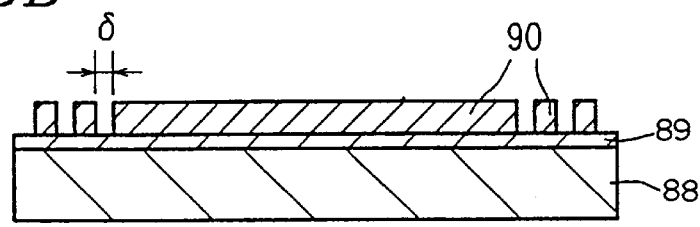

Next, as shown in FIGS. 28B and 29B, a photo-sensitive polyimide film is applied on the insulating layer 89 by a spin-coating method. After the film is exposed and developed so as to form a pattern, the film is baked at 200° C. for 20 minutes, for example. In this case, the thickness of the spacer layer 90 after the baking is set to be 2.8 μm, for example, by adjusting the rotation number of the spinner or the viscosity and the temperature of polyimide.

Figure 28C:
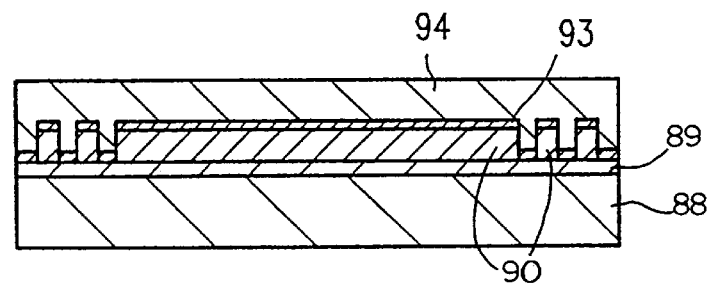

Subsequently, as shown in FIGS. 28C and 29C, Au or the like having a thickness of 0.1 μm, for example, is deposited on the spacer layer 90, thereby forming the non-oxidized conductive thin film 93, and then an Al film or the like having a thickness of 2.7 μm, for example, is further deposited thereon by a vapor deposition, thereby forming the elastic body 94. In this case, by setting the gap (indicated by δ in FIG. 27B) of the polyimide pattern to be less than twice of the sum of the thickness of the non-oxidized conductive thin film 93 and that of the elastic body 94, it is possible to fill the gap of the polyimide pattern as shown in FIG. 28C. In this example, δ is set to be 3 μm.

Figure 28D:
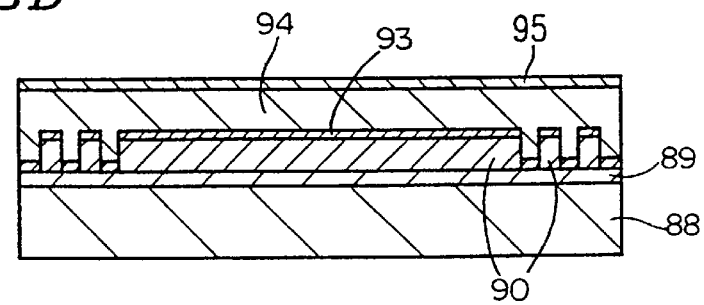

Then, as shown in FIGS. 28D and 29D, a positive type photoresist is applied onto the elastic body 94, and exposed and developed so as to form a mask 102. Thereafter, Al forming the elastic body 94 is removed by a W/E using an etching solution composed of phosphoric acid, acetic acid and nitric acid, for example. The non-oxidized conductive thin film 93 is then etched by the D/E.

Figure 28E:
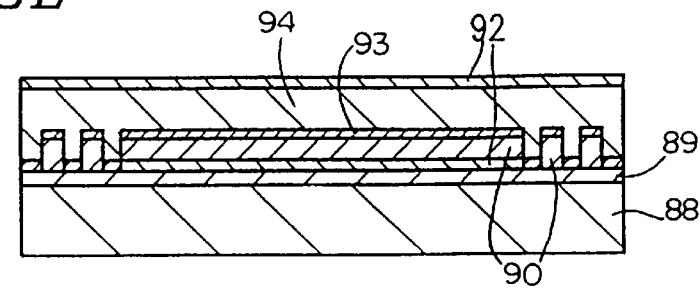

Next, as shown in FIGS. 28E and 29E, the mask 95 is removed by the D/E using the oxygen plasma or the like, and at the same time, the spacer layer 90 including the portions under the beams 91 is isotropicly etched. Since some portions of the spacer layer 90 are not in contact with oxygen plasma, the portions are not removed but remain. Finally, Au or the like having a thickness of 0.1 μm is deposited by a vapor deposition method, thereby forming the reflection film 92. By performing the above steps, a diffractive optical modulator having a configuration as shown in FIGS. 27A and 27B is completed.

The diffractive optical modulator having such a configuration operates in a similar manner to the diffractive optical modulator of the sixth example. Therefore, by turning on/off the voltage applied between the substrate 88 and the non-oxidized conductive thin film 93, the incoming light can be modulated.

In the diffractive optical modulator of the sixth example, the length of a beam is determined by the time required for removing the spacer layer. On the other hand, in the diffractive optical modulator of this example, since the length of a beam is determined by the pattern of the spacer layer, a diffractive optical modulator including the beams of the same length can be produced with satisfactory reproducibility. Since the length of the beam affects the driving voltage of a diffractive optical modulator, the method for producing a diffractive optical modulator of this example eliminates the variation of the driving voltage from the diffractive optical modulator.

EXAMPLE 9

Hereinafter, an infrared sensor according to a ninth example of the invention will be described with reference to FIG. 30.

The infrared sensor of this ninth example can be suitably used in the case where the signal/noise (S/N) ratio is desired to be large in detecting the infrared light, and in the case where an infrared sensor of an extremely small size is produced. Generally, in the case where the S/N ratio is set to be large in detecting the infrared light, by turning on/off the voltage applied to the diffractive optical modulator, an electromagnetic noise adversely affecting the pyroelectric element and the signal amplifier is generated, so that the noise becomes large. On the other hand, in the case of producing a small-sized infrared sensor, the size of the diffractive optical modulator included therein also becomes small. As a result, since the length of a beam becomes short, the modulator can not operate unless a relatively high voltage is applied thereto. If such a high voltage is applied, a large electromagnetic noise is also generated, so that the pyroelectric element and the signal amplifier experience strong noise interference.

Figure 30:
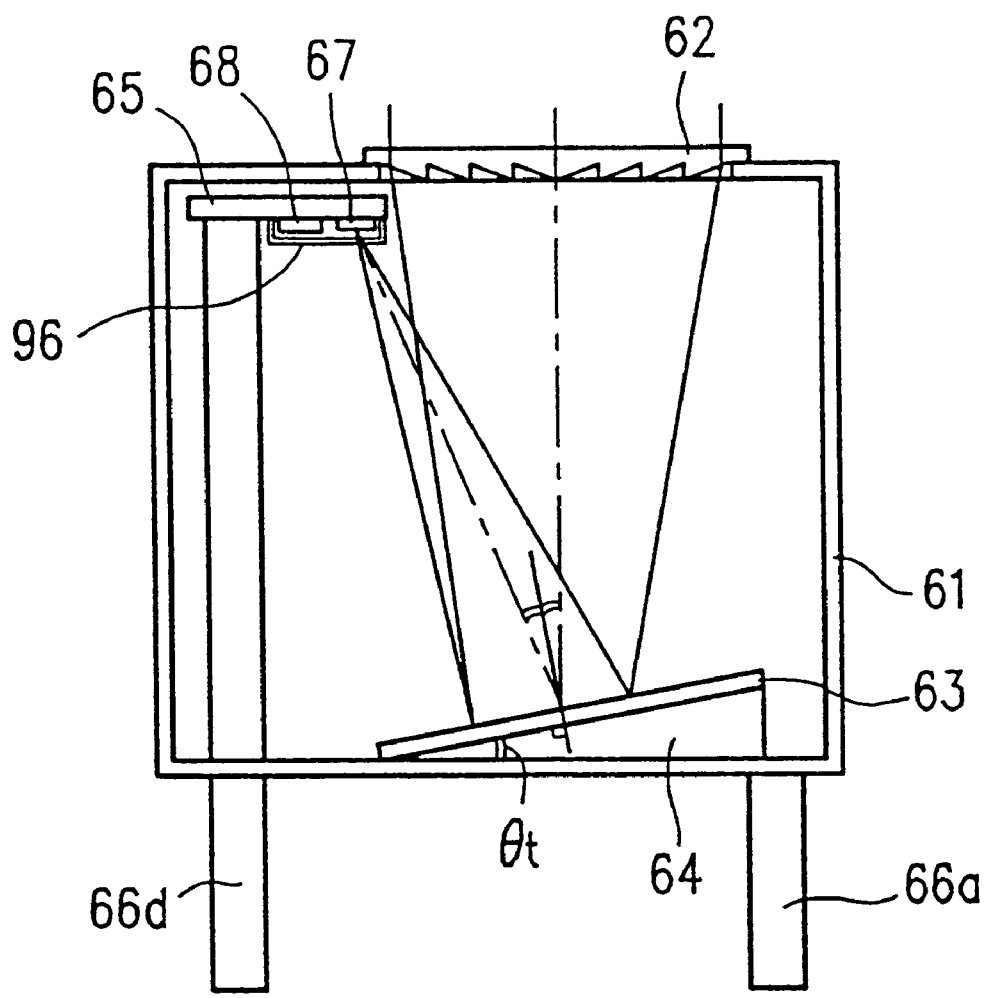
FIG. 30 is a side view showing a fundamental configuration of an infrared sensor according to a ninth example of the invention.

FIG. 30 is a side view showing a fundamental configuration of the infrared sensor of this example. In FIG. 30, the same components as those shown in FIG. 18 will be denoted by the same reference numerals, and the description will be omitted herein. In FIG. 30, an electromagnetic shield 96 is grounded by lines (not shown), and is made of a conductive material transmitting the infrared light. Since an antireflection film is provided on the surface of the electromagnetic shield 96, the zero-order diffracted light diffracted by the diffractive optical modulator is transmitted through the electromagnetic shield 96 with substantially no loss. On the other hand, the electromagnetic noise generated when the diffractive optical modulator is driven is shielded by the electromagnetic shield 96, and therefore, the noise no longer adversely affects the pyroelectric element 67 and the signal amplifier 68.

As is apparent from the foregoing description, in the infrared sensor of this example, a shield is provided between the diffractive optical modulator and a device such as a pyroelectric element or a signal amplifier, and is grounded, whereby the effects of the electromagnetic noise generated from the diffractive optical modulator can be shielded.

EXAMPLE 10

Figure 31:
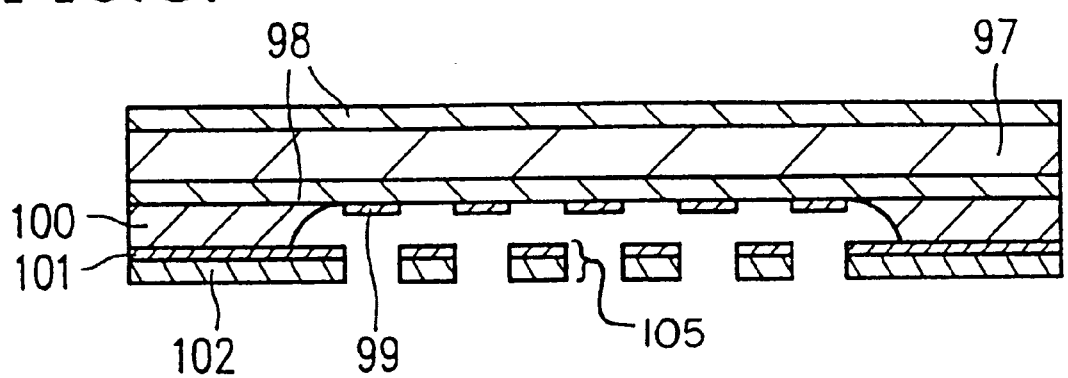
FIG. 31 is a cross-sectional view of a diffractive optical modulator according to a tenth example of the invention.

Hereinafter, an infrared sensor according to a tenth example of the invention will be described with reference to FIG. 31. The infrared sensor of this tenth example is different from the infrared sensor of the sixth example only in the configuration of the diffractive optical modulator. The diffractive optical modulator of this example is constructed so that an electromagnetic noise is not generated at least toward the portion in which the pyroelectric element and the signal amplifier are disposed. Therefore, the electromagnetic shield as described in the ninth example is not required to be provided.

The diffractive optical modulator of this example will be described below. As shown in FIG. 31, the diffractive optical modulator of this example includes: a substrate 97, e.g., a silicon substrate, whose both surfaces are mirror-polished; an antireflection film 98 made of an insulating material, e.g., a ZnS film having a thickness of 1.1 $\mu$m; a reflection film 99 obtained by depositing Au (thickness: 0.1 $\mu$m) or the like and patterning it; and a spacer layer 100 obtained by applying a polyimide film or the like by a spin-coating method, and baking the film. In this example, the optimal thickness of the spacer layer 100 is approximately $\lambda/(4 \cos \theta_r)$. For example, if $\lambda$ is 10 $\mu$m and $\theta_r$ is 25 degrees, then the optimal thickness is 2.8 $\mu$m. The diffractive optical modulator of this example further includes: a non-oxidized conductive reflection film 101 made of a conductive material which is not likely to be oxidized by oxygen in the atmosphere or oxygen plasma and has substantially the same reflectance as that of the reflection film 99, to be obtained by depositing Au (thickness: 0.1 $\mu$m) or the like by a vapor deposition method; and an elastic body 102 obtained by depositing Al (thickness: 1 $\mu$m) or the like by a vapor deposition method.

Referring to FIGS. 32A to 32F, a method for producing a diffractive optical modulator of this example will be described. In these figures, the reference numerals 103 and 104 denote masks; and 105 denotes a beam consisting of the non-oxidized conductive reflection film 101 and the elastic body 102. In these figures, the same components as those in FIG. 31 will be denoted by the same reference numerals and the description thereof will be omitted herein.

Figure 32A:
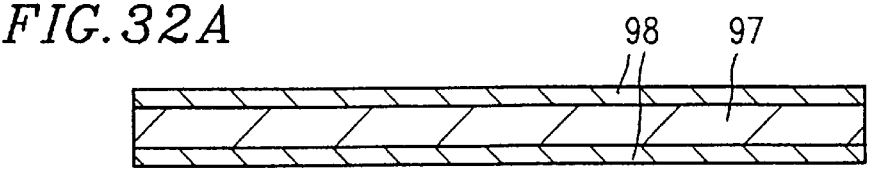
FIGS. 32A to 32F are cross-sectional views showing the process steps for producing the diffractive optical modulator of the tenth example of the invention.

First, as shown in FIG. 32A, ZnS films having a thickness $\lambda/(4n)$ (n is the refractive index of ZnS=2.3) of 1.1 $\mu$m are deposited on both of the mirror-polished surfaces of the silicon substrate 97 by a sputtering method or the like, thereby forming the antireflection film 38.

Figure 32B:
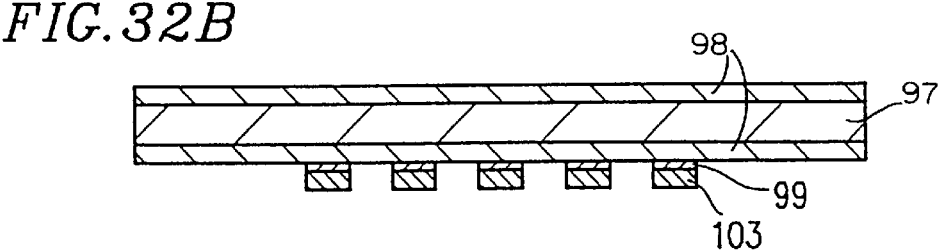

Next, as shown in FIG. 32B, Au (thickness: 0.1 $\mu$m) or the like is deposited by a vapor deposition method; a positive photoresist or the like is applied thereon by a spin-coating method and exposed and developed so as to form the mask 103; and then the deposited Au is removed by the W/E using an etching solution composed of iodine, potassium iodide and the like, thereby forming the reflection film 99.

Figure 32C:
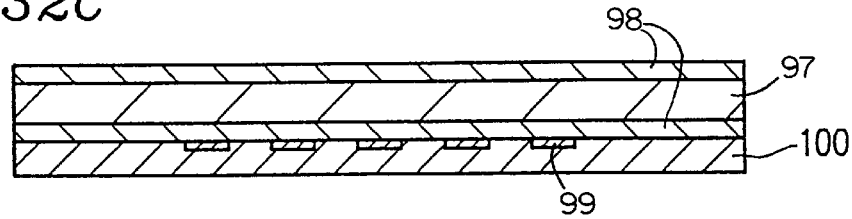

Then, as shown in FIG. 32C, the mask 103 is removed and a polyimide film or the like is applied thereon by a spin-coating method so as to form the spacer layer 100. After the polyimide film is applied, the film is baked at 200° C. for 20 minutes, for example. In this case, the thickness of the spacer layer 100 after the baking is set to be $\lambda/(4 \cos \theta_r)$ and the unevenness of the reflection film is smoothed, by adjusting the rotation number of the spinner or the viscosity and the temperature of polyimide.

Figure 32D:
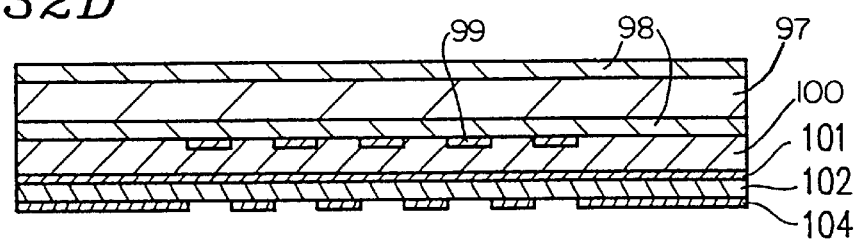

Subsequently, as shown in FIG. 32D, Au (thickness: 0.1 $\mu$m) or the like is deposited on the spacer layer 100 by a vapor deposition method or the like so as to form the non-oxidized conductive reflection film 101, and an Al film or the like having a thickness of 1 $\mu$m, for example, is deposited thereon by a vapor deposition method or the like so as to form the elastic body 102. Thereafter, a positive type photoresist or the like is applied thereon, and then exposed and developed so as to form the mask 104.

Figure 32E:
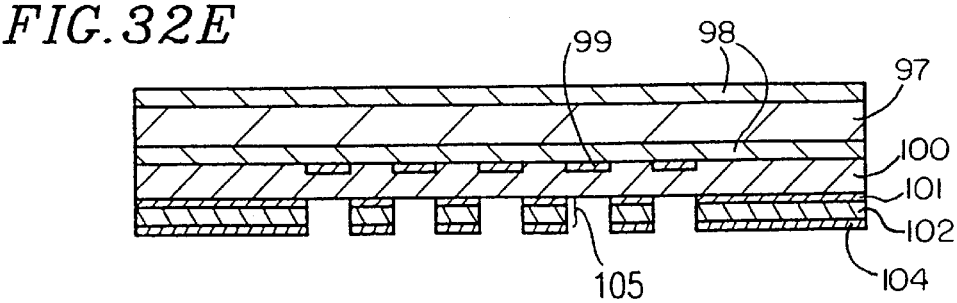

Next, as shown in FIG. 32E, Al forming the elastic body 102 is removed by the W/E using an etching solution composed of phosphoric acid, acetic acid and nitric acid, for example, and the non-oxidized conductive reflection film 101 is etched by the D/E using chlorine or the like.

Figure 32F:
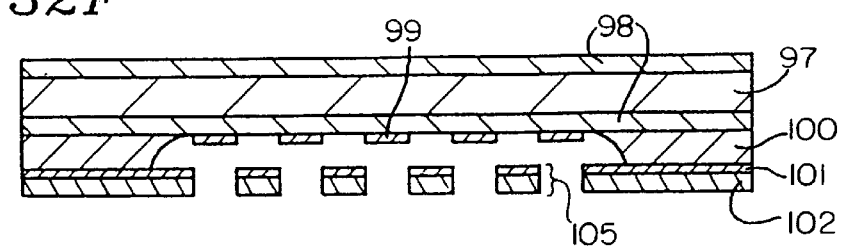

Finally, as shown in FIG. 32F, the mask 104 is removed by the D/E using oxygen plasma or the like, and at the same time, the spacer layer 100 including the portions under the beams 105 is isotropicly etched. By performing the above-described steps, the diffractive optical modulator having a configuration shown in FIG. 30 is completed.

Figure 33A:
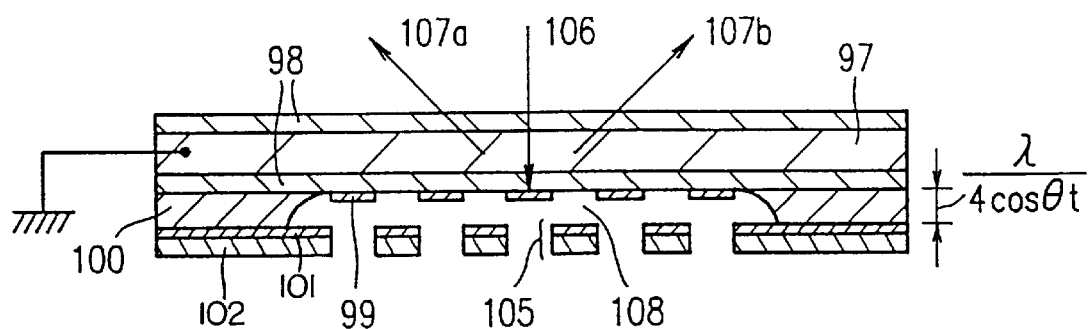
Figure 33B:
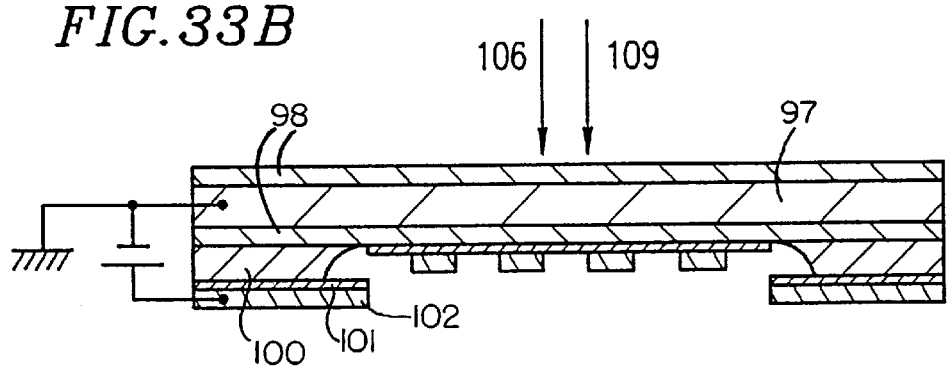
FIG. 33B is a cross-sectional view illustrating the operation of the diffractive optical modulator of the tenth example when a voltage is applied.

Referring to FIGS. 33A and 33B, the operation of the diffractive optical modulator of this example will be described. In these figures, the reference numeral 106 denotes incoming light; 107a and 107b denote ± first-order diffracted lights; 108 denotes an air layer formed by the beams 52 suspended in the air by the isotropic etching of the spacer layer 100; and 49 denotes reflected light. FIG. 33A shows the state where no voltage is applied between the non-oxidized conductive reflection film 101 and the substrate 97. The difference in the height between the reflection film 99 and the non-oxidized conductive reflection film 101 is $\lambda/(4 \cos \theta_t)$ as shown in FIG. 33A. For example, if $\lambda$ is 10 $\mu$m and $\theta_t$ is 25 degrees, then the difference is 2.8 $\mu$m. The incoming light 106 passes through the upper antireflection film 98, the silicon substrate 97, and then the lower antireflection film 98, so as to be incident onto the grating portion consisting of the reflection film 99 and the non-oxidized conductive reflection film 101. In this case, since the phase of the light reflected by the reflection film 99 is different from the phase of the light reflected by the non-oxidized conductive reflection film 101 by one half of the wavelength $\pi$, these two light cancel each other and a diffracted light on a higher order is diffracted. For example, the ± first-order diffracted lights 107a and 107b are generated at a diffraction efficiency of 41%, respectively.

FIG. 33B shows the state where a positive voltage is applied between the non-oxidized conductive reflection film 101 and the substrate 97, for example. The substrate 97 is grounded. In this case, the non-oxidized conductive reflection film 101 and the substrate 97 form a capacitor so as to interpose the air layer 108 and the antireflection film 98. The non-oxidized conductive reflection film 101 functioning as the lower electrode is charged with positive charges, while the substrate 97 functioning as the upper electrode is charged with negative charges. Since an electrostatic attracting force is caused between these charges, the beams 105 are pulled towards the antireflection film 98 until the beams 105 come into contact with the film 98, as shown in FIG. 33B. In this case, the surface of the reflection film 99 and the surface of the non-oxidized conductive reflection film 101 are on the same plane, so that the diffractive optical modulator functions as a mirror, and all the incoming light 106 becomes the reflected light 109.

As is apparent from the foregoing description, by turning on/off the voltage applied between the non-oxidized conductive reflection film 101 and the substrate 97, the light can be modulated.

In the diffractive optical modulator for the infrared sensor of this example, the substrate 97 is grounded, a voltage is applied to the non-oxidized conductive reflection film 101 and the incoming light is directed through the grounded substrate 97 to the reflection film. Therefore, in detecting very weak infrared light, or in driving the diffractive optical modulator by applying a relatively high voltage, an electromagnetic noise is not generated on the light-modulation side because the substrate 97 itself functions as the electromagnetic shield.

In the diffractive optical modulator of this example, the antireflection film functions as the insulating layer and the film has a large thickness, e.g., a ZnS film having a thickness of 1.1 $\mu$m. Thus the voltage required for driving the modulator seems to be high. However, since the actual relative dielectric constant of ZnS is 8 or more, the effective length, i.e., an eighth of the thickness, is 0.14 $\mu$m (=1.1 $\mu$m÷8). Accordingly, the driving voltage does not become too high. In addition, since the thickness of a beam 105 is not particularly limited by the wavelength $\lambda$ or the inclination angle $\theta_t$, the diffractive optical modulator of this example can be driven at a lower voltage as compared with the diffractive optical modulator of the first or the third example, by setting the thickness of the beam to be smaller. More specifically, if the wavelength $\lambda$ is 10 $\mu$m, the inclination angle $\theta_t$ is 25 degrees and the thickness of the beam is set to be 2 $\mu$m or less, then the modulator of this example can be driven at 0, 5 V.

EXAMPLE 11

Hereinafter, an infrared sensor according to an eleventh example of the invention will be described with reference to FIG. 34. The infrared sensor of this eleventh example is different from the infrared sensors of the foregoing examples in that the lens for converging the infrared light on the pyroelectric element is disposed between the pyroelectric element and the diffractive optical modulator. In the foregoing examples, the lens for converging the infrared light is disposed so as to cover the opening of the seal case.

Figure 34:
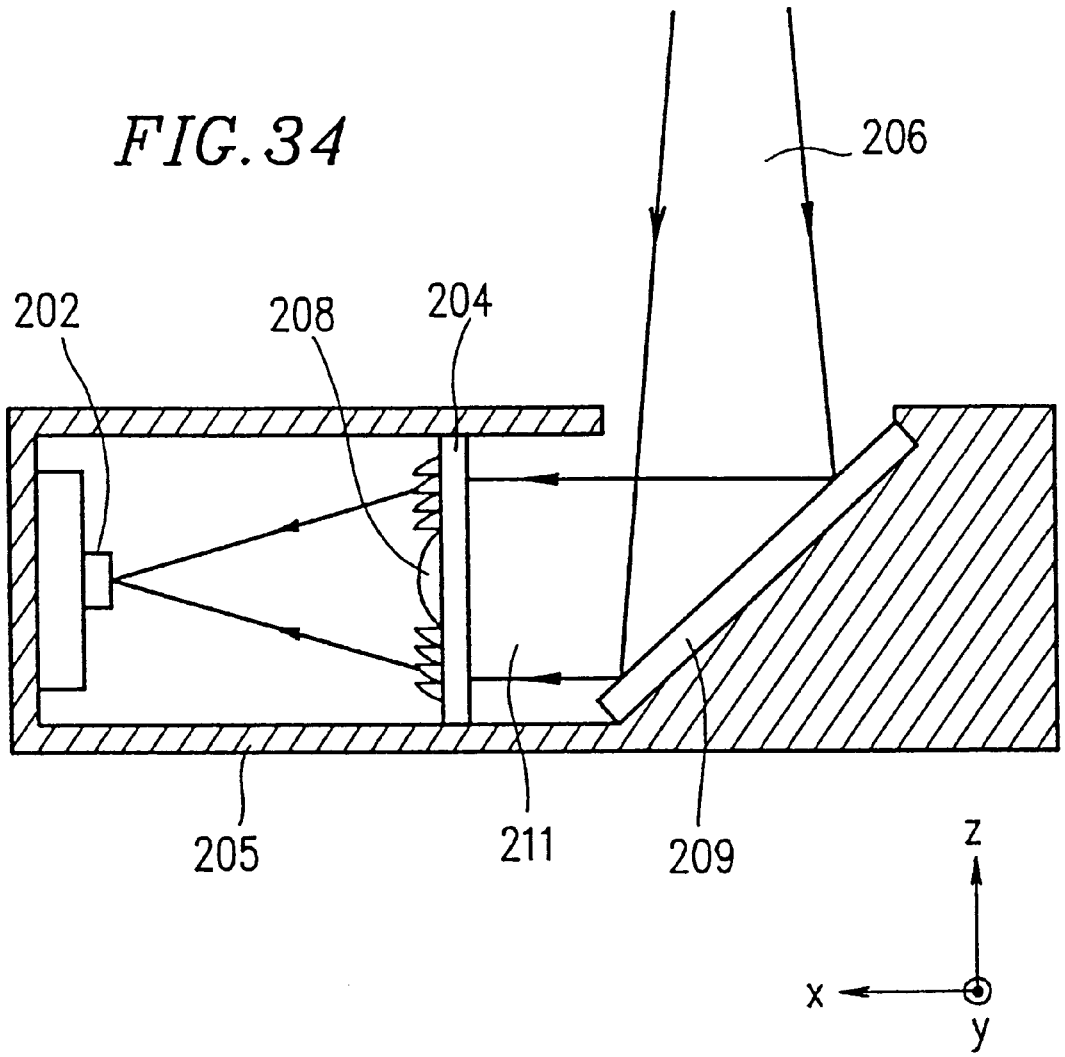
FIG. 34 is a cross-sectional view of an infrared sensor according to an eleventh example of the invention.

As shown in FIG. 34, the infrared sensor of this example includes: a diffractive optical modulator 209 for diffracting at least a part of the incoming infrared light 206 as the zero-order diffracted light 211; a diffractive lens 208; and a pyroelectric element 202. The diffractive lens 208 converges the infrared light diffracted by the diffractive optical modulator 209 onto the pyroelectric element 202. A diffractive optical modulator of any of the foregoing examples can be used as the diffractive optical modulator 209.

In this example, the diffractive optical modulator 209, the pyroelectric element 202 and the lens 208 are included in the seal case 205 having an opening. That is to say, the opening of the seal case 205 is not covered. The diffractive lens 208 is a lens obtained by forming a diffraction grating on a substrate functioning as an incoming infrared wavelength filter 204. In this example, the diffractive lens 208 itself operates as a part of seal case 205.

In this example, since approximately collimated light is incident onto the diffractive optical modulator 209, the modulation efficiency is improved. In addition, the noise generated by the operation of the diffractive optical modulator 209 is not likely to affect the pyroelectric element 202.

EXAMPLE 12

Figure 35:
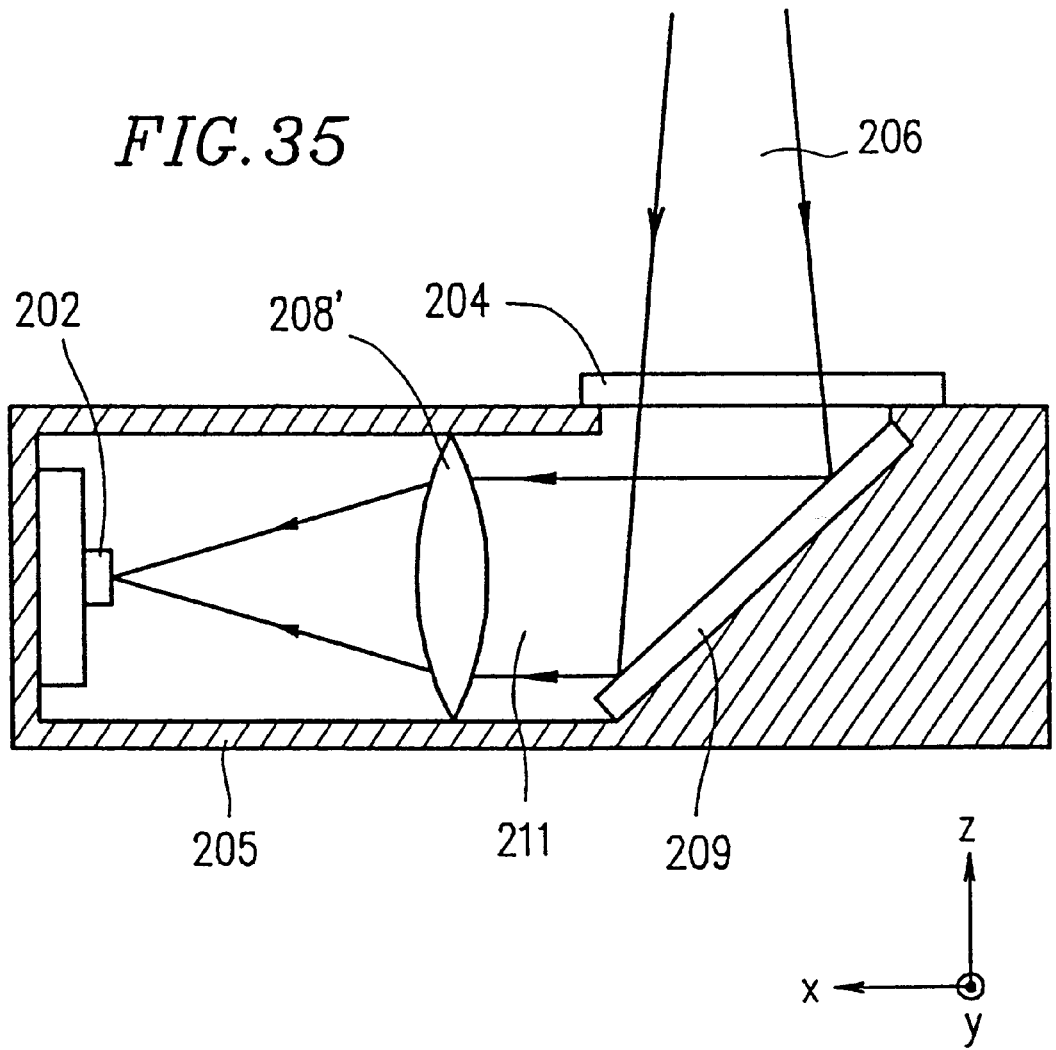
FIG. 35 is a cross-sectional view of an infrared sensor according to a twelfth example of the invention.

Hereinafter, an infrared sensor according to a twelfth example of the invention will be described with reference to FIG. 35. The infrared sensor of this twelfth example is different from the infrared sensors of the foregoing Examples 1 to 10 in that the lens for converging the infrared light on the pyroelectric element is disposed between the pyroelectric element and the diffractive optical modulator. In Examples 1 to 10, the lens for converging the infrared light is disposed so as to cover the opening of the seal case.

The infrared sensor of this twelfth example is different from the infrared sensor of the eleventh example shown in FIG. 34 in that the opening of the seal case 205 is covered with the incoming infrared wavelength filter 204. A lens 208' of this example is not a diffractive lens, but a polished lens made of silicon, or a polyethylene lens. In this example, only the light transmitted through the incoming infrared wavelength filter 204 is incident onto the diffractive optical modulator 209. Since the diffractive optical modulator 209 is disposed within a sealed environment, the resistivity of the diffractive optical modulator 209 against the environment is improved.

EXAMPLE 13

Figure 36:
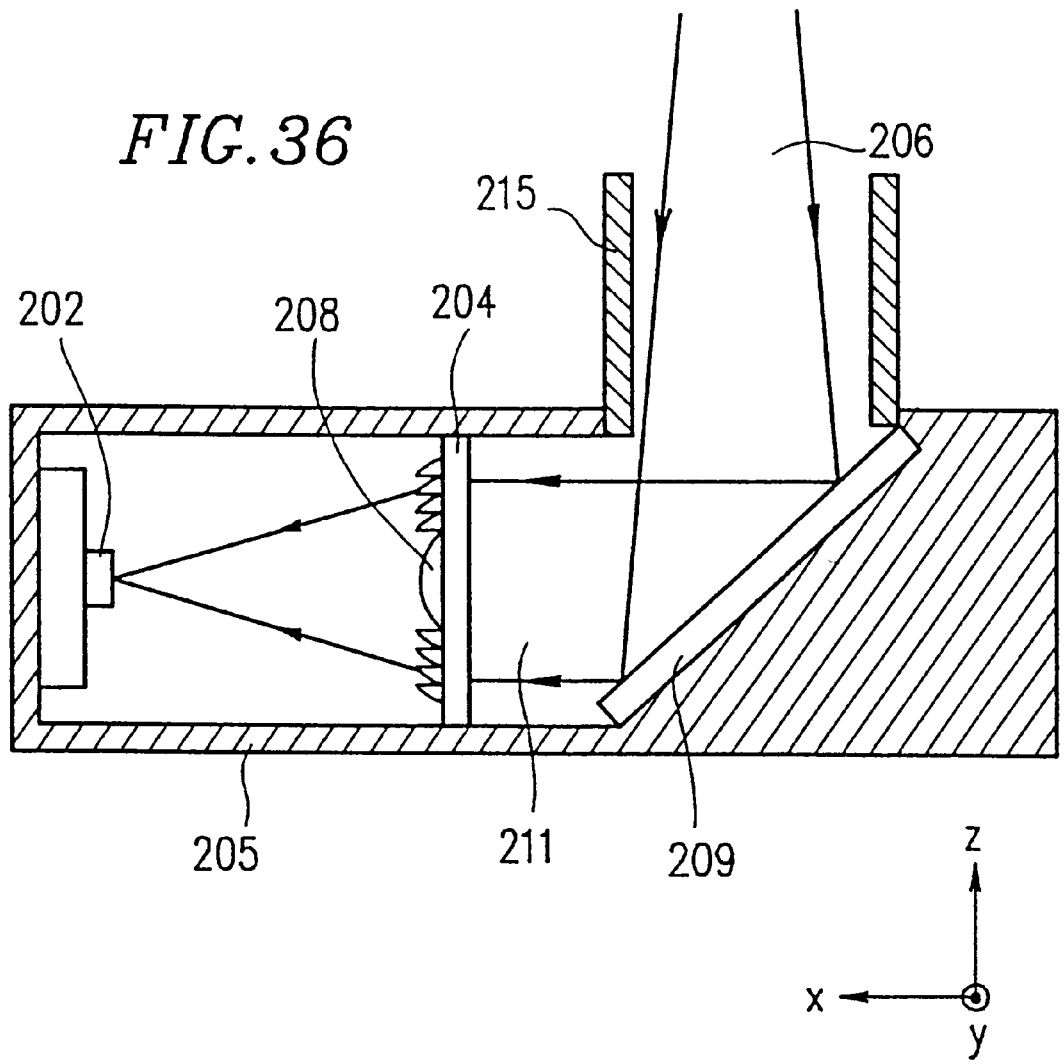
FIG. 36 is a cross-sectional view of an infrared sensor according to a thirteenth example of the invention.

Hereinafter, an infrared sensor according to a thirteenth example of the invention will be described with reference to FIG. 36. The infrared sensor of this thirteenth example is different from the infrared sensor of the eleventh example shown in FIG. 34 in that a cylindrical opening control member 215 is provided on the opening of the seal case 205, as is apparent from FIG. 36. The aperture of this opening control member 215 is set to be 3 mm, and the length thereof in the axial direction is set to be 30 mm, for example. The opening control member 215 is made of a material cutting off the infrared light. The opening control member 215 prevents the infrared light other than the infrared light output from the object to be detected from being incident onto the diffractive optical modulator, thereby improving the S/N ratio of the output signal.

In the foregoing Examples 1 to 13, a diffractive optical modulator of the invention is applied to an infrared sensor. In the following examples, a display device utilizing a diffractive optical modulator of the invention will be described.

EXAMPLE 14

Figure 37:
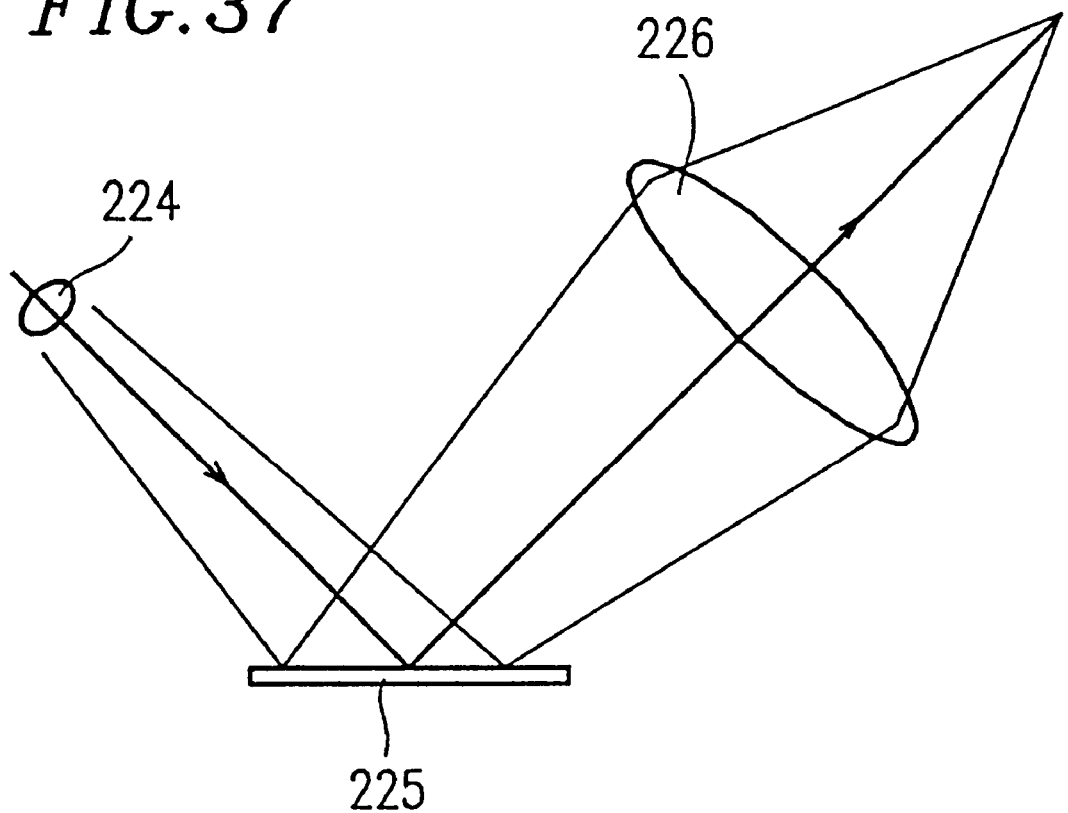
FIG. 37 schematically shows the principle of the operation of a display device according to the invention.

First, referring to FIG. 37, a fundamental arrangement of a display device according to an example of the invention will be described. In this example, the light emitted from a light source 224 is diffracted by a diffractive optical modulator 225, and then converged by a projection lens 226. The intensity of the light output from the diffractive optical modulator 225 to the lens 226 is modulated in accordance with the voltage applied to the diffractive optical modulator 225.

Figure 38:
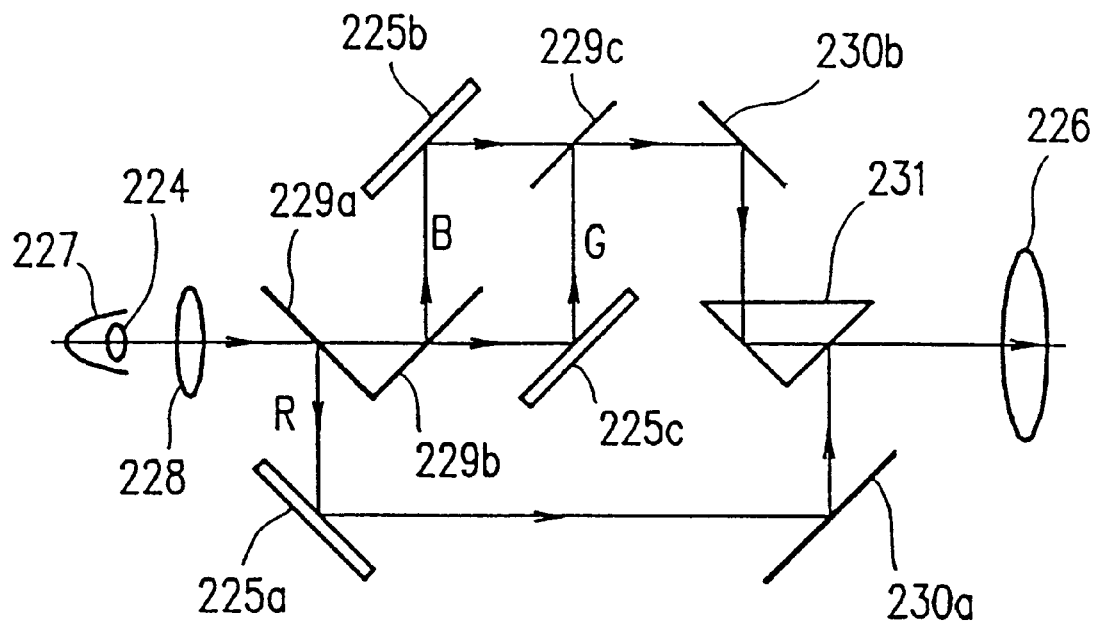
FIG. 38 schematically shows the arrangement for a display device according to an example of the invention.

Next, referring to FIG. 38, a more detailed arrangement of the display device according to this example of the invention will be described. The display device shown in FIG. 38 includes: a white light source 224 such as a metal halide lamp and a xenon lamp; a dichroic mirror 229a for selectively reflecting red light; a dichroic mirror 229b for selectively reflecting blue light; and a dichroic mirror 229c for selectively reflecting green light. A cold mirror 227 for transmitting a heat ray or infrared ray and for reflecting visible light is disposed behind the light source 224. The light emitted from the light source 224 as well as the light reflected by the cold mirror 227 is collimated or converged by a converging lens 228.

In this example, the three diffractive optical modulators 225a to 225c having the above-described configuration are used. The diffractive optical modulator 225a is disposed at a position so as to receive the red (R) light reflected by the dichroic mirror 229a. The diffractive optical modulator 225b is disposed at a position so as to receive the blue (B) light reflected by the dichroic mirror 229b. The diffractive optical modulator 225c is disposed at a position so as to receive the green (G) light transmitted by the dichroic mirror 229b. In this example, the red light diffracted by the diffractive optical modulator 225a is directed to a coupling prism 231 by a mirror 230a. The green light diffracted by the diffractive optical modulator 225c is successively reflected by the dichroic mirror 229c and the mirror 230b so as to be directed to the coupling prism 231. The blue light diffracted by the diffractive optical modulator 225b is transmitted through the dichroic mirror 229c, and then reflected by the mirror 230b, so as to be directed to the coupling prism 231. The light output from the coupling prism 231 is directed through the projection lens 226 so as to form an image on a screen (not shown).

The three diffractive optical modulators 225a to 225c are switched on a pixel basis by a controller (not shown). As a result, the incoming light is modulated on a pixel basis, and the spatial modulation of the incoming light is accomplished by the pixels output by the zero-order diffracted light and the pixels not output by the zero-order diffracted light.

If the ratio of a lattice pitch Λ of the diffractive optical modulator to the central wavelength λ of the incoming light is seven, then the diffraction angle of the first-order diffracted light generated by the diffractive optical modulator becomes 8.2 degrees. Accordingly, in order to prevent the first-order diffracted light from entering the aperture of the projection lens 226, the F value (=focal length/effective aperture of lens) of the projection lens is required to be 3.5 or more. Therefore, the F value of the converging lens is also required to be 3.5 or more. By using such a lens, the light amount projected onto the screen becomes substantially uniform.

In this example, the light emitted from the light source is separated into the three primary colors of red, green and blue, three diffractive optical modulators are provided so as to correspond to the respective colors, and λ/Λ is set to be seven, whereby a display device with a high optical efficiency for projecting substantially uniform amount of light onto the screen can be obtained.

EXAMPLE 15

Figure 39A:
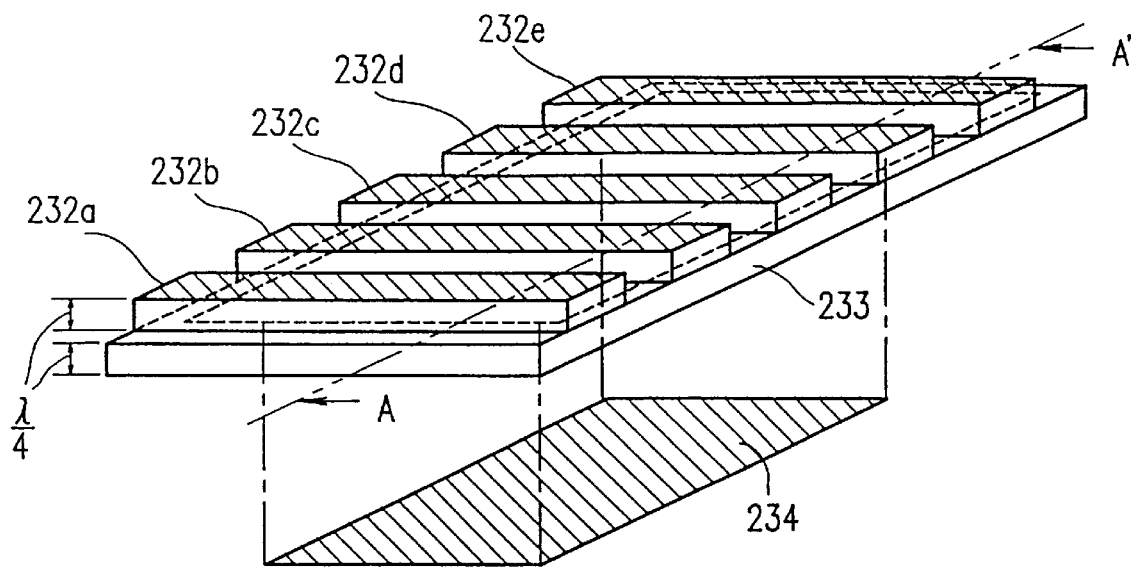
Figure 39B:
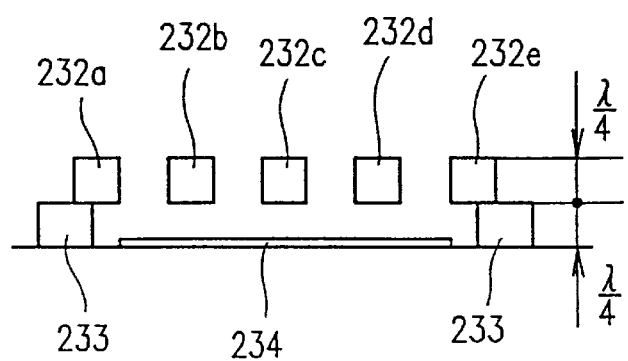
FIG. 39B is a cross-sectional view taken along the line A–A' in FIG. 39A.

Referring to FIGS. 39A and 39B, a display device according to another example of the invention will be described. The display device of this example is different from the display device of the fourteenth example only in the diffractive optical modulator. Therefore, the components other than the diffractive optical modulator will not be described herein.

FIGS. 39A and 39B show the configuration of one pixel of the diffractive optical modulator. In these figures, the reference numerals 232a to 232e denote beams having a thickness of one quarter of the wavelength of the incoming light. Aluminum, silver or the like is deposited on the upper surfaces of the beams 232a to 232e so as to function as the electrode and the reflection film. A spacer 233 also has a thickness of one quarter of the wavelength of the incoming light. An electrode 234, provided on a substrate (not shown), reflects the incoming light. The electrode 234, which is temporarily disposed below the spacer 233 for visual convenience, is in the same plane of the lower surface of the spacer 233 as shown in FIG. 39B.

In the diffractive optical modulator of this example, the beams 232a and 232e provided on the spacer 233 are not deflected even upon the application of the electrostatic force. Therefore, the difference between the phase of the light reflected by the upper surfaces of the beams 232a and 232e and the phase of the light reflected by the upper surface of the spacer 233 is always one half of the wavelength. Also, in the portions of the beams 232b, 232c and 232d supported by the spacer 233, the phase difference is always one half of the wavelength. Accordingly, the phase difference is one half of the wavelength in all the regions between adjacent pixels. Consequently, since the zero-order diffracted light is not generated from a region between adjacent pixels, the respective pixels can be separated easily without particularly providing a black matrix.

EXAMPLE 16

Figure 40A:
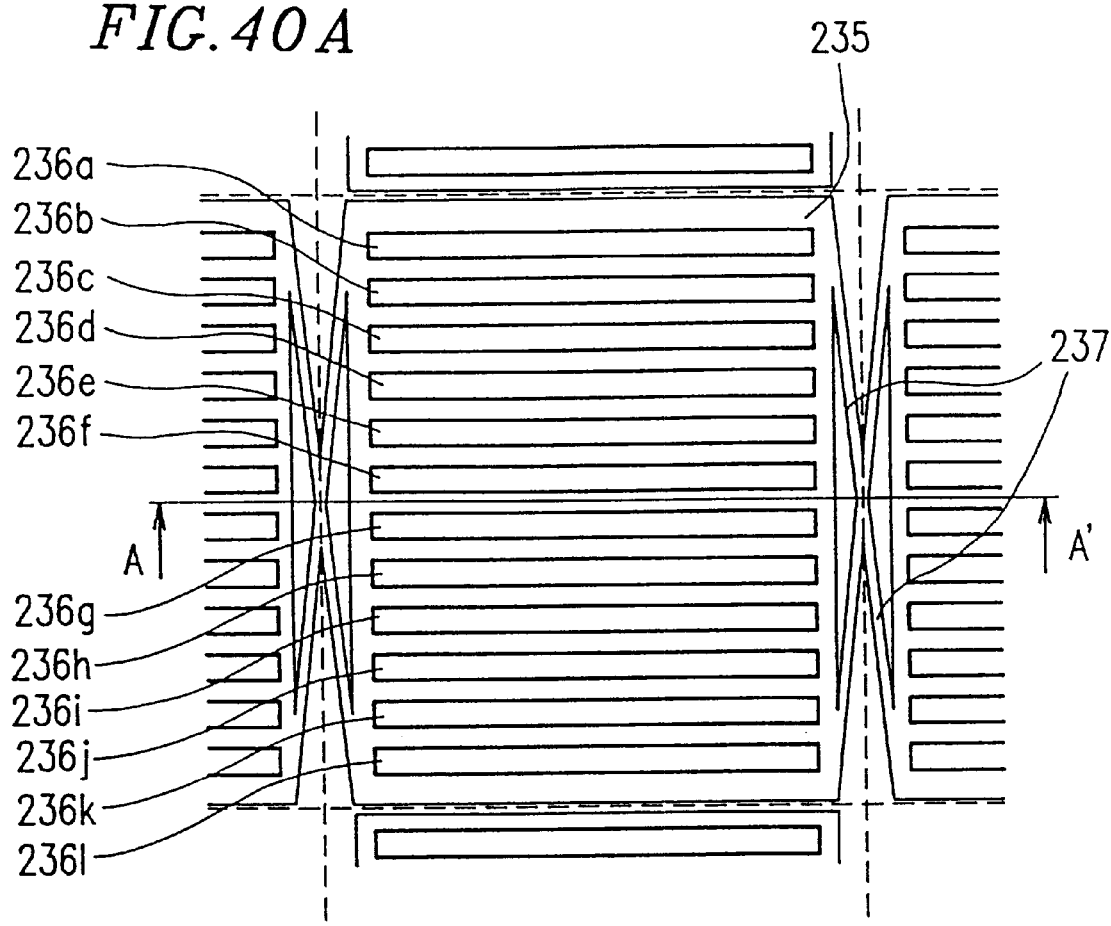
Figure 40B:
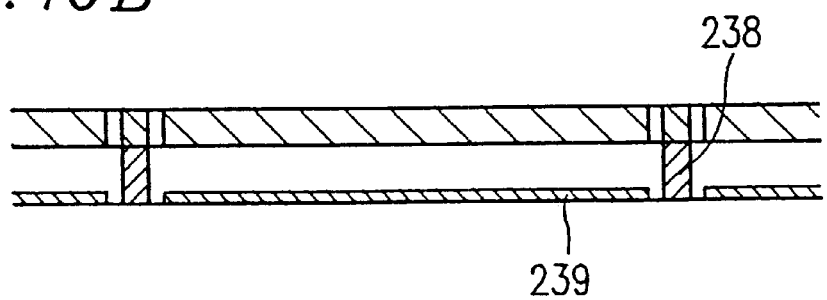
FIG. 40B is a cross-sectional view taken along the line A–A' in FIG. 40A.

Referring to FIGS. 40A and 40B, a display device according to still another example of the invention will be described.

The display device of this example is different from the display device of the fourteenth example only in the diffractive optical modulator. Therefore, the components other than the diffractive optical modulator will not be described herein. In these figures, a dielectric film 235 has a thickness of one quarter of the wavelength of the incoming light, and aluminum, silver or the like is deposited on the upper surface of the dielectric film 235 so as to function as the electrode and the reflection film. Slits 236a to 236l are produced by etching the dielectric film 235. A supporting beam 237 is also produced by etching the dielectric film 235. A spacer is denoted by 238, and an electrode 239 also reflects the light.

Next, the operation of the diffractive optical modulator of this example will be described. The dielectric film 235 is supported in the air by the supporting beam 237 and the spacer 238. When a voltage is applied between the electrode provided on the upper surface of the dielectric film 235 and the electrode 239, an electrostatic force is generated therebetween, so that the dielectric film 235 comes into contact with the electrode 239. Since the width of the supporting beam 237 is smaller than the width of the movable portion of the dielectric film 235, the supporting beam 237 is likely to be deformed, and the area of the contact portion between the dielectric film 235 and the electrode 239 becomes much large. Consequently, the area for modulating the zero-order diffracted light becomes large, and therefore, effective aperture becomes.

By making the width of the supporting beam smaller than the width of the movable portion, the supporting beam is likely to be deformed. As a result, the dead space not contributing to the modulation of the zero-order diffracted light can be advantageously reduced.

In this example, the same effects can be attained by making the width of each of the beams constituting the diffractive optical modulator smaller only in the vicinity of the spacer 238.

In the diffractive optical modulator of the invention, an insulating layer is provided between a movable grating and a plate, so that the material for constituting the grating can be freely selected irrespective of the conductivity thereof. If the beam is made of a conductive material, or if the lower surface of the beam is made of a conductive material so as to function as a second electrode, then the gap between the plate and the second electrode can be reduced, thereby enabling the operation at a low voltage. In the case of using the diffractive optical modulator for infrared light having a relatively long wavelength, the reduction of the distance between the electrodes is effective.

In addition, if the lower surface of the beam is made of a conductive material which is not likely to be oxidized, no residual charges remain in the contact portion when the modulator is driven, so that the residual potential difference is not generated. Accordingly, there is no need for increasing the driving voltage as the modulator is driven many times, and there is no need for forcibly removing the residual charges by the application of the voltages having opposite polarities. Therefore, a power supply for applying voltages having opposite polarities is no longer necessary, thereby realizing a lower cost. In addition, the fine control of the voltage waveform also becomes unnecessary, and the modulator can always be driven stably.

According to a method for producing a diffractive optical modulator of the invention, a spacer layer is formed by an organic film and a predetermined portion thereof is removed by a dry etching process, whereby the sticking of the beams onto the substrate during the rinsing and the drying processes, which has conventionally been generated, can be prevented. In addition, since the spacer layer is uniformly etched, beams having the same length can be formed; thereby, the variation of the operation of the modulator can be eliminated.

Since the length of a beam is determined by the pattern of a spacer layer, a diffractive optical modulator including the beams having the same length can be produced with satisfactory reproducibility. Also, the minimum driving voltage of the diffractive optical modulator is determined by the length of the beam, and therefore, the driving voltages among a plurality of diffractive optical modulators can be aligned.

Furthermore, according to the invention, a mechanical chopper is no longer necessary, and it is possible to provide a downsized infrared sensor operating at a lower power consumption. The durability thereof is also improved. If the inclination angle $\theta_t$ of the diffractive optical modulator is set to be 45 degrees or less, for example, the increase in the driving voltage can be suppressed to twice or less as compared with the case where the light is vertically incident. Further, if the inclination angle $\theta_t$ is set to be 25 degrees or less, the length of the beam is set to be 3 mm or less and the residual stress is controlled to be a tensile stress of +10 MPa or less, then the modulator can be driven at 5 V or less. As a result, a circuit for increasing the voltage is no longer necessary, and a lower cost is realized. Moreover, by providing the pyroelectric element and the signal amplifier on the supporting plate and by supporting the supporting plate by the electrode pins, the infrared sensor can be constructed easily.

The display device of the invention realizes the spatial modulation of the light at a larger effective aperture, as compared with a liquid crystal display device. In addition, since the polarization is no longer necessary, the optical efficiency is improved. Therefore, a brighter image can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An infrared sensor comprising: a lens for converging infrared light and a pyroelectric element,
   wherein a diffractive optical modulator for receiving the infrared light converged by the lens and for outputting at least a part of the infrared light toward the pyroelectric element is further provided,
   the diffractive optical modulator comprising:
      a plate having a portion functioning as a first electrode;
      a spacer layer formed on the plate; and
      a grating consisting of a plurality of beams having a portion functioning as a second electrode, both ends of the beams being supported on the spacer layer;
   wherein, by adjusting a voltage applied between the first electrode and the second electrode, a distance between the beams and the plate is varied, thereby controlling the diffraction efficiency of the diffractive optical modulator,
   wherein an amount of zero-order diffracted light is varied in accordance with a variation of a distance between the beams and the plate of the diffractive optical modulator, and
   wherein the plate is disposed being inclined so that a normal with respect to a principal plane of the plate is not parallel to an optical axis of the lens.

2. An infrared sensor according to claim 1, further comprising:
   a signal amplifier, connected to the pyroelectric element, for outputting an electric signal indicating an amount of infrared light received by the pyroelectric element; and
   a plurality of electrode pins connected to the first and the second electrodes of the diffractive optical modulator and the signal amplifier and the pyroelectric element, the electrode pins externally protruding from the bottom surface of the seal case.

3. An infrared sensor according to claim 2, further comprising a supporting plate for supporting the pyroelectric element and the signal amplifier.

4. An infrared sensor according to claim 3, wherein at least one of the plurality of electrode pins extends to an inside of the seal case, and the at least one electrode pin supports the supporting plate.

5. An infrared sensor according to claim 2, further comprising a shield which is disposed between the pyroelectric element and the diffractive optical modulator and is grounded.

6. An infrared sensor according to claim 1, wherein the diffractive optical modulator has an inclination angle ($\theta_t$) of 45 degrees or less with respect to an upper surface of the seal case.

7. An infrared sensor according to claim 6, wherein the angle ($\theta_t$) is 25 degrees or less.

8. An infrared sensor according to claim 1, wherein the diffractive optical modulator is disposed so that only zero-order diffracted light of light diffracted by the grating is incident on the pyroelectric element and that the diffracted light other than the zero-order diffracted light is not incident on the pyroelectric element.

9. An infrared sensor according to claim 1, wherein a seal case having an opening includes the diffractive optical modulator and the pyroelectric element.

10. An infrared sensor according to claim 9, wherein the lens for converging the infrared light is provided so as to cover the opening of the seal case.

11. An infrared sensor according to claim 10, wherein the seal case comprises: an upper surface for supporting the lens; a bottom surface parallel to the upper surface; and an inclined member for supporting the diffractive optical modulator so that the diffractive optical modulator is inclined with respect to the bottom surface by an inclination angle $\theta_t$, and wherein the diffractive optical modulator is disposed on the inclined member.

12. An infrared sensor according to claim 1, wherein the lens for converging the infrared light is a diffractive lens.

13. An infrared sensor according to claim 12, wherein the lens for converging the infrared light has a corrugated structure corresponding to a phase modulation of the lens and is made of a material selected from the group consisting of Si, Ge, GaAs, InP, GaP, ZnSe and ZnS.

14. An infrared sensor according to claim 1, wherein a period of the grating is seven times or more of a wavelength of the infrared light.

15. An infrared sensor according to claim 1, wherein the plurality of beams are arranged so that a movable distance of the grating becomes minimum on an optical axis of incoming infrared light.

16. An infrared sensor according to claim 1, wherein a thickness of the plurality of beams is adjusted so as to be minimum on an optical axis of incoming infrared light.

17. An infrared sensor according to claim 1, wherein the diffractive optical modulator is disposed so that a direction parallel to a principal plane of the plate and vertical to the beams is vertical to an optical axis of the lens.

18. An infrared sensor according to claim 1, wherein a movable distance of the beams is set to be $\lambda/(4\cos\theta)$, where $\lambda$ is a wavelength of the infrared light, and $\theta$ is an angle formed between a normal with respect to the principal plane of the plate of the diffractive optical modulator and the optical axis of the lens.

19. An infrared sensor according to claim 1, wherein a thickness of the beams is set to be $\lambda/(4\cos\theta)$, where $\lambda$ is a wavelength of the infrared light, and $\theta$ is an angle formed between a normal with respect to the principal plane of the plate of the diffractive optical modulator and the optical axis of the lens.

20. An infrared sensor according to claim 1, wherein an insulating layer is provided between the plate of the diffractive optical modulator and the beams.

21. An infrared sensor according to claim 20, wherein at least lower surfaces of the beams are made of a conductive material which resists oxidation.

22. An infrared sensor according to claim 21, wherein a reflection film is formed on a surface of the insulating layer and on surfaces of the beams.

23. An infrared sensor according to claim 20, wherein the beads of the diffractive optical modulator are made of a conductive material.

24. An infrared sensor comprising: a diffractive optical modulator for outputting at least a part of incoming infrared light; a lens; and a pyroelectric element, wherein the lens converges the infrared light output from the diffractive optical modulator on the pyroelectric element, the diffractive optical modulator comprising:
a plate having a portion functioning as a first electrode;
a spacer layer formed on the plate; and
a grating consisting of a plurality of beams having a portion functioning as a second electrode, both ends of the beams being supported on the spacer layer;

wherein, by adjusting a voltage applied between the first electrode and the second electrode, a distance between the beams and the plate is varied, thereby controlling the diffraction efficiency of the diffractive optical modulator, wherein an amount of zero-order diffracted light is varied in accordance with a variation of a distance between the beams and the plate of the diffractive optical modulator, and wherein the plate is disposed being inclined so that a normal with respect to a principal plane of the plate is not parallel to an optical axis of the lens.

25. An infrared sensor according to claim 24, wherein at least lower surfaces of the beams are made of a conductive material which resists oxidation.

26. An infrared sensor according to claim 24, further comprising:
a signal amplifier, connected to the pyroelectric element, for outputting an electric signal indicating an amount of infrared light received by the pyroelectric element; and
a plurality of electrode pins connected to the first and the second electrodes of the diffractive optical modulator and the signal amplifier and the pyroelectric element, the electrode pins externally protruding from the bottom surface of the seal case.

27. An infrared sensor according to claim 26, further comprising a supporting plate for supporting the pyroelectric element and the signal amplifier.

28. An infrared sensor according to claim 26, wherein at least one of the plurality of electrode pins extends to an inside of the seal case, and the at least one electrode pin supports the supporting plate.

29. An infrared sensor according to claim 28, further comprising a shield which is disposed between the pyroelectric element and the diffractive optical modulator and is grounded.

30. An infrared sensor according to claim 24, wherein the diffractive optical modulator has an inclination angle ($\theta_t$) of 45 degrees or less with respect to an upper surface of the seal case.

31. An infrared sensor according to claim 24, wherein the angle ($\theta_t$) is 25 degrees or less.

32. An infrared sensor according to claim 24, wherein the diffractive optical modulator is disposed so that only zero-order diffracted light of light diffracted by the grating is incident on the pyroelectric element and that the diffracted light other than the zero-order diffracted light is not incident on the pyroelectric element.

33. An infrared sensor according to claim 24, wherein a seal case having an opening includes the diffractive optical modulator and the pyroelectric element.

34. An infrared sensor according to claim 24, wherein the lens for converging the infrared light is a diffractive lens.

35. An infrared sensor according to claim 34, wherein the lens for converging the infrared light has a corrugated structure corresponding to a phase modulation amount of the lens and is made of a material selected from the group consisting of Si, Ge, GaAs, InP, GaP, ZnSe and ZnS.

36. An infrared sensor according to claim 24, wherein a period of the grating is seven times or more of a wavelength of the infrared light.

37. An infrared sensor according to claim 24, wherein the diffractive optical modulator is disposed so that a direction parallel to a principal plane of the plate and vertical to the beams is vertical to an optical axis of the lens.

38. An infrared sensor according to claim 24, wherein a movable distance of the beams is set to be $\lambda/(4 \cos \theta)$, where $\lambda$ is a wavelength of the infrared light, and $\theta$ is an angle formed between a normal with respect to the principal plane of the plate of the diffractive optical modulator and the optical axis of the lens.

39. An infrared sensor according to claim 24, wherein a thickness of the beams is set to be $\lambda/(4 \cos \theta)$, where $\lambda$ is a wavelength of the infrared light, and $\theta$ is an angle formed between a normal with respect to the principal plane of the plate of the diffractive optical modulator and the optical axis of the lens.

40. An infrared sensor according to claim 24, wherein an insulating layer is provided between the plate and the beams of the diffractive optical modulator.

41. An infrared sensor according to claim 40, wherein the beams of the diffractive optical modulator are made of a conductive material.

42. An infrared sensor according to claim 24, wherein a seal case having an opening includes the diffractive optical modulator, the pyroelectric element and the lens.

43. An infrared sensor according to claim 42, wherein an infrared wavelength filter is provided so as to cover the opening of the seal case.

44. An infrared sensor according to claim 42, further comprising an opening control means provided for the opening.

* * * * *